United States Patent
Kim

(10) Patent No.: US 7,257,166 B2
(45) Date of Patent: Aug. 14, 2007

(54) DATA COMMUNICATION APPARATUS AND METHOD BASED ON ORTHOGONAL FREQUENCY DIVISION MULTIPLE ACCESS

(75) Inventor: Yung-Soo Kim, Seongnam-si (KR)

(73) Assignee: Samsung Electronics Co., Ltd. (KR)

(*) Notice: Subject to any disclaimer, the term of this patent is extended or adjusted under 35 U.S.C. 154(b) by 689 days.

(21) Appl. No.: 10/472,271

(22) PCT Filed: Mar. 22, 2002

(86) PCT No.: PCT/KR02/00493

§ 371 (c)(1),
(2), (4) Date: Sep. 22, 2003

(87) PCT Pub. No.: WO02/078232

PCT Pub. Date: Oct. 3, 2002

(65) Prior Publication Data

US 2004/0114691 A1 Jun. 17, 2004

(30) Foreign Application Priority Data

Mar. 26, 2001 (KR) .............. 10-2001-0015640

(51) Int. Cl.
*H04K 1/10* (2006.01)
*H04L 27/28* (2006.01)
(52) U.S. Cl. .............. 375/260; 375/296; 375/299; 332/105; 332/123
(58) Field of Classification Search .......... 375/260, 375/261, 262, 298, 347, 349, 147, 316, 259, 375/267, 284, 296, 299, 325, 330; 370/210, 370/486; 329/309, 306; 708/403, 404; 332/105, 332/123, 124, 126; 381/330

See application file for complete search history.

(56) References Cited

U.S. PATENT DOCUMENTS 5,394,439 A * 2/1995 Hemmati .............. 375/242

(Continued)

FOREIGN PATENT DOCUMENTS

EP 1001M566 5/2000

(Continued)

OTHER PUBLICATIONS

Lindskog et al., "A Transmit Diversity Scheme for Channels with Intersymbol Interference", 2000 IEEE.

(Continued)

*Primary Examiner*—Mohammed Ghayour
*Assistant Examiner*—Qutub Ghulamali
(74) *Attorney, Agent, or Firm*—The Farrell Law Firm

(57) ABSTRACT

A data communication apparatus and method based on OFDMA are provided. In a first user transmitting unit through which a user transmits user information to a base station in units of first symbol blocks each including M symbols, a first encoder generates a first sub-block composed of $M_u$ user symbols for a u-th user by encoding the user information. A first block repeater repeats the first sub-block $L_u$ times to generate M symbols. A first multiplier multiplies the M symbols by $\gamma_u \exp(j2\pi km_u/M)$ and outputs a u-th user signal. A first cyclic extension symbol inserter inserts a cyclic extension symbol into the u-th user signal and generates a single complete first symbol block. Accordingly, data transmission speed can be freely changed, a very small PAR can be provided, influence of the signal interference is greatly reduced, interference occurring between received blocks due to channels can be prevented, and distortion between channels can be effectively compensated for.

77 Claims, 34 Drawing Sheets

U.S. PATENT DOCUMENTS

| | | | | |
|---|---|---|---|---|
| 5,581,578 | A | * | 12/1996 | De Bot ........................ 375/261 |
| 5,640,423 | A | * | 6/1997 | Archer ........................ 375/261 |
| 5,715,280 | A | * | 2/1998 | Sandberg et al. ........... 375/260 |
| 5,881,107 | A | * | 3/1999 | Termerinac et al. ......... 375/279 |
| 2002/0146079 | A1 | * | 10/2002 | Al-Khatib ................... 375/261 |
| 2002/0154705 | A1 | * | 10/2002 | Walton et al. .............. 375/267 |
| 2002/0159535 | A1 | * | 10/2002 | Agami et al. ............... 375/261 |

FOREIGN PATENT DOCUMENTS

EP          1043861 A    10/2000

OTHER PUBLICATIONS

Jul. 19, 2002, International Search Report of Korean Intellectual Property Office.

* cited by examiner

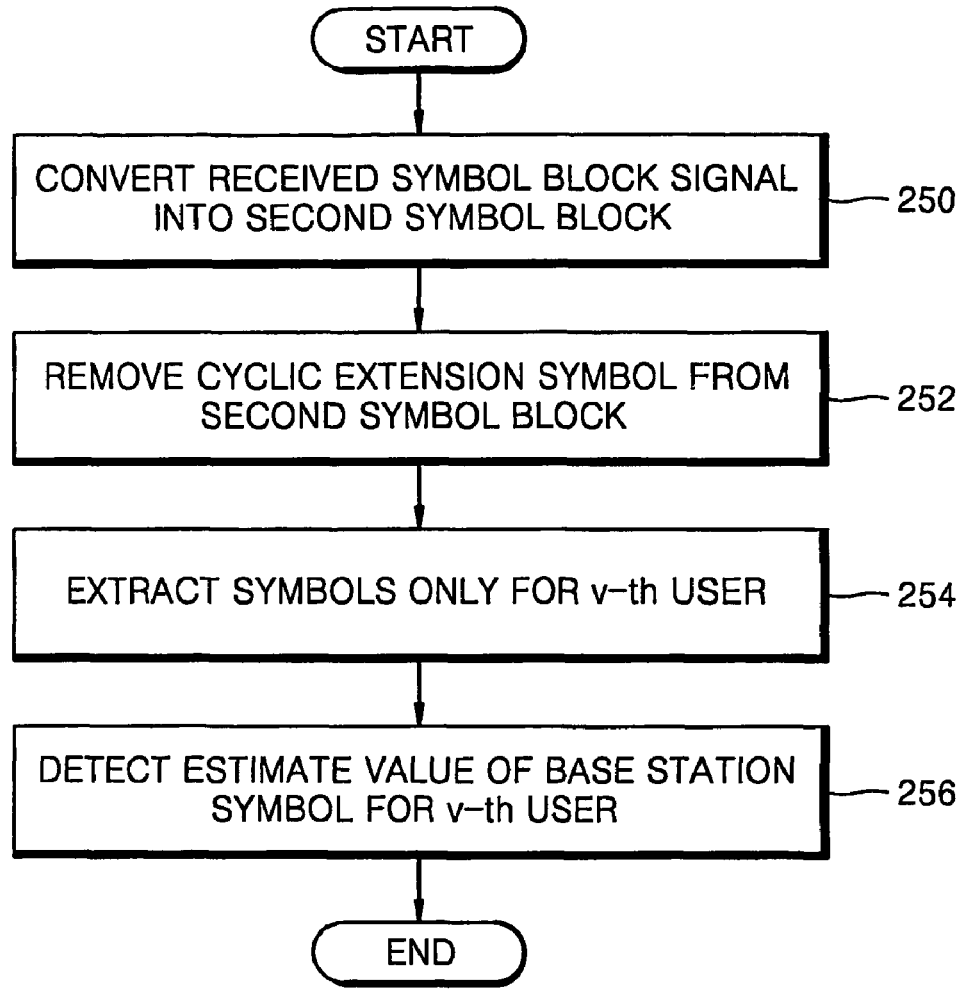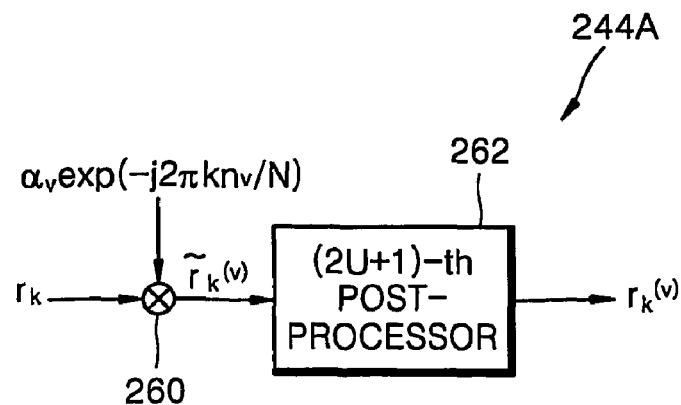

DATA COMMUNICATION APPARATUS AND METHOD BASED ON ORTHOGONAL FREQUENCY DIVISION MULTIPLE ACCESS

BACKGROUND OF THE INVENTION

1. Field of the Invention

The present invention relates to data communication, and more particularly, to a data communication apparatus and method based on orthogonal frequency division multiple access (OFDMA).

2. Description of the Related Art

In a time division multiple access (TDMA) method as a conventional data communication method, a plurality of time slots are defined within a data frame and the time slots are appropriately allocated to different users so that the users can share a common physical channel. When the conventional TDMA method is applied to a voice-centered communications environment, multiple access can be easily accomplished since a necessary communication speed is constant. However, in a multimedia communications environment requiring a high-speed data service as well as a low-speed voice service, a data transmission speed needs to be changed to satisfy a user's request. Since a data transmission speed can be adjusted only by changing time slots in the conventional TDMA method, the conventional TDMA method is not appropriate to a multimedia communications environment.

A direct sequence-code division multiple access (DS-CDMA) method as another conventional data communication method allows a plurality of users to simultaneously transmit/receive signals at the same time. The conventional DS-CDMA method uses a multiple access method in which users use orthogonal codes, in order to separate different users' signals from one another. In an environment in which serious multi-path fading does not occur in wireless channels, fading can be effectively overcome using a RAKE receiver according to the conventional DS-CDMA method. In addition, in the conventional DS-CDMA method, a data transmission speed can be easily adjusted by adjusting a spread factor (SF) of a code multiplied by a signal. However, compared to other data communication methods, the conventional DS-CDMA method has lower spectrum efficiency. Moreover, if a spreading factor is decreased in order to transmit data at a high speed, reliability of communications decreases. Accordingly, it is difficult to transmit data at a high speed in the conventional DS-CDMA method. In the conventional DS-CDMA method when a user transmits data using different codes, although a data transmission speed can be increased, a signal power needs to be reduced or nonlinear distortion occurs since a peak to average rate (PAR) of a transmitting signal increases, thereby decreasing reliability of a receiving signal.

A still another conventional data communication method is a TDMA method based on orthogonal frequency division multiplexing (OFDM) or a frequency division multiple access (FDMA) based on OFDM. In conventional data communication methods based on OFDM, inverse fast Fourier transform (IFFT) is performed on a transmitting signal in units of blocks, and a cyclic prefix is added to each block before the signal is transmitted. Since a cyclic prefix is inserted between adjacent blocks of an OFDM signal, inter-block interference occurring due to fading can be prevented. In addition, since channel distortion can be easily compensated for using a simple 1-tap equalizer after FFT, conventional data communication methods based on OFDM are suitable to high-speed communications having a lot of channel interference. However, conventional data communication methods based on OFDM have a large PAR and decreases the reliability of a receiving part due to nonlinear distortion caused by a high power amplifier (HPA) of a transmitting party, thereby limiting HPA power in order to reduce nonlinear distortion. Accordingly, conventional data communication methods based on OFDM which are applied to two-way wireless communications reduce the efficiency of mobile terminals and increase the manufacturing cost of mobile terminals. Moreover, when there is a carrier frequency offset, interference occurs in a receiving signal proportional to the size of an FFT/IFFT block in conventional data communication methods based on OFDM, thereby decreasing the performance of a communications system.

SUMMARY OF THE INVENTION

The present invention provides a data communication apparatus based on orthogonal frequency division multiple access (OFDMA) which can freely adjust a data transmission speed and provide communications with high reliability.

The present invention also provides a data communication method based on OFDMA which is performed by the data communication apparatus based on OFDMA.

According to an aspect of the present invention, there is provided a data communication apparatus based on OFDMA, including a first user transmitting unit through which a user transmits user information to a base station in units of first symbol blocks each including M symbols in data communication between the user and the base station. The first user transmitting unit includes a first encoder for generating a first sub-block composed of $M_u$ user symbols $a_k^{(u)}$ for a u-th user by encoding the user information, where $M_u$ is an integer greater than or equal to 1 and no greater than M, "k" is a time index and an integer greater than or equal to 0 and no greater than M−1, "u" is a user index and an integer greater than or equal to 1 and no greater than U, and U indicates the number of users sharing the first symbol block and is 1 or a positive integer greater than 1; a first block repeater for repeating the first sub-block $L_u$ times to generate M symbols $a_k^{(u)}$, wherein $L_u$ is $M/M_u$, $k' = k \% M_u$, and $k \% M_u$ indicates the remainder when "k" is divided by $M_u$; a first multiplier for multiplying the M symbols $a_{k'}^{(u)}$ generated from the first block repeater by $\gamma_u \exp(j2\pi k m_u/M)$ and outputting the result of multiplication as a signal $x_k^{(u)}$ for the u-th user, wherein $\gamma_u$ indicates a magnitude control factor for the u-th user signal $x_k^{(u)}$, and $m_u$ indicates a unique frequency offset number allocated to the u-th user; a first cyclic extension symbol inserter for outputting the first symbol block completed by inserting a cyclic extension symbol into the u-th user signal $x_k^{(u)}$; and a first signal transmitter for converting the completed first symbol block into a symbol block signal and transmitting the symbol block signal. Here, $M_1+M_2+M_3+\ldots+M_u$ does not exceed M.

According to another aspect of the present invention, there is provided a data communication apparatus based on OFDMA in data communication between V users and the base station, V indicating the number of users sharing a second symbol block and being 1 or a positive integer greater than 1. The data communication apparatus includes a first base station transmitting unit through which the base station transmits base station information to a v-th user in units of the second symbol blocks each including N symbols "v" being a user index and an integer greater than or equal to 1 and no greater than V. The first base station transmitting unit includes second through (V+1)-th encoders, second through (V+1)-th block repeaters, second through (V+1)-th multipliers, a first adder, a second cyclic extension symbol inserter, and a second signal transmitter. The (v+1)-th encoder generates a (v+1)-th sub-block composed of $N^v$ base station symbols $a_k^{(v)}$ for a v-th user by encoding the base station information and outputs the (v+1)-th sub-block to the (v+1)-th block repeater, $N_v$ being an integer greater than or equal to 1 and less than or equal to N, "k" being a time index and an integer greater than or equal to 0 and less than or equal to N−1. The (v+1)-th block repeater repeats the (v+1)-th sub-block $L_v$ times to generate N symbols $a_{k'}^{(v)}$ and outputs the N symbols $a_{k'}^{(v)}$ to the (v+1)-th multiplier, $L_v$ being $N/N_v$, k'=k % $N_v$, k % $N_v$ indicating the remainder when "k" is divided by $N_v$. The (v+1)-th multiplier multiplies the N symbols $a_{k'}^{(v)}$ by $\gamma_v \exp(j2\pi k n_v/N)$ and outputs the result $x_k^{(v)}$ of multiplication to the first adder, $\gamma_v$ indicating a magnitude control factor for a v-th user signal, $n_v$ indicating a unique frequency offset number allocated to the v-th user. The first adder sums the results $x_k^{(1)}$ through $x_k^{(V)}$ of multiplication received from the second through (V+1)-th multipliers and outputs the result $x_k$ of summation to the second cyclic extension symbol inserter. The second cyclic extension symbol inserter outputs the single second symbol block completed by inserting a cyclic extension symbol into the result $x_k$ of summation to the second signal transmitter. The second signal transmitter converts the completed second symbol block into a symbol block signal and transmits the symbol block signal. Here, $N_1+N_2+N_3+ \ldots +N_v$ does not exceed N.

According to still another aspect of the present invention, there is provided a data communication apparatus based on OFDMA, including a first base station receiving unit which receives a symbol block signal transmitted from each of U first user transmitting units and estimates u-th user symbols from the symbol block signal. The first base station receiving unit includes a first signal receiver for converting the received symbol block signal into the first symbol block and outputting the first symbol block; a first pre-processor for finding a start point of the first symbol block received from the first signal receiver, removing a cyclic extension symbol from the first symbol block on the basis of the start point, and outputting the result $r_k$ of removal of the cyclic extension symbol, wherein "k" is a time index and an integer greater than or equal to 0 and less than or equal to M−1; a first user symbol extractor for extracting only the u-th user symbols from the result $r_k$ received from the first pre-processor; and a first estimate value detector for detecting an estimate value $\hat{a}_k^{(u)}$ for a u-th user symbol from the u-th user symbols extracted by the first user symbol extractor.

According to still another aspect of the present invention, there is provided a data communication apparatus based on OFDMA, including a first user receiving unit which receives a symbol block signal transmitted from a first base station transmitting units and estimates a base station symbol for a v-th user from the received symbol block signal, "v" being a user factor and an integer greater than or equal to 1 and no greater than V, V indicating the number of users sharing a second symbol block having N symbols and being 1 or a positive integer greater than 1. The first user receiving unit includes a second signal receiver for converting the symbol block signal received from the first base station transmitting unit into the second symbol block and outputting the second symbol block; a second pre-processor for finding a start point of the second symbol block received from the second signal receiver, removing a cyclic extension symbol from the second symbol block on the basis of the start point, and outputting the result $r_k$ of removal of the cyclic extension symbol, wherein "k" is a time index and an integer greater than or equal to 0 and less than or equal to N−1; a first base station symbol extractor for extracting only symbols for the v-th user from the result $r_k$ received from the second pre-processor; and a second estimate value detector for detecting an estimate value $\hat{a}_k^{(v)}$ of the base station symbol for the v-th user from the symbols for the v-th user output from the first base station symbol extractor.

According to still another aspect of the present invention, there is provided a data communication apparatus based on OFDMA, including a second user transmitting unit through which a user transmits user information to a base station in units of two first symbol blocks each including a first predetermined number M of symbols in data communication between the user and the base station. The second user transmitting unit includes a first encoder for generating a first sub-block composed of a second predetermined number $M_u$ of user symbols $a_k^{(u)}$ for a u-th user by encoding the user information, where $M_u$ is an integer greater than or equal to 1 and no greater than M, "k" is a time index and an integer greater than or equal to 0 and no greater than M−1, "u" is a user index and an integer greater than or equal to 1 and no greater than U, and U indicates the number of users sharing the first symbol block and is 1 or a positive integer greater than 1; first and second block transmitters; and a first diversity signal generator for transforming odd- and even-numbered first sub-blocks received from the first encoder every symbol block time and alternately outputting untransformed and transformed odd- and even-numbered first sub-blocks to each of the first and second block transmitters every symbol block time. Each of the first and second block transmitters includes a first block repeater, a first multiplier, a first cyclic extension symbol inserter, and a first signal transmitter and generates two symbol block signals from the untransformed and transformed odd- and even-numbered first sub-blocks alternately output from the first diversity signal generator. The first block repeater repeats the first sub-block a third predetermined number $L_u$ of times to generate M symbols $a_{k'}^{(u)}$, where $L_u$ is $M/M_u$, k'=k % $M_u$, and k % $M_u$ indicates the remainder when "k" is divided by $M_u$. The first multiplier multiplies the M symbols $a_{k'}^{(u)}$ generated from the first block repeater by $\gamma_u \exp(j2\pi k m_u/M)$ and outputs the result of multiplication as a signal $x_k^{(u)}$ for the u-th user, where $\gamma_u$ indicates a magnitude control factor for the u-th user signal $x_k^{(u)}$, and $m_u$ indicates a unique frequency offset number allocated to the u-th user. The first cyclic extension symbol inserter outputs the first symbol block completed by inserting a cyclic extension symbol into the u-th user signal $x_k^{(u)}$. The first signal transmitter converts the completed first symbol block into a symbol block signal and transmits the symbol block signal. $M_1+M_2+M_3+ \ldots +M_u$ does not exceed M.

It is preferable that the data communication apparatus further includes a second base station receiving unit which receives one of two symbol block signals transmitted from each of U second user transmitting units and estimates a u-th user symbol from the received symbol block signal. The second base station receiving unit includes a third signal receiver for converting the received symbol block signal into the first symbol block and outputting the first symbol block; a third pre-processor for finding a start point of the first symbol block received from the third signal receiver, removing the cyclic extension symbol from the first symbol block on the basis of the start point, and outputting the result $r_k$ of removal of the cyclic extension symbol; a second user symbol extractor for extracting odd- and even-numbered user symbols for the u-th user in a frequency domain from the result $r_k$ of removal output from the third pre-processor; and a third estimate value detector for detecting estimate values $\hat{a}_{1,k}^{(u)}$ and $\hat{a}_{2,k}^{(u)}$ of the odd- and even-numbered user symbols from the odd- and even-numbered user symbols for the u-th user extracted by the second user symbol extractor.

According to still another aspect of the present invention, there is provided A data communication apparatus based on OFDMA in data communication between a fourth predetermined number V of users and a base station, V indicating the number of users sharing a second symbol block and being 1 or a positive integer greater than 1. The data communication apparatus includes a second base station transmitting unit through which the base station transmits base station information to a v-th user in units of two second symbol blocks each including N symbols. The second base station transmitting unit includes second through (V+1)-th encoders, third and fourth block transmitters, and second through (V+1)-th diversity signal generators. The (v+1)-th encoder generates a (v+1)-th sub-block composed of a sixth predetermined number $N_v$ of base station symbols $a_k^{(v)}$ for a v-th user by encoding the base station information and outputs the (v+1)-th sub-block to the (v+1)-th block repeater, $N_v$ being an integer greater than or equal to 1 and less than or equal to N, "k" being a time index and an integer greater than or equal to 0 and less than or equal to N−1. The (v+1)-th diversity signal generator transforms odd- and even-numbered (v+1)-th sub-blocks received from the (v+1)-th encoder every symbol block time and outputs alternately untransformed and transformed odd- and even-numbered (v+1)-th sub-blocks to the third and fourth block transmitters every symbol block time. Each of the third and fourth block transmitters includes second through (V+1)-th block repeaters, second through (V+1)-th multipliers, a first adder, a second cyclic extension symbol inserter, and a second signal transmitter, and generates two symbol block signals from the untransformed and transformed odd- and even-numbered second through (V+1)-th sub-blocks alternately output from each of the second through (V+1)-th diversity signal generators. The (v+1)-th block repeater repeats the (v+1)-th sub-block a seventh predetermined number $L_v$ of times to generate N symbols $a_{k'}^{(v)}$ and outputs the N symbols $a_{k'}^{(v)}$ to the (v+1)-th multiplier, $L_v$ being N/$N_v$, k'=k % $N_v$, k % $N_v$ indicating the remainder when "k" is divided by $N_v$. The (v+1)-th multiplier multiplies the N symbols $a_{k'}^{(v)}$ by $\gamma_v$ exp(j2πkn$_v$/N) and outputs the result $x_k^{(v)}$ of multiplication to the first adder, $\gamma_v$ indicating a magnitude control factor for a v-th user signal, $n_v$ indicating a unique frequency offset number allocated to the v-th user. The first adder sums the results $x_k^{(1)}$ through $x_k^{(V)}$ of multiplication received from the second through (V+1)-th multipliers and outputs the result $x_k$ of summation to the second cyclic extension symbol inserter. The second cyclic extension symbol inserter outputs the single second symbol block completed by inserting a cyclic extension symbol into the result $x_k$ of summation to the second signal transmitter. The second signal transmitter converts the completed second symbol block into a symbol block signal and transmits the symbol block signal. $N_1+N_2+N_3+ \ldots +N_V$ does not exceed N.

It is preferable that the data communication apparatus further includes a second user receiving unit which receives one of two symbol block signals transmitted from the second base station transmitting unit and estimates a base station symbol for the v-th user from the received symbol block signal. The second user receiving unit includes a fourth signal receiver for converting the received symbol block signal into a second symbol block and outputting the second symbol block; a fourth pre-processor for finding a start point of the second symbol block received from the fourth signal receiver, removing the cyclic extension symbol from the second symbol block on the basis of the start point, and outputting the result $r_k$ of removal of the cyclic extension symbol; a second base station symbol extractor for extracting odd- and even-numbered symbols for the v-th user from the result $r_k$ output from the fourth pre-processor; and a fourth estimate value detector for detecting estimate values $\hat{a}_{1,k}^{(v)}$ and $\hat{a}_{2,k}^{(v)}$ of odd- and even-numbered base station symbols for the v-th user from the extracted odd- and even-numbered symbols.

According to still another aspect of the present invention, there is provided a data communication method based on OFDMA through which the first user transmitting unit of the data communication apparatus transmits the user information. The data communication method includes generating the first sub-block composed of $M_u$ user symbols $a_k^{(u)}$ for the u-th user by encoding the user information; repeating the first sub-block $L_u$ times to generate the M symbols $a_{k'}^{(u)}$; multiplying the M symbols $a_{k'}^{(u)}$ by $\gamma_u$ exp(j2πkm$_u$/M) to obtain the u-th user signal $x_k^{(u)}$; inserting the cyclic extension symbol into the u-th user signal $x_k^{(u)}$ to generate the single complete first symbol block; and converting the first symbol block into the symbol block signal and transmitting the symbol block signal.

According to still another aspect of the present invention, there is provided a data communication method based on OFDMA through which the first base station transmitting unit of the data communication apparatus transmits the base station information. The data communication method includes generating V (v+1)-th sub-blocks each composed of the $N_v$ base station symbols $a_k^{(v)}$ for the v-th user by encoding the base station information; repeating each of the V (v+1)-th sub-blocks $L_v$ times to generate N symbols $a_{k'}^{(v)}$; multiplying the symbols $a_{k'}^{(1)}$ through $a_{k'}^{(V)}$, which are obtained with respect to the respective V (v+1)-th sub-blocks in step (b2), by $\gamma_1$ exp(j2πkn$_1$/N) through $\gamma_v$ exp(j2πkn$_V$/N), respectively, to generate $x_k^{(1)}$ through $x_k^{(V)}$; summing $x_k^{(1)}$ through $x_k^{(V)}$ and obtaining the result $x_k$ of summation; inserting the cyclic extension symbol into the result $x_k$ of summation to generate the single complete second symbol block; and converting the second symbol block into the symbol block signal and transmitting the symbol block signal.

According to still another aspect of the present invention, there is provided a data communication method based on OFDMA through which the first base station receiving unit of the data communication apparatus estimates a u-th user symbol from the symbol block signal. The data communication method includes converting the received symbol block signal into the first symbol block; finding a start point of the first symbol block and removing the cyclic extension symbol from the first symbol block on the basis of the start point; extracting only the u-th user symbols from the result $r_k$ of removal of the cyclic extension symbol; detecting the estimate value $\hat{a}_k^{(u)}$ of the user symbol for the u-th user from the extracted u-th user symbols.

According to still another aspect of the present invention, there is provided a data communication method based on OFDMA through which the first user receiving unit of the data communication apparatus estimates the base station symbol from the symbol block signal transmitted from the first base station transmitting unit. The data communication method includes converting the received symbol block signal into the second symbol block; removing the cyclic extension symbol from the second symbol block; extracting only the symbols for the v-th user from the result $r_k$ of removal of the cyclic extension symbol; and detecting the estimate value of the base station symbol for the v-th user from the symbols extracted for the v-th user.

According to still another aspect of the present invention, there is provided a data communication method based on OFDMA through which the second user transmitting unit of the data communication apparatus transmits the user information to the base station in two first symbol block units. The data communication method includes transmitting the untransformed odd-numbered first sub-blocks to the first block transmitter and simultaneously transmitting the untransformed even-numbered first sub-blocks to the second block transmitter, during an odd-numbered symbol block time; transforming the even-numbered first sub-blocks by multiplying complex conjugates of the even-numbered first sub-blocks by −1 and arranging the results of multiplication in order opposite to the order in which the even-numbered first sub-blocks are input and transmitting the transformed even-numbered first sub-blocks to the first block transmitter, and simultaneously, transforming the odd-numbered first sub-blocks by arranging complex conjugates of the odd-numbered first sub-blocks in order opposite to the order in which the odd-numbered first sub-blocks are input and transmitting the transformed odd-numbered first sub-blocks to the second block transmitter, during an even-numbered symbol block time; generating the symbol block signal from the untransformed odd-numbered first sub-blocks using the first block transmitter and generating the symbol block signal from the untransformed even-numbered first sub-blocks using the second block transmitter, during the odd-numbered symbol block time; generating the symbol block signal from the transformed even-numbered first sub-blocks using the first block transmitter and generating the symbol block signal from the transformed odd-numbered first sub-blocks using the second block transmitter, during the even-numbered symbol block time; and simultaneously transmitting the two symbol block signals generated during the odd- or even-numbered symbol block time to the base station.

According to still another aspect of the present invention, there is provided a data communication method based on OFDMA through which the second base station transmitting unit of the data communication apparatus transmits the base station information in two second symbol block units. The data communication method includes transmitting the untransformed odd-numbered second through (V+1)-th sub-blocks to the third block transmitter and simultaneously transmitting the untransformed even-numbered second through (V+1)-th sub-blocks to the fourth block transmitter, during an odd-numbered symbol block time; transforming the even-numbered second through (V+1)-th sub-blocks by multiplying complex conjugates of the even-numbered second through (V+1)-th sub-blocks by −1 and arranging the results of multiplication in order opposite to the order in which they are input, and transmitting the transformed even-numbered second through (V+1)-th sub-blocks to the third block transmitter, and simultaneously, transforming the odd-numbered second through (V+1)-th sub-blocks by arranging complex conjugates of the odd-numbered second through (V+1)-th sub-blocks in order opposite to the order in which they are input and transmitting the transformed odd-numbered second through (V+1)-th sub-blocks to the fourth block transmitter, during an even-numbered symbol block time; generating the symbol block signal from the untransformed odd-numbered second through (V+1)-th sub-blocks using the third block transmitter and generating the symbol block signal from the untransformed even-numbered second through (V+1)-th sub-blocks using the fourth block transmitter, during the odd-numbered symbol block time; generating the symbol block signal from the transformed even-numbered second through (V+1)-th sub-blocks using the third block transmitter and generating the symbol block signal from the transformed odd-numbered second through (V+1)-th sub-blocks using the fourth block transmitter, during the even-numbered symbol block time; and simultaneously transmitting the two symbol block signals generated during the odd- or even-numbered symbol block time to the base station.

According to still another aspect of the present invention, there is provided a data communication method based on OFDMA through which the second base station receiving unit of the data communication apparatus receives one of the symbol block signals transmitted from the second user transmitting unit and estimates a u-th user symbol. The data communication method includes converting the received symbol block signal into the first symbol block; removing the cyclic extension symbol from the first symbol block; extracting odd- and even-numbered user symbols for the u-th user in a frequency domain from the result $r_k$ of removal of the cyclic extension symbol; and detecting estimate values $\hat{a}_{1,k}^{(u)}$ and $\hat{a}_{2,k}^{(u)}$ of the odd- and even-numbered user symbols from the extracted odd- and even-numbered user symbols for the u-th user.

According to still another aspect of the present invention, there is provided a data communication method based on OFDMA through which the second user receiving unit of the data communication apparatus receives one of the symbol block signals transmitted from the second base station transmitting unit and estimates the base station symbol for the v-th user. The data communication method includes converting the received symbol block signal into the second symbol block; removing the cyclic extension symbol from the second symbol block; extracting only the odd- and even-numbered symbols for the v-th user from the result $r_k$ of removal of the cyclic extension symbol; and detecting the estimate values $\hat{a}_{1,k}^{(v)}$ and $\hat{a}_{2,k}^{(v)}$ of the odd- and even-numbered base station symbols for the v-th user from the extracted odd- and even-numbered symbols.

According to still another aspect of the present invention, there is provided a data communication method of obtaining a frequency offset number based on OFDMA. The data communication method includes sorting all users in order of ascending $L_u$ or $L_v$; initializing the user index and the frequency offset number; increasing the user index by 1, obtaining the value of $b_l \in \{0, 1\}$ satisfying $$\sum_{i=1}^{u-1} L_i^{-1} = \sum_l b_l 2^{-l} \text{ or } \sum_{i=1}^{v-1} L_i^{-1} = \sum_l b_l 2^{-l},$$

and obtaining the frequency offset number using $$\sum_l b_l 2^{l-1};$$

and determining whether the user index is less than the number of users, and going to the step if it is determined that the user index is less than the number of users.

According to still another aspect of the present invention, there is provided a data communication method based on OFDMA through which a data communication apparatus based on OFDMA generates a channel estimation pilot symbol including at least 2M or 2N symbols. The data communication method includes setting a reference pilot symbol sequence d[k] composed of M or N pilot symbols previously known to a user and a base station, "k" being an integer greater than or equal to 0 and no greater than M−1 or N−1, "[ ]" indicating a set; and obtaining the pilot symbol $d^{(u)}[e]$ or $d^{(v)}[e]$ for a u- or v-th user according to $d^{(u)}[e]=d[m_u+e\ L_u]$ or $d^{(v)}[e]=d[n_v+e\ L_v]$, where "u" or "v" is a user index and an integer greater than or equal to 1 and no greater than U or V, U or V indicates the number of users sharing a symbol block having M or N symbols and is 1 or a positive integer greater than 1, "e" is an integer equal to or greater than 0 and no greater than $M_u-1$ or $N_v-1$, $M_u$ or $N_v$ is an integer equal to or greater than 1 and no greater than M or N, $m_u$ or $n_v$ indicates a unique frequency offset number of the u- or v-th user, $L_u$ or $L_v$ is $M/M_u$ or $N/N_v$, respectively.

Alternatively, after setting the reference pilot symbol sequence d[k], the pilot symbol $d^{(u)}[e]$ or $d^{(v)}[e]$ for a u- or v-th user is obtained according to $d^{(u)}[e]=d[e+S_{u-1}]$ or $d^{(v)}[e]=d[e+S_{v-1}]$, where $$S_u = \sum_{i=1}^{u} M_i \text{ or } S_v = \sum_{i=1}^{v} N_i$$

and $S_0=0$.

BRIEF DESCRIPTION OF THE DRAWINGS

The above and other features and advantages of the present invention will become more apparent by describing in detail preferred embodiments thereof with reference to the attached drawings in which:

FIG. 17 is a flowchart of a data communication method performed by the first user receiving unit according to the present invention;

FIG. 18 is a block diagram of a first embodiment of a first base station symbol extractor according to the present invention;

DETAILED DESCRIPTION OF THE INVENTION

Hereinafter, the configuration and operations of a data communication apparatus based on orthogonal frequency division multiple access (OFDMA) according to the present invention will be described with reference to the attached drawings.

Figure 1:
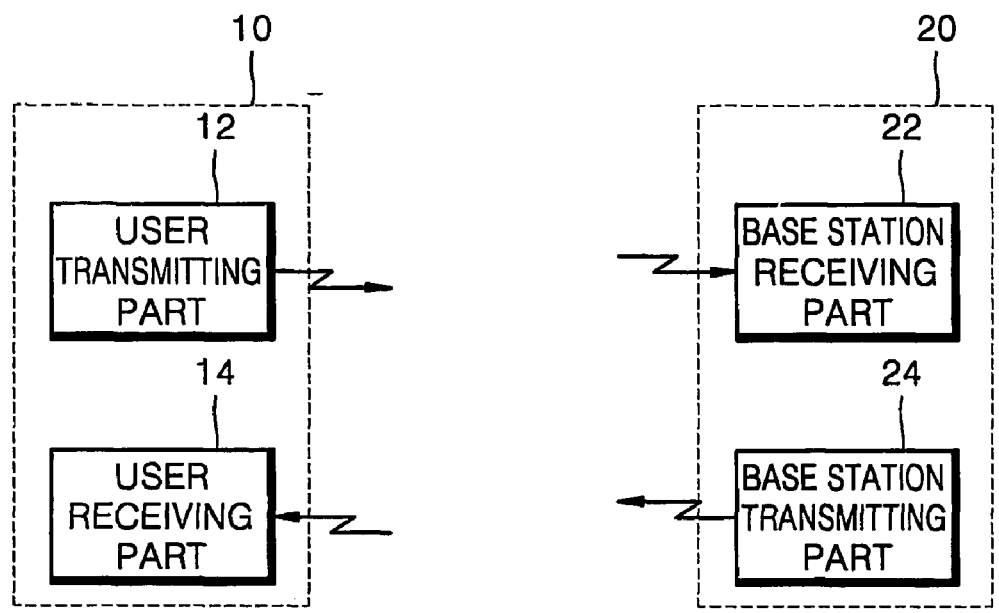
FIG. 1 is a schematic block diagram of a data communication apparatus based on orthogonal frequency division multiple access (OFDMA) according to the present invention.

FIG. 1 is a schematic block diagram of a data communication apparatus based on OFDMA according to the present invention. The data communication apparatus includes a user part 10 having a user transmitting part 12 and a user receiving part 14 and a base station part 20 having a base station receiving part 22 and a base station transmitting part 24.

There may be as many user parts 10 as the number of users communicating with the base station part 20. Each of all user parts 10 communicates with the base station part 20 as follows.

Referring to FIG. 1, the user transmitting part 12 of the data communication apparatus according to the present invention transmits user information, which is encoded as user symbol, to the base station receiving part 22. The base station receiving part 22 receives user information transmitted from at least one user transmitting part 12 and estimates a user symbol of the user part 10 from the received user information.

For this, the user transmitting part 12 can be realized as a first user transmitting unit which transmits user information to the base station receiving part 22 in units of symbol blocks (hereinafter, referred to as first symbol blocks) each composed of a predetermined number M (where M is 1 or an integer greater than 1) of main symbols and at least one additional cyclic extension symbol, or can be realized as a second user transmitting unit which transmits user information to the base station receiving part 22 in units of two first symbol blocks.

Here, the base station receiving part 22 can be realized as a first base station receiving unit which can receive a symbol block signal transmitted in first symbol block units from each of one or more first user transmitting units and estimate a user symbol of the corresponding user, or can be realized as a second base station receiving unit which can receive one among symbol block signals transmitted in two first symbol block units from each of one or more second user transmitting units and estimate at least one user symbol of the corresponding user.

For example, when the user transmitting part 12 is realized as the first user transmitting unit, the base station receiving part 22 is realized as the first base station receiving unit. When the user transmitting part 12 is realized as the second user transmitting unit, the base station receiving part 22 is realized as the second base station receiving unit.

The base station transmitting part 24 of the data communication apparatus of the present invention transmits information (hereinafter, referred to as base station information) for a certain user to at least one user receiving part 14. Here, the user receiving part 14 receives the base station information transmitted from the base station transmitting part 24 and estimates a symbol (hereinafter, referred to as a base station symbol) with respect to the certain user from the received base station information.

For this, the base station transmitting part 24 can be realized as a first base station transmitting unit which transmits base station information to at least one user receiving part 14 in units of symbol blocks (hereinafter, referred to as second symbol blocks) each composed of a predetermined number N (where N is 1 or an integer greater than 1) of main symbols and at least one cyclic extension symbol, or can be realized as a second base station transmitting unit which transmits base station information to at least one user receiving part 14 in two second symbol block units.

Here, the user receiving part 14 can be realized as a first user receiving unit which can receive a symbol block signal transmitted in second symbol block units from the first base station transmitting unit and estimate a base station symbol for a certain user, or can be realized as a second user receiving unit which can receive one among symbol block signals transmitted in two second symbol block units from the second base station transmitting unit and estimate at least one base station symbol for a certain user.

For example, when the base station transmitting part 24 is realized as the first base station transmitting unit, the user receiving part 14 is realized as the first user receiving unit. When the base station transmitting part 24 is realized as the second base station transmitting unit, the user receiving part 14 is realized as the second user receiving unit.

Hereinafter, the format of information transmitted and received between the user part 10 and the base station part 20 shown in FIG. 1 will be described with reference to the attached drawings. Here, only a first symbol block will be described. The description of a first symbol block will be applied to a second symbol block in the manner.

Figure 2:
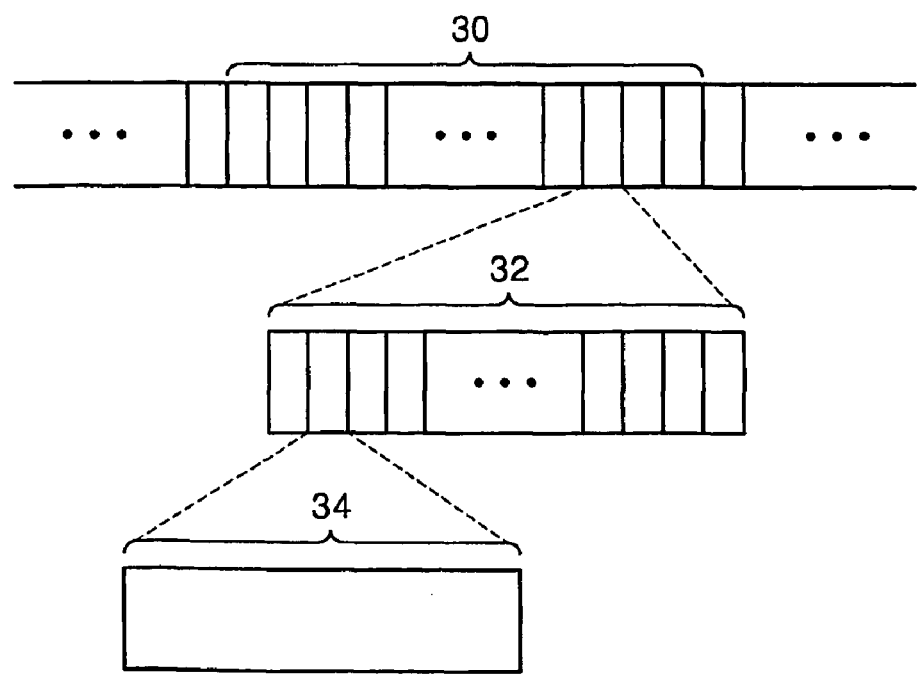
FIG. 2 is a diagram of a data format illustrating relationship among a frame, a time slot, and a first symbol block.

FIG. 2 is a diagram of a data format illustrating relationship among a frame, a time slot, and a first symbol block. Referring to FIG. 2, a unit frame 30 is composed of at least one time slot. A unit time slot 32 is composed of at least one first symbol block. When information is transmitted and received between a user and a base station according to a data communication apparatus and method of the present invention, a first symbol block 34 can be allocated to a single user or to a plurality of users at a time. In other words, according to the present invention, the scheme of allocation of the first symbol block 34 is not fixed within one frame but varies with symbol slots.

Figure 3:
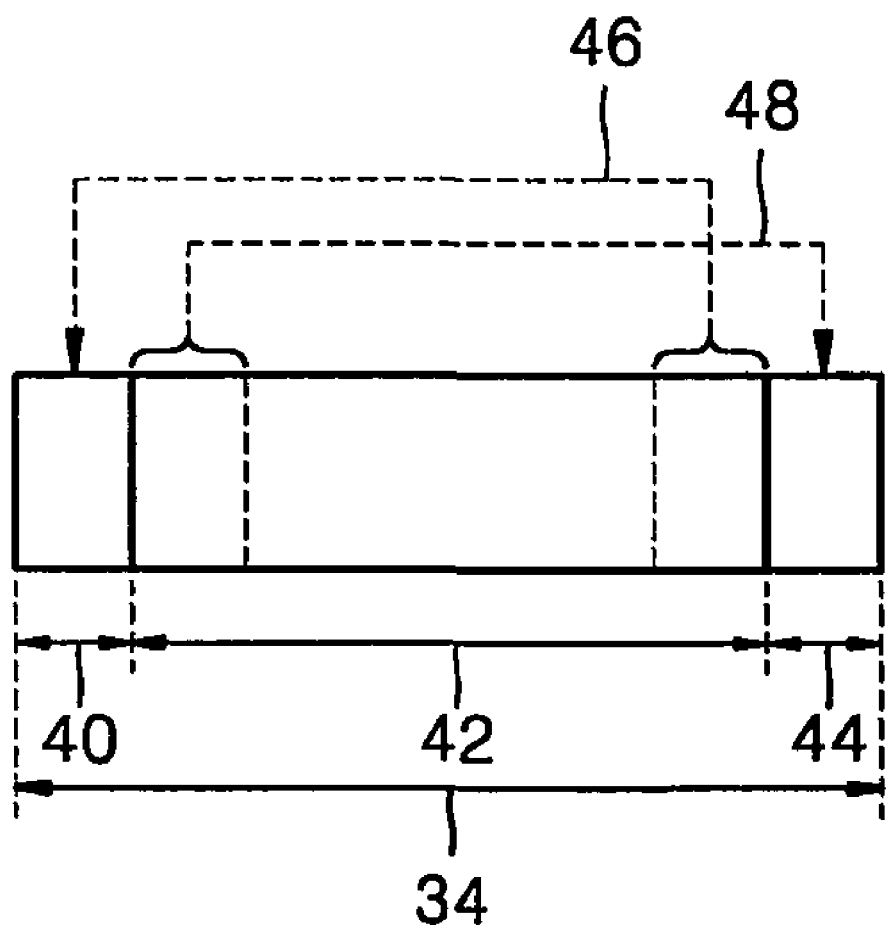
FIG. 3 is a diagram of the format of the first symbol block shown in FIG. 2.

FIG. 3 is a diagram of the format of the first symbol block 34 shown in FIG. 2. The first symbol block 34 is composed of cyclic extension symbols 40 and 44 and main symbols 42.

Referring to FIG. 3, the first symbol block 34 is composed of M main symbol(s) 42 and $N_p$ cyclic extension symbol(s) 40 (where $N_p$ is 1 or an integer greater than 1). The first symbol block 34 can additionally include $N_q$ cyclic extension symbol(s) 44 (where $N_q$ is 1 or an integer greater than 1). In other words, the cyclic extension symbol(s) 40 at the front of the first symbol block 34 is usually necessarily included in the first symbol block 34, but the cyclic extension symbol(s) 44 inserted at the rear of the first symbol block 34 can be omitted. The last $N_p$ main symbol(s) of the M main symbol(s) 42 is copied to the front of the first symbol block 34 to form the cyclic extension symbol(s) 40, as indicated by an arrow 46, and the front $N_q$ main symbol(s) of the M main symbol(s) 42 is copied to the rear of the first symbol block 34 to form the cyclic extension symbol(s) 44, as indicated by an arrow 48. Here, if M indicating the number of main symbols is set to a value of an exponential with base 2 (i.e., M∈{$2^{n'}$|n'=1, 2, 3, . . . }), a data communication apparatus according to the present invention can be much more easily realized. Here, the length $N_p$ or $N_q$ of the cyclic extension symbol(s) 40 or 44 is set to be equal to or greater than the length of a channel impulse response. When a plurality of pieces of user information transmitted from a plurality of user parts do not reach a base station part exactly at the same time, an arrival time difference is embedded into the cyclic extension symbol(s) 40 or 44.

Hereinafter, the configuration and the operations of a preferred embodiment of a first user transmitting unit and a data communication method through which the first user transmitting unit transmits user information will be described with reference to the attached drawings.

Figure 4:
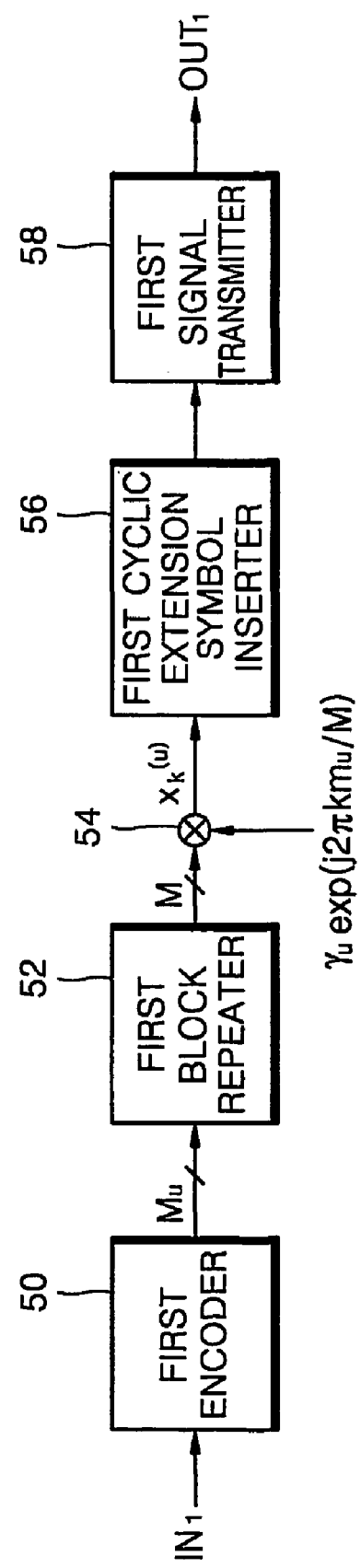
FIG. 4 is a block diagram of an embodiment of a first user transmitting unit according to the present invention.

FIG. 4 is a block diagram of an embodiment of a first user transmitting unit according to the present invention. The first user transmitting unit includes a first encoder 50, a first block repeater 52, a multiplier 54, a first cyclic extension symbol inserter 56, and a first signal transmitter 58.

Figure 5:
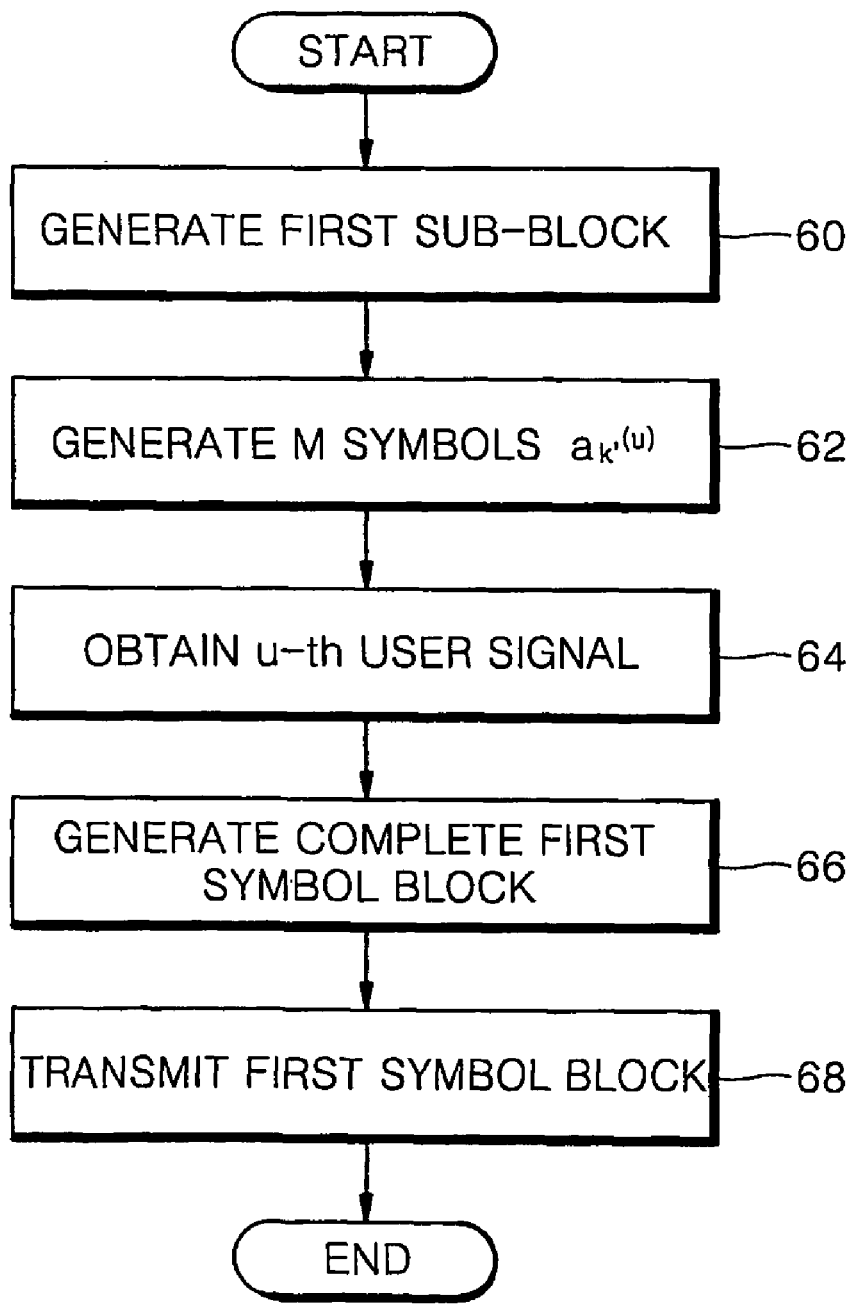
FIG. 5 is a flowchart of a data communication method performed by the first user transmitting unit according to the present invention.

FIG. 5 is a flowchart of a data communication method through which the first user transmitting unit shown in FIG. 4 transmits user information to a first base station receiving unit according to the present invention. In steps 60 and 62, M symbols are generated from a first sub-block. In steps 64 and 68, a user signal is generated from the M symbols and is wirelessly transmitted in symbol block units.

To transmit user information to the first base station receiving unit according to the present invention, in step 60, the first encoder 50 of the first user transmitting unit encodes user information received through an input terminal $IN_1$, generates a first sub-block composed of encoded $M_u$ user symbols $a_k^{(u)}$ for a u-th user, and outputs the first sub-block to the first block repeater 32. Here, $M_u$ is an integer greater than or equal to 1 and no greater than M, "k" is a time index and is an integer greater than or equal to 0 and no greater than M–1, and "u" is a user index and is an integer greater than or equal to 1 and no greater than U. U indicates the number of users sharing a first symbol block. Here, when one or more users share the first symbol block 34, each user can use only $M_u$ symbols in the first symbol block 34.

After step 60, the first block repeater 52 repeats the first sub-block received from the first encoder 50 $L_u$ time(s) to generate M symbols $a_{k'}^{(u)}$ and outputs the M symbols $a_{k'}^{(u)}$ to the multiplier 54 in step 62. Here, $L_u$=M/$M_u$, k'=k % $M_u$, and k % $M_u$ indicates the remainder when "k" is divided by $M_u$.

After step 62, the multiplier 54 multiplies the M symbols $a_{k'}^{(u)}$ received from the first block repeater 52 by $\gamma_u$ exp(j2πk$m_u$/M) and outputs the result of multiplication expressed by Formula (1) as a u-th user signal $x_k^{(u)}$ to the first cyclic extension symbol inserter 56 in step 64.

$$x_k^{(u)} = a_{k'}^{(u)} \cdot \gamma_u \exp(j2\pi k m_u/M) \quad (1)$$

Here, $\gamma_u$ indicates a magnitude control factor for the u-th user signal $x_k^{(u)}$, and may be, for example, $L_u^{-0.5}$, and $m_u$ indicates a unique frequency offset number allocated to the u-th user.

After step 64, the first cyclic extension symbol inserter 56 inserts a cyclic extension symbol into the u-th user signal $x^{k(u)}$ received from the multiplier 54 and outputs the result of insertion as a single complete first symbol block to the first signal transmitter 58 in step 66.

After step 66, the first signal transmitter 58 converts the first symbol block completed in the first cyclic extension symbol inserter 56 into a symbol block signal and transmits the symbol block signal to the first base station receiving unit through an output terminal $OUT_1$ in step 68.

Hereinafter, the configuration and the operations of a preferred embodiment of a first base station transmitting unit and a data communication method through which the first base station transmitting unit transmits base station information to a first user receiving unit will be described with reference to the attached drawings.

Figure 6:
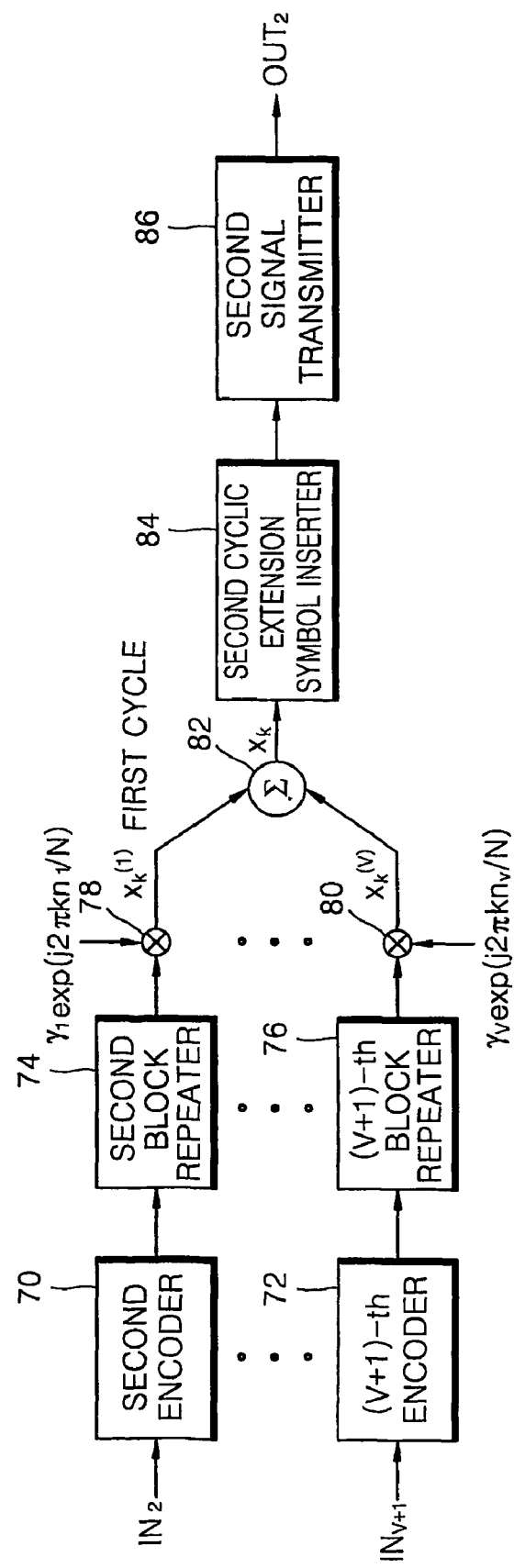
FIG. 6 is a block diagram of an embodiment of a first base station transmitting unit according to the present invention.

FIG. 6 is a block diagram of an embodiment of a first base station transmitting unit according to the present invention. The first base station transmitting unit includes second through (V+1)-th encoders 70 through 72, second through (V+1)-th block repeaters 74 through 76, V multipliers 78 through 80, a first adder 82, a second cyclic extension symbol inserter 84, and a second signal transmitter 86.

Figure 7:
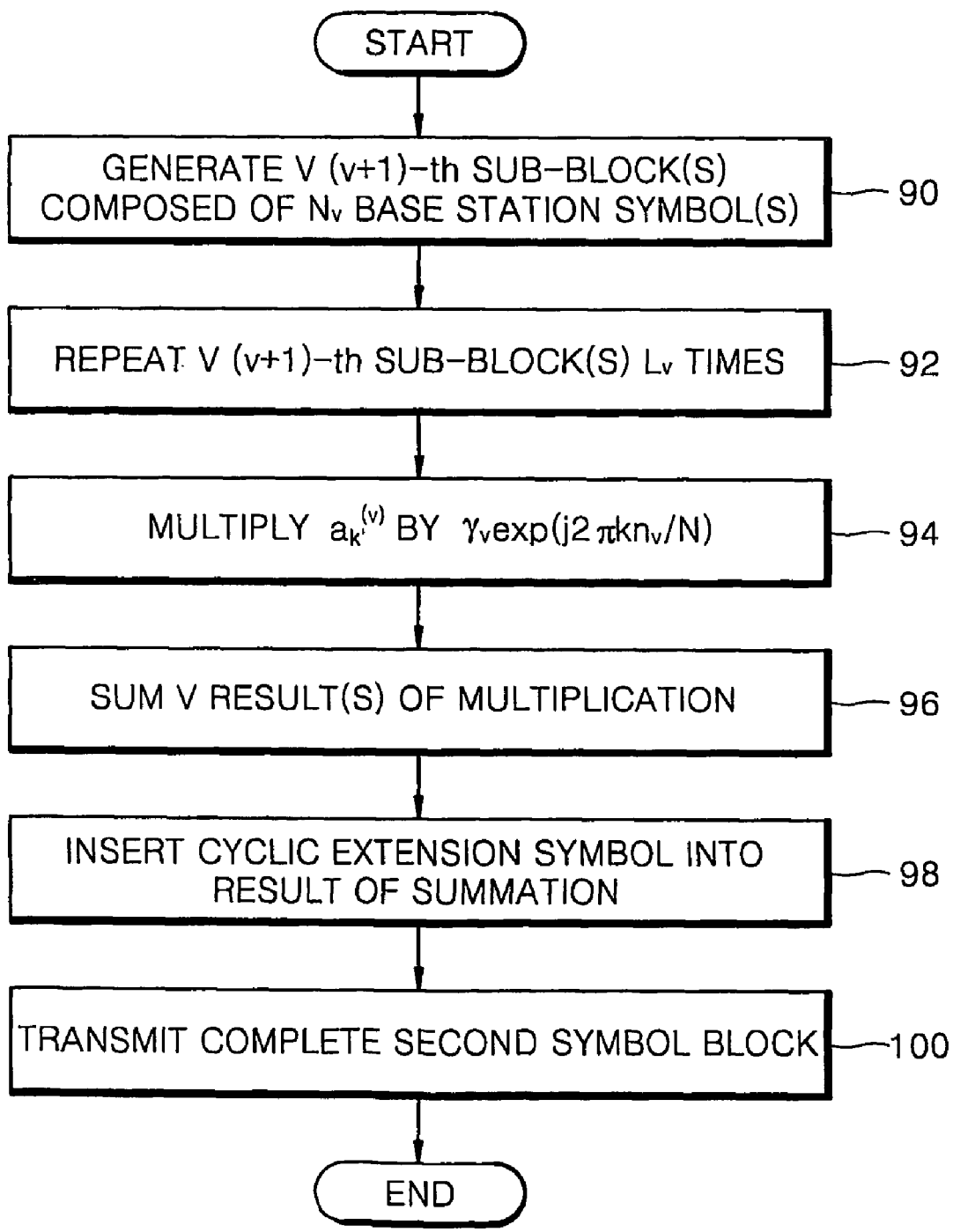
FIG. 7 is a flowchart of a data communication method performed by the first base station transmitting unit according to the present invention.

FIG. 7 is a flowchart of a data communication method through which the first base station transmitting unit shown in FIG. 6 transmits base station information to a first user receiving unit according to the present invention. In steps 90 through 100, a complete second symbol block is generated from V (v+1)-th sub-block(s). Here, V indicates the number of users sharing the second symbol block, and "v" indicates a user index and is an integer greater than or equal to 1 and less than or equal to V.

When communicating with V first user receiving unit(s), the first base station transmitting unit shown in FIG. 6 transmits base station information in second symbol block units to a v-th first user receiving unit. For this, in step 90, the second through (V+1)-th encoders 70 through 72 of the first base station transmitting unit encodes base station information received through input terminals $IN_2$ through $IN_{V+1}$, generate V (v+1)-th sub-block(s) composed of $N_v$ base station symbols $a_k^{(v)}$ each of which is a symbol for a v-th user, and output the V (v+1)-th sub-block(s) to the second through (V+1)-th block repeaters 74 through 76. Here, $N_v$ is an integer greater than or equal to 1 and no greater than N. In this case, the time index "k" is an integer greater than or equal to 0 and no greater than N-1. In other words, 0≦time index k≦number of main symbols M (or N)–1.

For example, the (v+1)-th encoder 70, . . . , or 72 encodes base station information received through an input terminal $IN_{v+1}$, generates a (v+1)-th sub-block composed of encoded $N_v$ base station symbols $a_k^{(v)}$ for a v-th user, and outputs the (v+1)-th sub-block to the (v+1)-th block repeater 74, . . . , or 76.

After step 90, each of the second through (V+1)-th block repeaters 74 through 76 repeats the (v+1)-th sub-block $L_v$ time(s) to generate N symbols $a_{k'}^{(v)}$ and outputs the N symbols $a_{k'}^{(v)}$ to the corresponding multiplier 78, . . . , or 80 in step 92. Here, $L_v$=N/$N_v$, k'=k % $N_v$, and k % $N_v$ indicates the remainder when "k" is divided by $N_v$. For example, the second block repeater 74 repeats a second sub-block received from the second encoder 70 $L_1$ time(s) to generate N symbols $a_{k'}^{(1)}$ and outputs the N symbols $a_{k'}^{(1)}$ to the corresponding multiplier 78.

After step 92, the multipliers 78 through 80 multiply symbols $a_{k'}^{(1)}$ through $a_{k'}^{(v)}$ received from the respective second through (V+1)-th block repeaters 74 through 76 by $\gamma_1$ exp(j2πk$n_1$/N) through $\gamma_v$ exp(j2πk$n_v$/N), respectively, and outputs the results $x_k^{(1)}$ through $x_k^{(V)}$ of multiplication to the first adder 82 in step 94. Each $x_k^{(v)}$ of the results $x_k^{(1)}$ through $x_k^{(V)}$ of multiplication is expressed by Formula (2).

$$x_k^{(v)} = a_{k'}^{(v)} \cdot \gamma_v \exp(j2\pi k n_v/N) \quad (2)$$

Here, $\gamma_v$ indicates a magnitude control factor for a v-th user signal, and may be, for example, $L_v^{-0.5}$, and $n_v$ indicates a unique frequency offset number allocated to a v-th user.

For example, the multiplier 78 multiplies N symbols $a_k^{(1)}$ by $\gamma_1 \exp(j2\pi k n_1/N)$ and outputs the result $x_k^{(1)}$ of multiplication to the first adder 82.

After step 94, the first adder 82 sums the results $x_k^{(1)}$ through $x_k^{(V)}$ of multiplication received from the multipliers 78 through 80 and outputs the result $x_k$ of summation which is expressed by Formula (3) to the second cyclic extension symbol inserter 84 in step 96.

$$x_k = \sum_{v=1}^{V} x_k^{(v)} \qquad (3)$$

After step 96, the second cyclic extension symbol inserter 84 inserts a cyclic extension symbol into the result $x_k$ of summation received from the first adder 82 to generate a single complete second symbol block and outputs the generated second symbol block to the second signal transmitter 86 in step 98.

After step 98, the second signal transmitter 86 converts the complete second symbol block into a symbol block signal and transmits the complete symbol block signal to the first user receiving unit through an output terminal $OUT_2$ in step 100.

Here, when the first symbol block is simultaneously allocated to U users so that the U users can transmit user information to the first base station receiving unit through the first user transmitting unit shown in FIG. 4, or when the second symbol block is simultaneously allocated to V users so that base station information can be transmitted to V first user receiving units through the first base station transmitting unit shown in FIG. 6, the condition expressed by Formula (4) must be satisfied.

$$M \geq M_1 + M_2 + M_3 + \ldots + M_U \text{ or } N \geq N_1 + N_2 + N_3 + \ldots + N_V \qquad (4)$$

In other words, the number U or V of users sharing a single first or second symbol block according to the present invention can range from a minimum of 1 to a maximum of M or N. If a single user uses a single first or second symbol block (U=1 or V=1), $M_u$=M (or $N_v$=N) and $L_u$=1 (or $L_v$=1). If M or N users share a single first or second symbol block (U=M or V=N), $M_u$=1 (or $N_v$=1) and $L_u$=M (or $L_v$=N) with respect to a u-th or v-th user.

According to the present invention, $M_u$ or $N_v$ can be set to a value of an exponential with base 2 (i.e., $M_u \in \{2^m | m=0, 1, 2, \ldots \log_2 M\}$ or $N_v \in \{2^{n'} | n'=0, 1, 2, \ldots \log_2 N\}$). Here, the user symbol $a_k^{(u)}$ or $a_k^{(v)}$ can be a quadrature amplitude modulation (QAM) symbol, a phase shift keying (PSK) symbol, or a differential PSK (DPSK) symbol.

Figure 8:
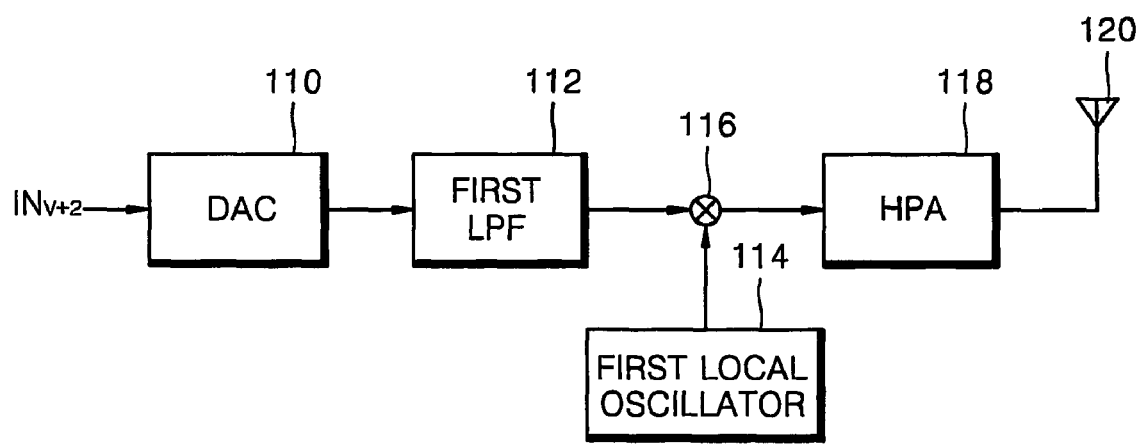
FIG. 8 is a block diagram of the general example of each of first and second signal transmitters.

FIG. 8 is a block a block diagram of the general example of each of the first and second signal transmitters 58 and 86 shown in FIGS. 4 and 6. Each of the first and second signal transmitters 58 and 86 includes a digital-to-analog converter 110 (DAC), a first low-pass filter (LPF) 112, a first local oscillator 114, a multiplier 116, a high power amplifier (HPA) 118, and an antenna 120.

Referring to FIG. 8, the DAC 110 of the first or second signal transmitter 58 or 86 converts a complete first or second symbol block received from the first or second cyclic extension symbol inserters 56 or 84 through an input terminal $IN_{V+2}$ into an analog signal and outputs the analog signal to the first LPF 112. Then, the first LPF 112 performs low-pass filtering on the analog signal received from the DAC 110 and outputs the result of low-pass filtering to the multiplier 116. The multiplier 116 multiplies the output of the first LPF 112 by a carrier signal having a frequency fc, which is output from the first local oscillator 114 to thus modulate the output of the first LPF 112 to form a signal having a center frequency of fc and outputs the result of modulation to the HPA 118. Then, the HPA 118 amplifies the output of the multiplier 116. The result of amplification is transmitted to a first base station receiving unit or a first user receiving unit through the antenna 120.

Hereinafter, the configuration and the operations of a preferred embodiment of a first base station receiving unit and a data communication method through which the first base station receiving unit estimates a user symbol will be described with reference to the attached drawings.

Figure 9:
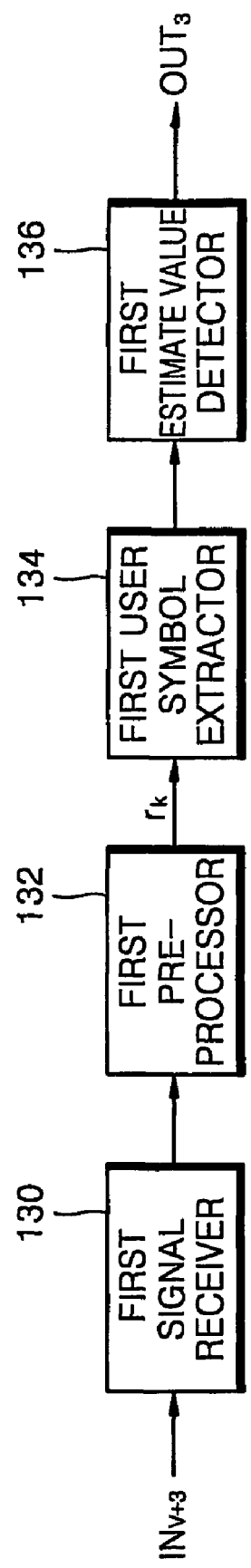
FIG. 9 is a block diagram of an embodiment of a first base station receiving unit according to the present invention.

FIG. 9 is a block diagram of an embodiment of a first base station receiving unit according to the present invention. The first base station receiving unit includes a first signal receiver 130, a first pre-processor 132, a first user symbol extractor 134, and a first estimate value detector 136.

Figure 10:
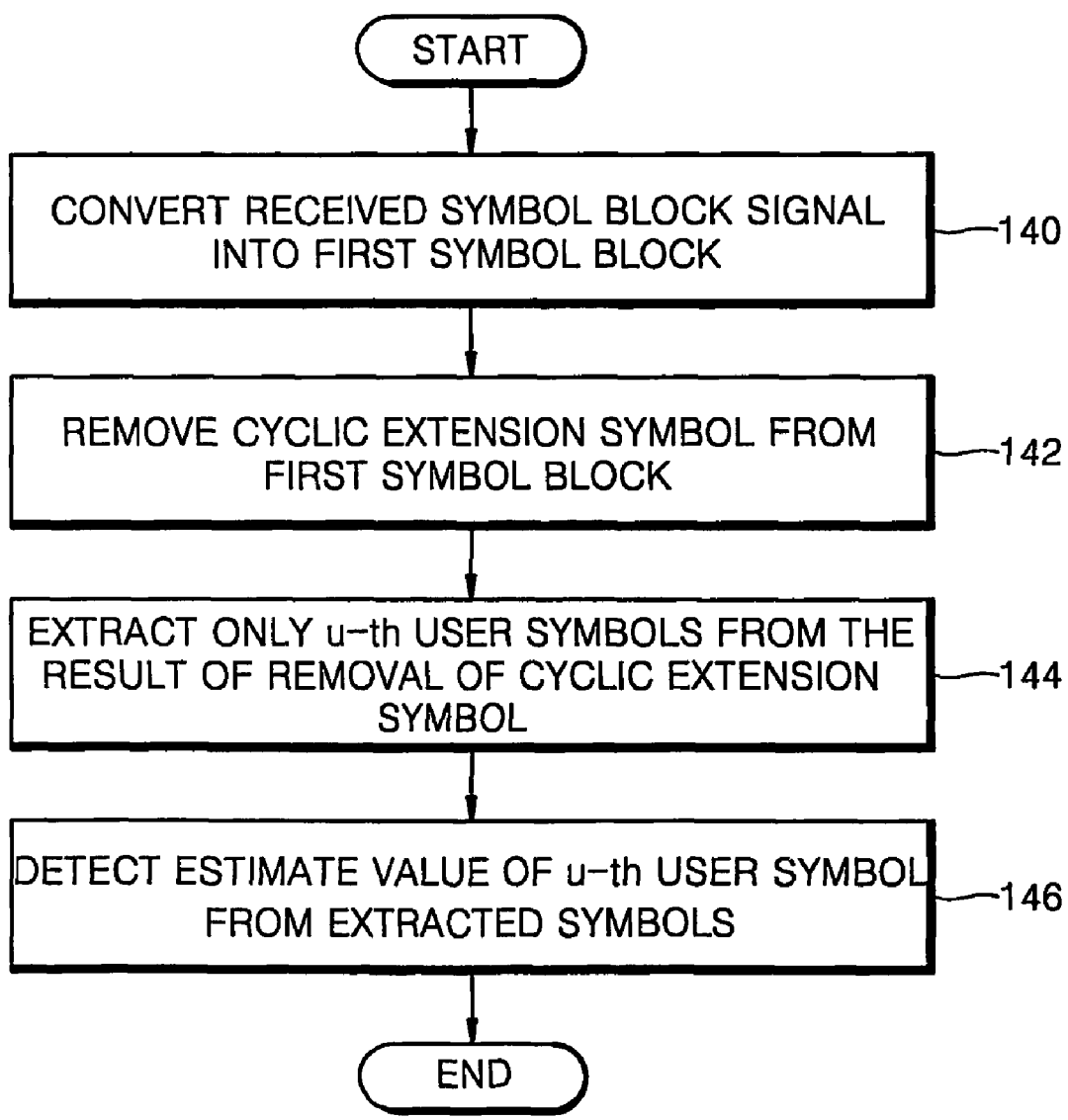
FIG. 10 is a flowchart of a data communication method performed by the first base station receiving unit according to the present invention.

FIG. 10 is a flowchart of a data communication method through which the first base station receiving unit shown in FIG. 9 estimates a user symbol according to the present invention. In steps 140 through 146, user symbols are extracted from a received symbol block signal and an estimate value of a user symbol from the extracted user symbols.

The first signal receiver 130 of the first base station receiving unit shown in FIG. 9 receives one of symbol block signals transmitted from U first user transmitting unit(s) through an input terminal $IN_{V+3}$, converts the received symbol block signal into a first symbol block, and outputs the first symbol block to the first pre-processor 132 in step 140.

After step 140, the first pre-processor 132 finds a start point of the first symbol block received from the first signal receiver 130, removes a cyclic extension symbol from the first symbol block on the basis of the start point, and outputs the result $r_k$ of removal of the cyclic extension symbol to the first user symbol extractor 134 in step 142.

After step 142, the first user symbol extractor 134 extracts only u-th user symbols from the result $r_k$ of removal of the cyclic extension symbol received from the first pre-processor 132 and outputs the extracted u-th user symbols to the first estimate value detector 136 in step 144.

After step 144, the first estimate value detector 136 detects an estimate value $\hat{a}_k^{(u)}$ of a user symbol for a u-th user from the extracted u-th user symbols received from the first user symbol extractor 134 and outputs the $\hat{a}_k^{(u)}$ through an output terminal $OUT_3$ in step 146.

Hereinafter, the configurations and the operations of preferred embodiments of the present invention of the respective first user symbol extractor 134 and first estimate value detector 136 shown in FIG. 9 and the steps 144 and 146 shown in FIG. 10, which are performed in the embodiments of the respective first user symbol extractor 134 and first estimate value detector 136, respectively, according to the present invention will be described with reference to the attached drawings.

The following description concerns first and second embodiments 134A and 134B of the first user symbol extractor 134 and a first embodiment 136A of the first estimate value detector 136 in the case where a symbol block signal having a first symbol block transmitted from a first user transmitting unit through an additive white Gaussian noise (AWGN) channel to which white Gaussian noise is added is input through the input terminal $IN_{V+3}$.

Figure 11:
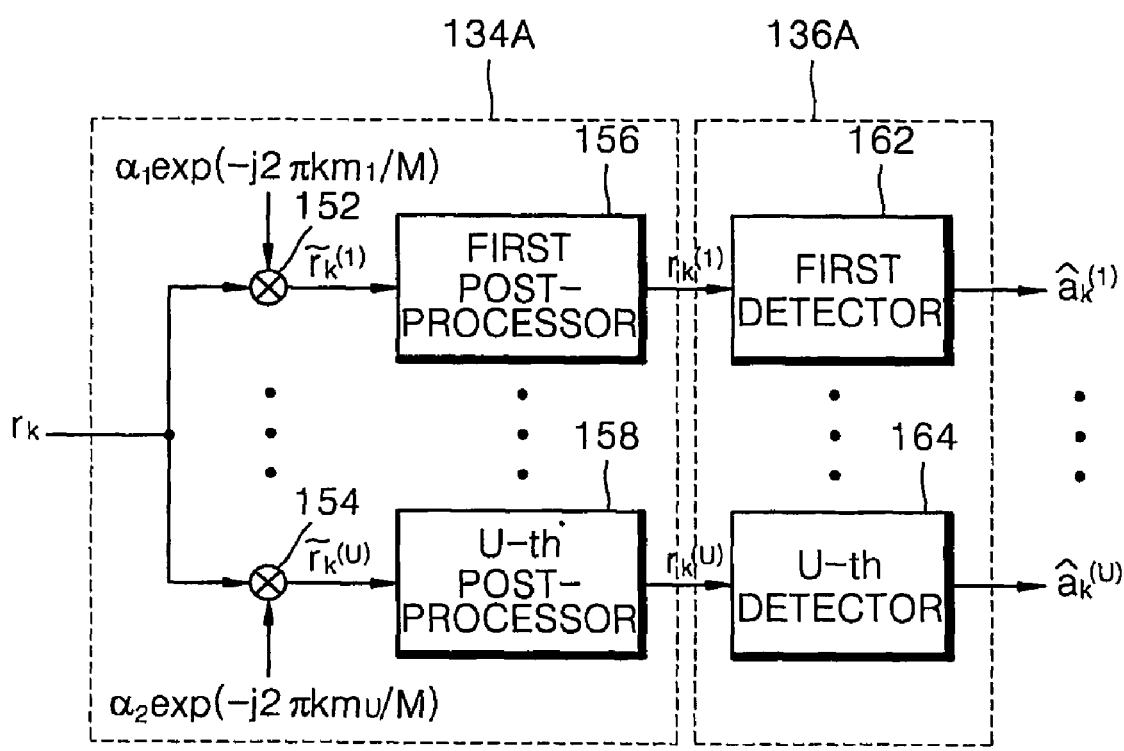
FIG. 11 is a block diagram of a first embodiment of a first user symbol extractor and a first estimate value detector according to the present invention.

FIG. 11 is a block diagram showing first preferred embodiments 134A and 136A of the first user symbol extractor 134 and the first estimate value detector 136 shown in FIG. 9 according to the present invention. The first user symbol extractor 134A includes U multipliers 152 through 154 and first through U-th post-processors 156 through 158. The first estimate value detector 136A includes first through U-th detectors 162 through 164.

Referring to FIG. 11, the multipliers 152 through 154 of the first user symbol extractor 134A performing the step 144 multiply the result $r_k$ of removal obtained in step 142 and received from the first pre-processor 132 by $\alpha_1$ exp(−j2πkm$_1$/M) through $\alpha_U$ exp(−j2πkm$_U$/M) and output the results $\tilde{r}_k^{(1)}$ through $\tilde{r}_k^{(U)}$ of multiplication as user signals $\tilde{r}_k^{(1)}$ through $\tilde{r}_k^{(U)}$ to the first through U-th post-processors 156 through 158, respectively. Here, $r_k$ contains white Gaussian noise $n_k$, and $\alpha_u$ indicates a magnitude control factor, which may be, for example, $L_u^{-0.5}$. For example, the multiplier 152 multiplies the result $r_u$ of removal received from the first pre-processor 132 by $\alpha_1$ exp(−j2πkm$_1$/M) and outputs the result $\tilde{r}_k^{(1)}$ of multiplication as a first user signal $\tilde{r}_k^{(1)}$ to the first post-processor 156.

Then, the first through U-th post-processors 156 through 158 fold and add the results $\tilde{r}_k^{(1)}$ through $\tilde{r}_k^{(U)}$ of multiplication received from the respective multipliers 152 through 154 with a period of $M_u$, and output the results $r_k^{(1)}$ through $r_k^{(U)}$ of folding and addition to the first through U-th detectors 162 through 164, respectively. For example, the u-th post-processor among the first through U-th post-processors 156 through 158 folds and adds the u-th user signal $\tilde{r}_k^{(u)}$ received from the corresponding multiplier 152, . . . , or 154 with a period of $M_u$, and outputs the result of folding and addition as a u-th user symbol $r_k^{(u)}$ expressed by Formula (5) to the u-th detector among the first through U-th detectors 162 through 164.

$$r_k^{(u)} = \sum_{l=0}^{L_u-1} \tilde{r}_{k+lM_u}^{(u)} \quad (5)$$

Here, k=0, 1, . . . , or $M_u$−1.

Accordingly, for $r_k^{(u)}$ output from the u-th post-processor 156, . . . , or 158, only a u-th user symbol $a_k^{(u)}$ is left and all other user symbols counterbalance each other as expressed by Formula (6).

$$r_k^{(u)} = (\alpha_u \gamma_u L^u) \cdot a_k^{(u)} + n_k' \quad (6)$$

Here, $n_k'$ indicates a white Gaussian noise component, and k=0, 1, . . . , or $M_u$−1.

The first through U-th detectors 162 through 164 of the first estimate value detector 136A performing the step 146 detect estimate values $\hat{a}_k^{(1)}$ through $\hat{a}_k^{(U)}$ from the user symbols $r_k^{(1)}$ through $r_k^{(U)}$ received from the first through U-th post-processors 156 through 158, respectively. For example, the u-th detector 162, . . . or 164 detects an estimate value a(u) for a user symbol from the u-th user symbol $r_k^{(u)}$ received from the u-th post-processor 156, . . . , or 158. Here, if $\alpha_u \gamma u = 1/L_u$ is set, the estimate value $\hat{a}_k^{(u)}$ can be easily detected.

Figure 12:
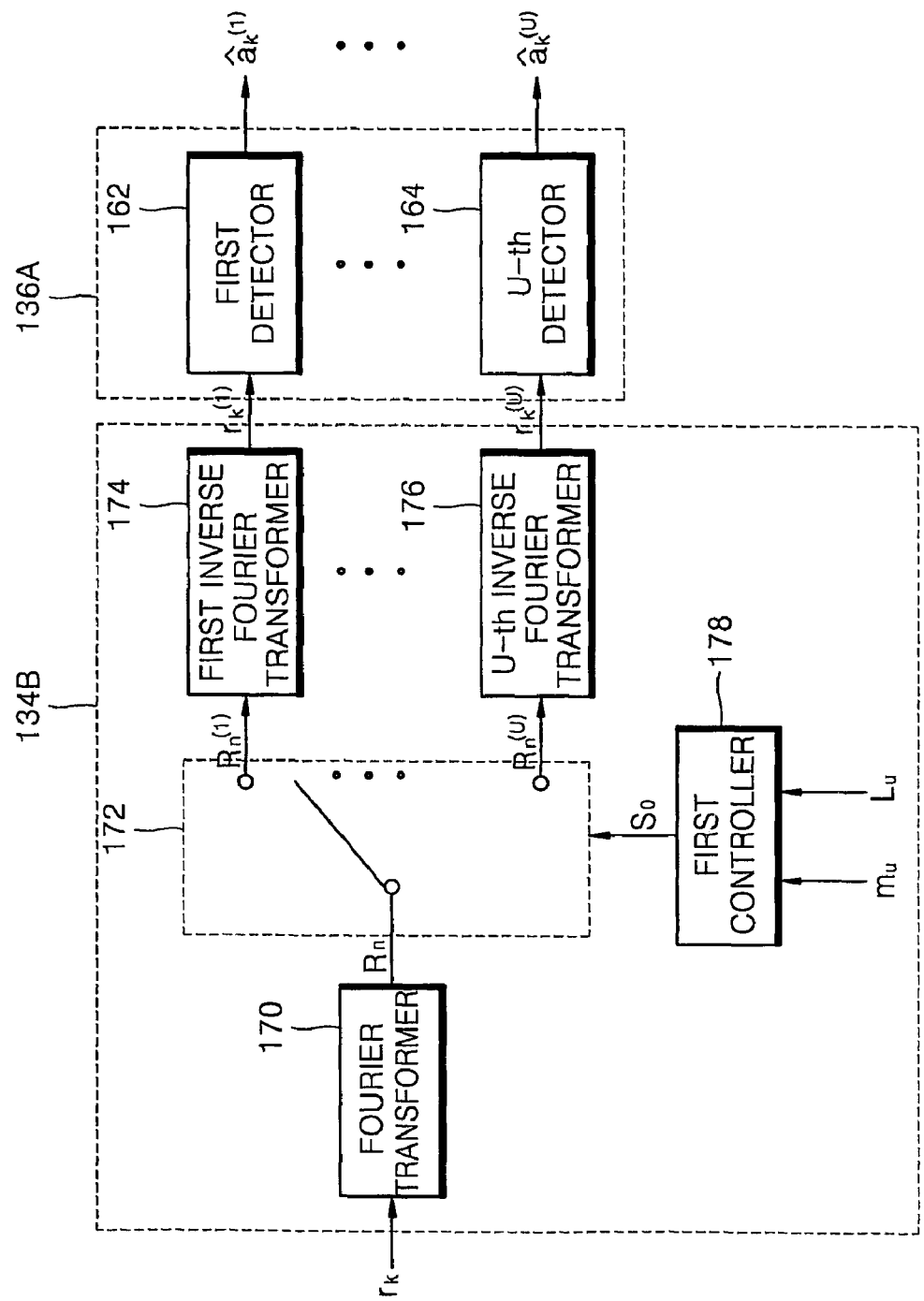
FIG. 12 is a block diagram of a second embodiment of the first user symbol extractor and the first estimate value detector according to the present invention.

FIG. 12 is a block diagram showing a second embodiment 134B of the first user symbol extractor 134 and the first embodiment 136A of the first estimate value detector 136 shown in FIG. 9 according to the present invention. The first user symbol extractor 134B includes a Fourier transformer 170, a distributor 172, a first controller 178, and first through U-th inverse Fourier transformers 174 through 176. The first estimate value extractor 136A includes the first through U-th detectors 162 through 164.

Referring to FIG. 12, the Fourier transformer 170 of the first user symbol extractor 134B performing the step 144 performs M-point Fourier transform on $r_k$ which is obtained in step 142 and which is received from the first pre-processor 132 and contains white Gaussian noise $n_k$ and outputs the result $R_n$ (where "n" indicates a frequency factor and is an integer greater than or equal to 0 and no greater than M−1) of Fourier transform to the distributor 172.

Here, when the result $R_n$ of Fourier transform output from the Fourier transformer 170 is the result $R_n^{(u)}$ of Fourier transform with respect to a u-th user, $M_u$-point inverse Fourier transform is performed on $R_n^{(u)}$ to obtain u-th user symbols $r_k^{(u)}$, and the procedure goes to step 146. For this, the first user symbol extractor 134B may include the distributor 172, the first controller 178, and the first through U-th inverse Fourier transformers 174 through 176. Here, the distributor 172 outputs $R_n$ received from the Fourier transformer 170 to the corresponding inverse Fourier transformer 174, . . . , or 176 in response to a selection signal $S_0$ output from the first controller 178. For example, the distributor 172 outputs the signal $R_n^{(u)}$ for the u-th user to the u-th inverse Fourier transformer 174, . . . , or 176. The first controller 178 generates the selection signal $S_0$ in response to $L_u$ and a unique frequency offset number $m_u$ previously allocated to the u-th user and outputs the selection signal $S_0$ to the distributor 172. The u-th inverse Fourier transformer 174, . . . , or 176 selected by the distributor 172 from among the first through U-th inverse Fourier transformers 174 through 176 performs $M_u$-point inverse Fourier transform on $R_n^{(u)}$ received from the distributor 172 and outputs the result of inverse Fourier transform as a u-th user symbol $r_k^{(u)}$ to the u-th detector 162, . . . , or 164.

The first estimate value detector 136A shown in FIG. 12 has the same configuration and performs the same operations as the first estimate value detector 136A shown in FIG. 11. Thus, a description thereof will be omitted.

The following description concerns other embodiments 134C, 134D, and 134E of the first user symbol extractor 134 and a second embodiment 136B of the first estimate value detector 136 in the case where a symbol block signal for a first symbol block which has interference generated when it is transmitted from a first user transmitting unit through a fading channel, is input through the input terminal $IN_{V+3}$.

Here, when it is assumed that the length L of channel impulse response $h_k$ is shorter than the length of a cyclic extension symbol, if the first pre-processor 132 removes the cyclic extension symbol from a first symbol block, interference between first symbol blocks is removed, and the result $r_k$ of removal output from the first pre-processor 132 for a single symbol block time is expressed by Formula (7).

$$r_k = \sum_{l=0}^{L-1} x_{(k-l+M)\%M} h_l + n_k = x_k \otimes h_k + n_k \quad (7)$$

Here, k=0, 1, . . . , or N−1, and $x_k$ indicates a user signal before a cyclic extension symbol is inserted by the first user transmitting unit, for example, the output of the multiplier 54 shown in FIG. 4. In addition, (k−l+M)% M indicates the remainder when (k−l+M) is divided by M, and ⊗ indicates circular convolution. In other words, for $r_k$ with respect to each block, circular convolution is performed on a user signal $x_k$ and a channel impulse response $h_k$.

Figure 13:
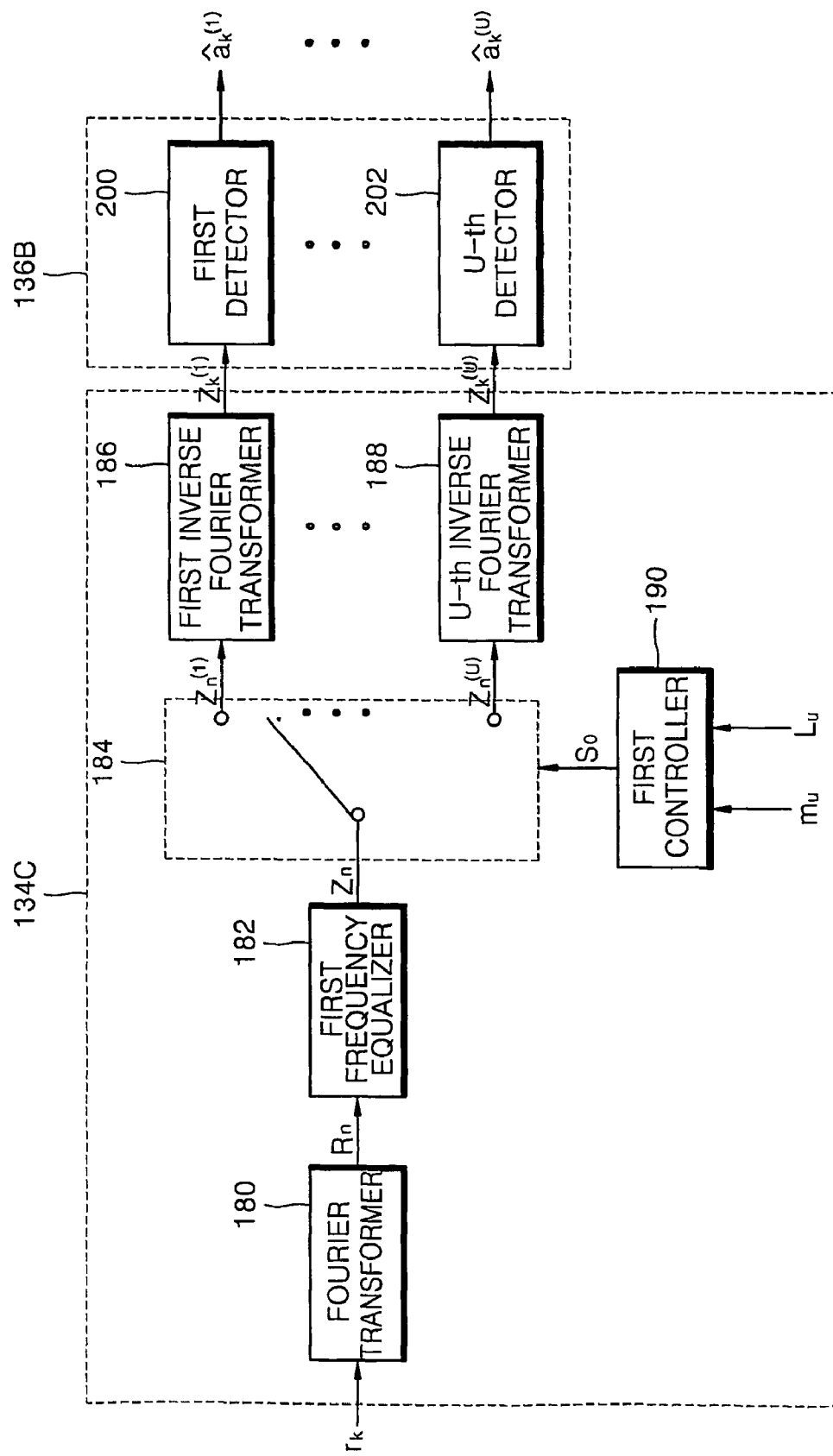
FIGS. 13 through 15 are block diagrams of other embodiments of the first user symbol extractor and the first estimate value detector according to the present invention.

FIG. 13 is a block diagram showing a third embodiment 134C of the first user symbol extractor 134 shown in FIG.

9 and a second embodiment 136B of the first estimate value detector 136 shown in FIG. 9 according to the present invention. The first user symbol extractor 134C includes a Fourier transformer 180, a first frequency equalizer 182, a distributor 184, first through U-th inverse Fourier transformers 186 through 188, and a first controller 190. The first estimate value extractor 136B includes the first through U-th detectors 200 through 202.

The first user symbol extractor 134C shown in FIG. 13 has the same configuration as the first user symbol extractor 134B shown in FIG. 12 with the exception that the first user symbol extractor 134C further includes the first frequency equalizer 182 between the Fourier transformer 180 and the distributor 184.

For example, the Fourier transformer 180 shown in FIG. 13 performs M-point Fourier transform on $r_k$ which is output from the first pre-processor 132 in step 142 and is expressed by Formula (7) and outputs the result $R_n$ of Fourier transform to the first frequency equalizer 182. Then, the first frequency equalizer 182 performs compensation on the phase and size of the result $R_n$ of Fourier transform received from the Fourier transformer 180 and outputs the result $Z_n$ of compensation to the distributor 184. In other words, the first frequency equalizer 182 serves to remove interference (hereinafter, referred to as interchannel interference) occurring when the symbol block signal is transmitted from the first user transmitting unit through a fading channel from a frequency domain. For this, the first frequency equalizer 182 can multiply the result $R_n$ of Fourier transform received from the Fourier transformer 180 by a first predetermined complex number and output the result $Z_n$ of multiplication as the result of compensation to the distributor 184.

Here, when the result $Z_n$ of compensation output from the first frequency equalizer 182 is the result $Z_n^{(u)}$ of compensation with respect to a u-th user, $M_u$-point inverse Fourier transform is performed on $Z_n^{(u)}$ to obtain a u-th user symbol $z_k^{(u)}$, and the procedure goes to step 146. For this, the first user symbol extractor 134C may include the distributor 184, the first through U-th inverse Fourier transformers 186 through 188, and the first controller 190. The distributor 184 outputs $Z_n$ received from the first frequency equalizer 182 to the corresponding inverse Fourier transformer 186, . . . , or 188 in response to a selection signal $S_0$ input from the first controller 190. For example, the distributor 184 outputs the signal $Z_n^{(u)}$ for the u-th user to the u-th inverse Fourier transformer 186, . . . , or 188. Like the first controller 178 shown in FIG. 12, the first controller 190 generates the selection signal $S_0$ in response to $L_u$ and a unique frequency offset number $m_u$ previously allocated to the u-th user and outputs the selection signal $S_0$ to the distributor 184. The u-th inverse Fourier transformer among the first through U-th inverse Fourier transformers 186, . . . , and 188 performs $M_u$-point inverse Fourier transform on $Z_n^{(u)}$ received from the distributor 184 and outputs the result of inverse Fourier transform as a u-th user symbol $z_k^{(u)}$ to the first estimate value detector 136B.

To perform the step 146, the u-th detector 200, . . . or 202 of the first estimate value detector 136B detects an estimate value $\hat{a}_k^{(u)}$ from the u-th user symbol $z_k^{(u)}$ received from the u-th inverse Fourier transformer 186, . . . , or 188.

Figure 14:
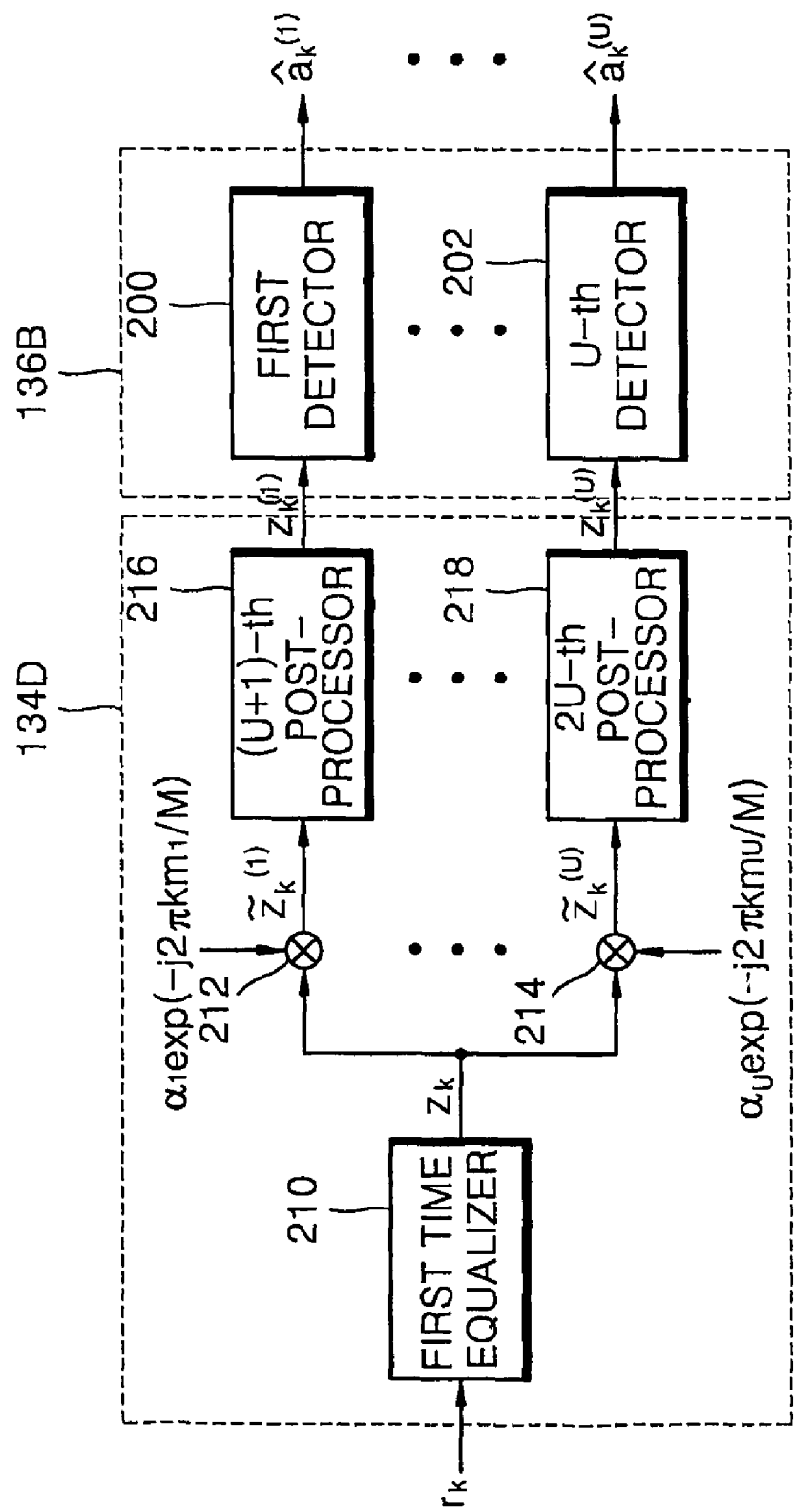

FIG. 14 is a block diagram showing a fourth embodiment 134D of the first user symbol extractor 134 shown in FIG. 9 and the second embodiment 136B of the first estimate value detector 136 shown in FIG. 9. The first user symbol extractor 134D includes a first time equalizer 210, U multipliers 212 through 214, and (U+1)-th through 2U-th post-processors 216 through 218. The first estimate value detector 136B includes first through U-th detectors 200 through 202.

To perform step 144, the first time equalizer 210 shown in FIG. 14 removes interchannel interference from $r_k$ in a time domain, which is output from the first pre-processor 132 in step 142 and is expressed by Formula (7), and outputs the result $z_k$ of removal of interchannel interference to the multipliers 212 through 214. Then, the multipliers 212 through 214 multiply the result $z_k$ of removal of interchannel interference received from the first time equalizer 210 by $\alpha_1$ exp($-j2\pi km_1/M$) through $\alpha_U$ exp($-j2\pi km_U/M$) and output the results $\tilde{z}_k^{(1)}$ through $\tilde{z}_k^{(U)}$ of multiplication as user signals to the (U+1)-th through 2U-th post-processors 216 through 218, respectively. For example, the u-th multiplier 212, . . . , or 214 multiplies the result $z_k$ of removal of interchannel interference received from the first time equalizer 210 by $\alpha_u$ exp($-j2\pi km_u/M$) and outputs the result of multiplication as a u-th user signal $\tilde{z}_k^{(u)}$ to the (U+u)-th post-processor 216, . . . , or 218. Then, the (U+1)-th through 2U-th post-processors 216 through 218 fold and add the user signals $\tilde{z}_k^{(1)}$ through $\tilde{z}_k^{(U)}$ input from the multipliers 212, . . . , and 214, respectively, with a period of $M_u$ to generate user symbols $z_k^{(1)}$ through $z_k^{(U)}$ and output the user symbols $z_k^{(1)}$ through $z_k^{(U)}$ to the respective first through U-th detectors 200 through 202. For example, the (U+u)-th post-processor 216, . . . , or 218 folds and adds u-th user signals $\tilde{z}_k^{(u)}$ input from the u-th multiplier 212, . . . , or 214 with a period of $M_u$ according to Formula (8) and outputs the result of folding and addition as a u-th user symbol $z_k^{(u)}$ to the u-th detector 200, . . . , or 202.

$$z_k^{(u)} = \sum_{l=0}^{L_u-1} \tilde{z}_{k+l \cdot M_u}^{(u)} \quad (8)$$

Here, k=0, 1, . . . , or $M_u-1$.

The first estimate value detector 136B shown in FIG. 14 has the same configuration and performs the same operations as the first estimate value detector 136B shown in FIG. 13. Thus, a description thereof will be omitted.

Figure 15:
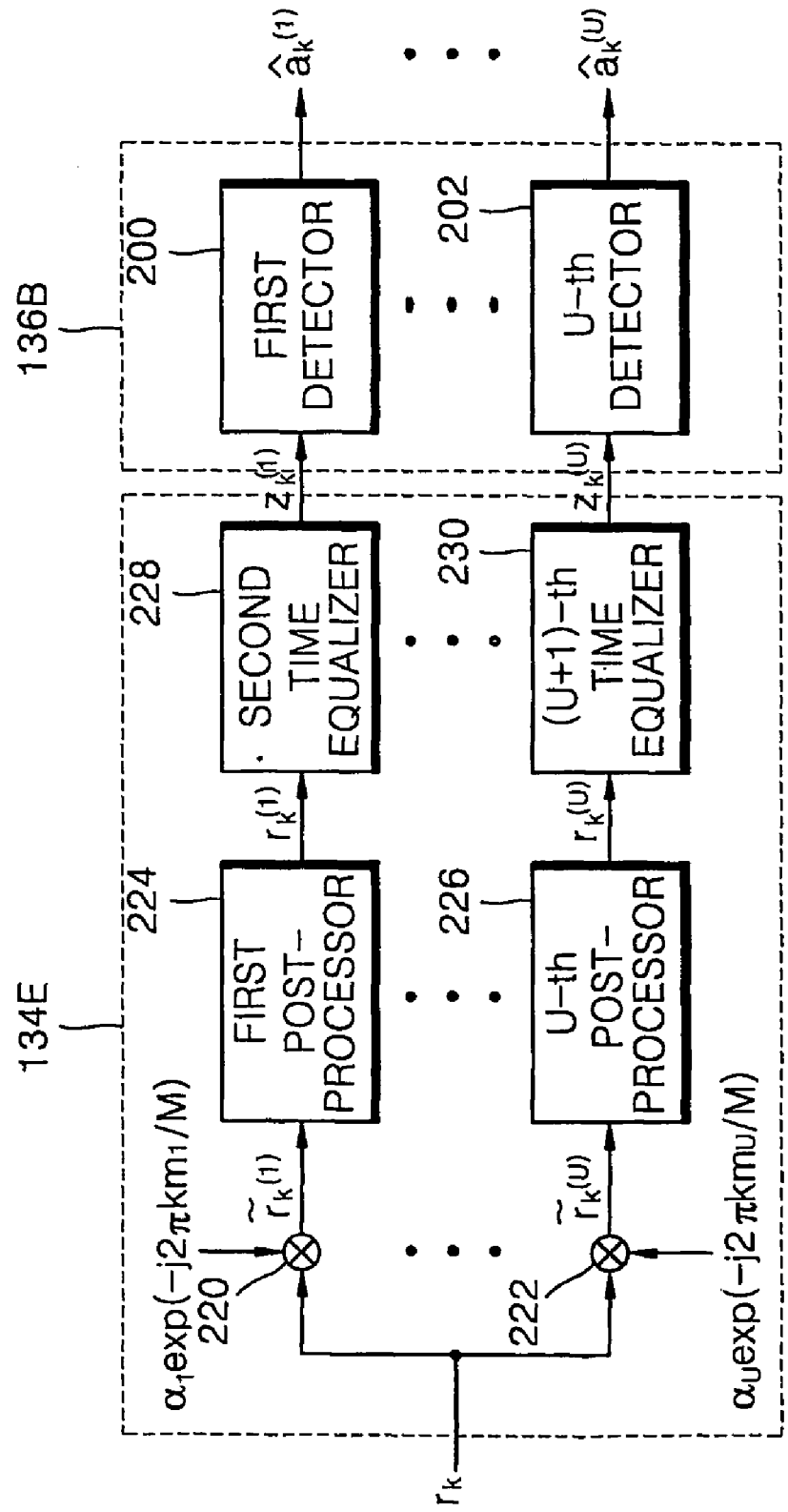

FIG. 15 is a block diagram showing a fifth embodiment 134E of the first user symbol extractor 134 shown in FIG. 9 and the second embodiment 136B of the first estimate value detector 136 shown in FIG. 9. The first user symbol extractor 134E includes U multipliers 220 through 222, first through U-th post-processors 224 through 226, and second through (U+1) time equalizers 228 through 230. The first estimate value detector 136B includes first through U-th detectors 200 through 202.

The following description concerns a procedure through which the first user symbol extractor 134E performs the step 144.

The U multipliers 220 through 222 multiply $r_k$, which is output from the first pre-processor 132 in step 142 and is expressed by Formula (7), by $\alpha_1$ exp($-j2\pi km_1/M$) through $\alpha_U$ exp($-j2\pi km_U/M$) and output the results $\tilde{r}_k^{(1)}$ through $\tilde{r}_k^{(U)}$ of multiplication as user signals to the first through U-th post-processors 224 through 226, respectively. For example, the u-th multiplier 220, . . . , or 222 multiplies $r_k$ received from the first pre-processor 132 by $\alpha_u$ exp($-j2\pi km_u/M$) and outputs the result of multiplication as a u-th user signal $\tilde{r}_k^{(u)}$ to the u-th post-processor 224, . . . , or 226.

Then, the first through U-th post-processors 224 through 226 performing the same function as the first through U-th post-processors 156 through 158 shown in FIG. 11 fold and add the user signals $\tilde{r}_k^{(1)}$ through $\tilde{r}_k^{(U)}$ input from the multipliers 220, . . . , and 222, respectively, with a period of $M_u$ and output the results $r_k^{(1)}$ through $r_k^{(U)}$ of folding and addition to the respective second through (U+1)-th time equalizers 228 through 230. For example, the u-th post-processor 224, . . . , or 226 folds and adds u-th user signals $\tilde{r}_k^{(u)}$ input from the u-th multiplier 220, . . . , or 222 with a period of $M_u$ according to Formula (9) and outputs the result $r_k^{(u)}$ of folding and addition to the (u+1)-th time equalizer 228, . . . , or 230.

$$r_k^{(u)} = (\gamma_u \alpha_u L_u) \sum_{l=0}^{L-1} a_{(k+M-l)\% M_u} \exp(-j2\pi l m_u / M) \cdot h_l + n_k' \quad (9)$$

Here, k=0, 1, . . . , or $M_u$–1, and (k+M–l)% $M_u$ indicates the remainder when (k+M–l) is divided by $M_u$.

Then, the second through (U+1)-th time equalizers 228 through 230 remove in a time domain interchannel interference from $r_k^{(1)}$ through $r_k^{(U)}$, which are output from the first through U-th post-processors 224 through 226, and output the results of removal of interchannel interference as user symbols $z_k^{(1)}$ through $z_k^{(U)}$ to the first through U-th detectors 200 through 202, respectively. For example, the (u+1)-th time equalizer 228, . . . , or 230 removes interchannel interference from $r_k^{(u)}$ output from the u-th post-processor 224, . . . , or 226 and outputs the result $z_k^{(u)}$ of removal of interchannel interference as a u-th user symbol to the u-th detector 200, . . . , or 202.

The first estimate value detector 136B shown in FIG. 15 has the same configuration and performs the same operations as the first estimate value detector 136B shown in FIG. 13. Thus, a description thereof will be omitted.

Each of the first user symbol extractors 134B and 134C shown in FIGS. 12 and 13 extracts user symbols in a frequency domain, and each of the first user symbol extractors 134A, 134D, and 134E shown in FIGS. 11, 14, and 15 extracts user symbols in a time domain.

If $M_u$ is less than M, the hardware size of the (u+1)-th time equalizer 228, . . . , or 230 shown in FIG. 15 is smaller than that of the first time equalizer 210 shown in FIG. 14.

Hereinafter, the configuration and the operations of a preferred embodiment of the present invention of a first user receiving unit and a data communication method of the present invention through which the first user receiving unit estimates a base station symbol will be described with reference to the attached drawings.

Figure 16:
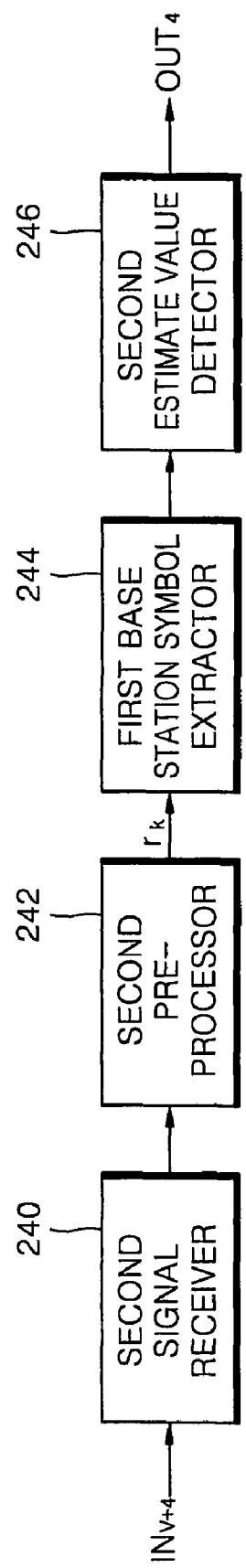
FIG. 16 is a block diagram of an embodiment of a first user receiving unit according to the present invention.

FIG. 16 is a block diagram of an embodiment of a first user receiving unit according to the present invention. The first user receiving unit includes a second signal receiver 240, a second pre-processor 242, a first base station symbol extractor 244, and a second estimate value detector 246.

FIG. 17 is a flowchart of a data communication method through which the first user receiving unit shown in FIG. 16 estimates a base station symbol according to the present invention. In steps 250 through 256, symbols for a v-th user are extracted from a received symbol block signal and an estimate value of a base station symbol from the extracted symbols.

The second signal receiver 240 of the first user receiving unit shown in FIG. 16 receives a symbol block signal transmitted from a first base station transmitting unit through an input terminal $IN_{V+4}$, converts the received symbol block signal into a second symbol block, and outputs the second symbol block to the second pre-processor 242 in step 250.

After step 250, the second pre-processor 242 finds a start point of the second symbol block received from the second signal receiver 240, removes a cyclic extension symbol from the second symbol block on the basis of the start point, and outputs the result $r_k^-$ of removal of cyclic extension symbol to the first base station symbol extractor 244 in step 252.

After step 252, the first base station symbol extractor 244 extracts symbols only for the v-th user from the result $r_k^-$ of removal received from the second pre-processor 242 and outputs the extracted symbols to the second estimate value detector 246 in step 254.

After step 254, the second estimate value detector 246 detects an estimate value $\hat{a}_k^{(v)}$ of a base station symbol for the v-th user from the extracted symbols for the v-th user received from the first base station symbol extractor 244 and outputs the $\hat{a}_k^{(v)}$ through an output terminal $OUT_4$ in step 256.

Hereinafter, the configurations and the operations of preferred embodiments of the first base station symbol extractor 244 shown in FIG. 16 and the step 254 of a data communication method according to the present invention performed in the respective embodiments will be described with reference to the attached drawings.

The following description concerns first and second embodiments 244A and 244B of the first base station symbol extractor 244 in the case where a symbol block signal having a second symbol block transmitted from a first base station transmitting unit through an AWGN channel to which white Gaussian noise is added is input through the input terminal $IN_{V+4}$.

FIG. 18 is a block diagram of the first embodiment 244A of the first base station symbol extractor 244 shown in FIG. 16 according to the present invention. The first base station symbol extractor 244A includes a multiplier 260 and a (2U+1)-th post-processor 262.

The multiplier 260 of the first base station symbol extractor 244A performing the step 254 multiplies rk, which contains white Gaussian noise nk and is output from the second pre-processor 242 in step 252, by $\alpha_v \exp(-j2\pi k n_v/N)$ and outputs the result $\tilde{r}_k^{(v)}$ of multiplication to the (2U+1)-th post-processor 262. Here, $\alpha_v$ indicates a magnitude control factor for a v-th user signal and may be, for example, $L_v^{-0.5}$. Then, the (2U+1)-th post-processor 262 folds and adds the results $\tilde{r}_k^{(v)}$ of multiplication received from the multiplier 260 with a period of $N_v$, as shown in Formula (5) and outputs the result $r_k^{(v)}$ of folding and addition as a symbol for the v-th user to the second estimate value detector 246.

The second estimate value detector 246 detects an estimate value $\hat{a}_k^{(v)}$ of a base station symbol for the v-th user from the output $r_k^{(v)}$ of the (2U+1)-th post-processor 262. Here, if $\alpha_v \gamma_v = 1/L_v$ is set, the second estimate value detector 246 can easily detect the estimate value.

Figure 19:
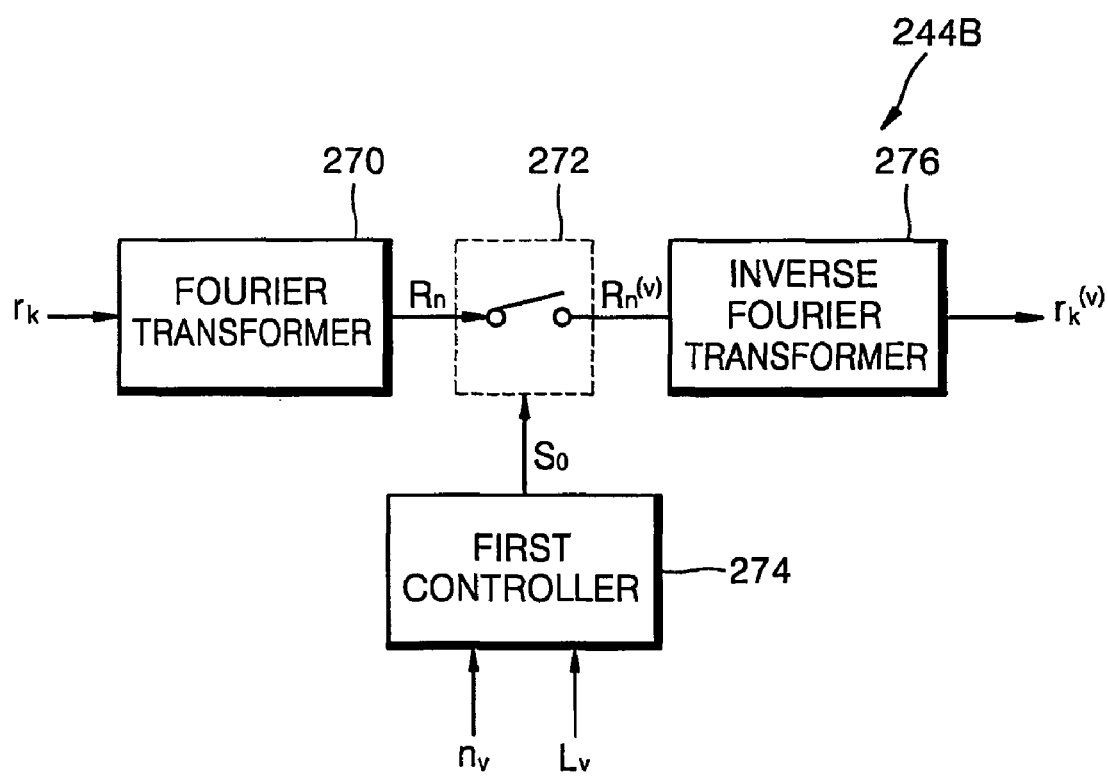
FIG. 19 is a block diagram of a second embodiment of a first base station symbol extractor according to the present invention.

FIG. 19 is a block diagram of the second embodiment 244B of the first base station symbol extractor 244 shown in FIG. 16 according to the present invention. The first base station symbol extractor 244B includes a Fourier transformer 270, a switching unit 272, a first controller 274, and an inverse Fourier transformer 276.

The Fourier transformer 270 of the first base station symbol extractor 244B performing the step 254 performs N-point Fourier transform on $r_k^-$, which is output from the second pre-processor 242 in step 252 and contains white Gaussian noise $n_k$, and outputs the result $R_n$ of Fourier transform to the switching unit 272. Here, "n" indicates a frequency factor and is an integer greater than or equal to 0 and no greater than N–1. That is, 0 ≤ frequency factor n ≤ number M or N of main symbols–1.

When the result $R_n$ of Fourier transform output from the Fourier transformer 270 is the result $R_n^{(v)}$ of Fourier transform with respect to a v-th user, $N_v$-point inverse Fourier transform is performed on $R_n^{(v)}$ to obtain symbols $r_k^{(v)}$ for the v-th user, and the symbols $r_k^{(v)}$ are output to the second estimate value detector 246. For this, the first base station symbol extractor 244B may include the switching unit 272, the first controller 274, and the inverse Fourier transformer 276, as shown in FIG. 19.

The switching unit 272 sorts out only a v-th user signal $R^{n(v)}$ from $R_n$ received from the Fourier transformer 270 and outputs the v-th user signal $R_n^{(v)}$ to the inverse Fourier transformer 276 in response to a selection signal $S_0$. The first controller 274 generates the selection signal $S_0$ in response to $L_v$ and a unique frequency offset number $n_v$ previously allocated to the v-th user and outputs the selection signal $S_0$ to the switching unit 272. The inverse Fourier transformer 276 performs $N_v$-point inverse Fourier transform on $R_n^{(v)}$ received from the switching unit 272 and outputs the result $r_k^{(v)}$ of inverse Fourier transform to the second estimate value detector 246.

The second estimate value detector 246 detects an estimate value $\hat{a}_k^{(v)}$ of a base station symbol for the v-th user from the output $r_k^{(v)}$ of the inverse Fourier transformer 276.

The following description concerns other embodiments 244C, 244D, and 244E of the first base station symbol extractor 244 in the case where a symbol block signal, which has a second symbol block and interchannel interference generated when it is transmitted from a first base station transmitting unit through a fading channel, is input through the input terminal $IN_{V+4}$.

Here, when it is assumed that the length L of channel impulse response $h_k$ is shorter than the length of a cyclic extension symbol, if the second pre-processor 242 removes the cyclic extension symbol from a second symbol block, interference between second symbol blocks is removed, and the result $r_k$ of removal output from the second pre-processor 242 for a single symbol block time is expressed by Formula (7). Here, in Formula (7), N substitutes for M.

Figure 20:
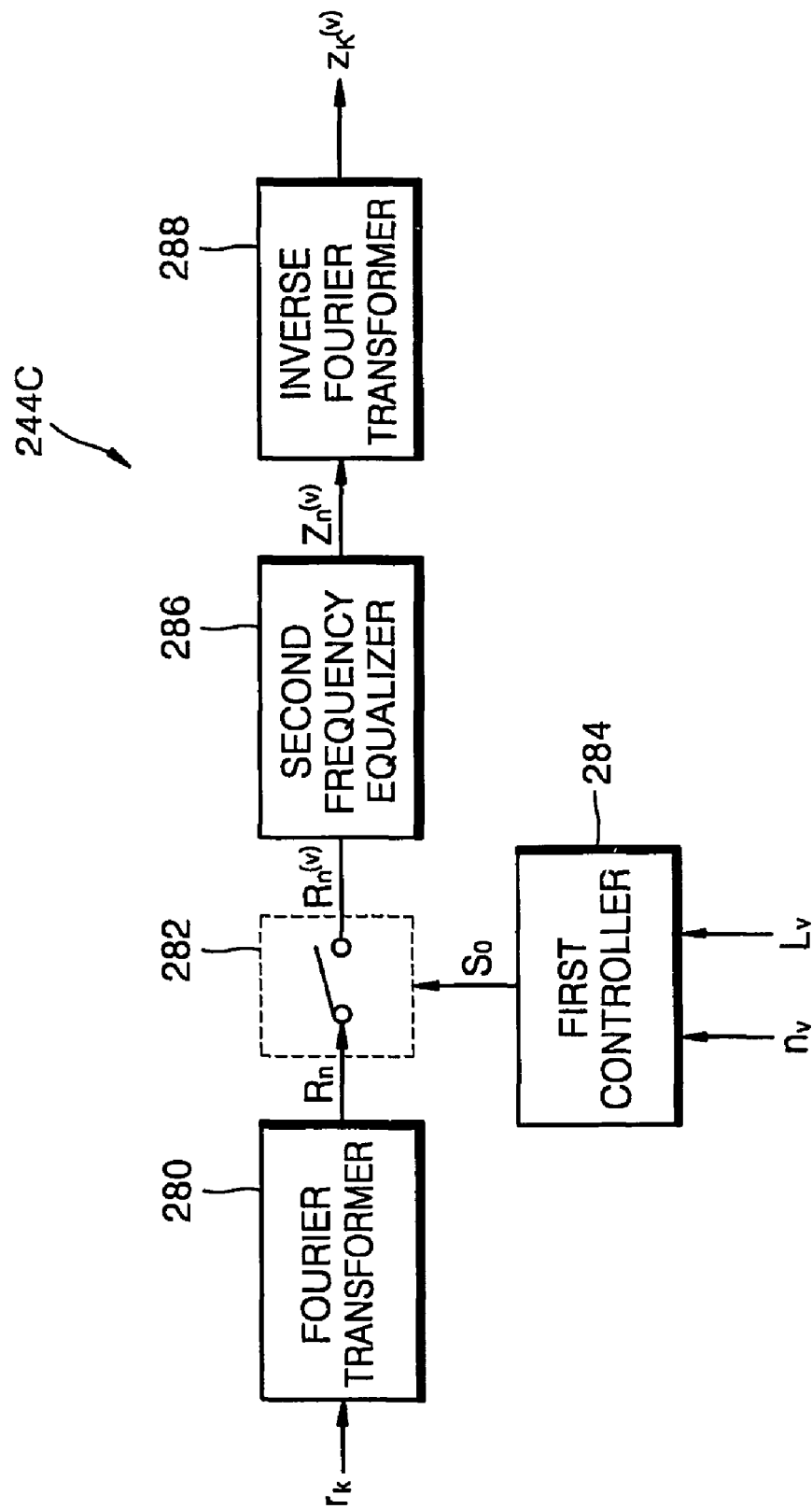
FIGS. 20 through 22 are block diagrams of other embodiments of a first base station symbol extractor according to the present invention.

FIG. 20 is a block diagram showing a third embodiment 244C of the first base station symbol extractor 244 shown in FIG. 16. The first base station symbol extractor 244C includes a Fourier transformer 280, a switching unit 282, a first controller 284, a second frequency equalizer 286, and an inverse Fourier transformer 288.

The first base station symbol extractor 244C shown in FIG. 20 has the same configuration as the first base station symbol extractor 244B shown in FIG. 19 with the exception that the first base station symbol extractor 244C further includes the second frequency equalizer 286 between the switching unit 282 and the inverse Fourier transformer 288.

The Fourier transformer 280 of the first base station symbol extractor 244C performing the step 254 performs N-point Fourier transform on $r_k$, which is output from the second pre-processor 242 in step 252, and outputs the result $R_n$ of Fourier transform to the switching unit 282. Then, the switching unit 282 sorts out only a v-th user signal $R_n^{(v)}$ from $R_n$ received from the Fourier transformer 280 and outputs the v-th user signal $R_n^{(v)}$ to the second frequency equalizer 286 in response to a selection signal $S_0$ input from the first controller 284. The first controller 284 generates the selection signal $S_0$ in the same manner as the first controller 274 shown in FIG. 19 and outputs the selection signal $S_0$ to the switching unit 282.

Then, the second frequency equalizer 286 performs compensation on the phase and size of the v-th user signal $R_n^{(v)}$ output from the switching unit 282 and outputs the result $Z_n^{(v)}$ of compensation to the inverse Fourier transformer 288. In other words, the second frequency equalizer 286 serves to remove interchannel interference from a frequency domain. For this, the second frequency equalizer 286 multiplies the v-th user signal $R_n^{(v)}$ received from the switching unit 282 by a second predetermined complex number and outputs the result $Z_n^{(v)}$ of multiplication as the result of compensation to the inverse Fourier transformer 288.

The inverse Fourier transformer 288 performs $N_v$-point inverse Fourier transform on the result $Z_n^{(v)}$ of compensation received from the second frequency equalizer 286 and outputs the result $z_k^{(v)}$ of inverse Fourier transform as symbols for the v-th user to the second estimate value detector 246. The second estimate value detector 246 detects an estimate value $\hat{a}_k^{(v)}$ of a base station symbol for the v-th user from the output $z_k^{(v)}$ of the inverse Fourier transformer 288.

Figure 21:
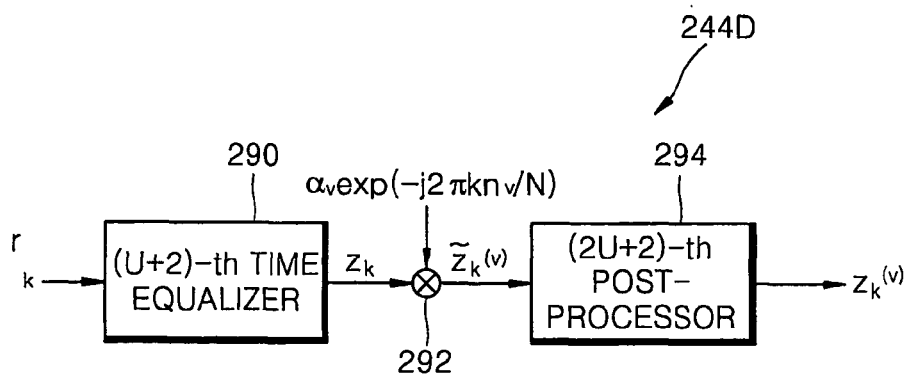

FIG. 21 is a block diagram showing a fourth embodiment 244D of the first base station symbol extractor 244 shown in FIG. 16. The first base station symbol extractor 244D includes a (U+2)-th time equalizer 290, a multiplier 292, and a (2U+2)-th post-processor 294.

The (U+2)-th time equalizer 290 of the first base station symbol extractor 244D performing the step 254 removes interchannel interference from $r_k$ in a time domain, which is output from the second pre-processor 242 in step 252, and outputs the result $z_k$ of removal of interchannel interference to the multiplier 292.

Then, the multiplier 292 multiplies the result $Z_k$ of removal of interchannel interference received from the (U+2)-th time equalizer 290 by $\alpha_v \exp(-j2\pi k n_v/N)$ and outputs the result $\tilde{z}_k^{(v)}$ of multiplication to the (2U+2)-th post-processor 294. Then, the (2U+2)-th post-processor 294 folds and adds the results $\tilde{z}_k^{(v)}$ of multiplication with a period of $N_v$ as shown in Formula (8) and outputs the result $z_k^{(v)}$ of folding and addition as symbols for the v-th user to the second estimate value detector 246.

Figure 22:
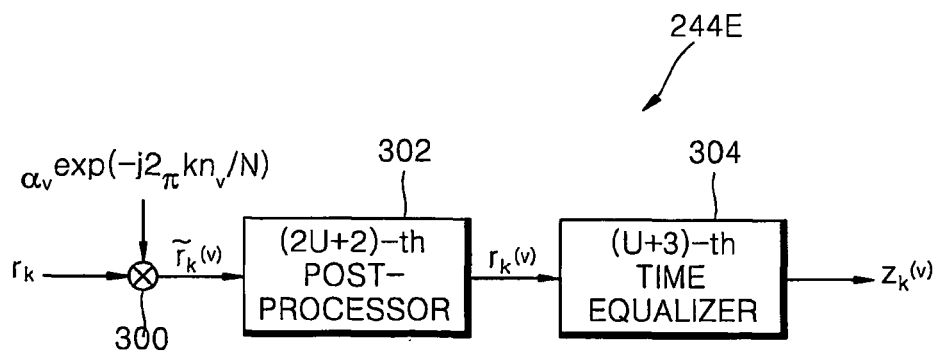

FIG. 22 is a block diagram showing a fifth embodiment 244E of the first base station symbol extractor 244 shown in FIG. 16. The first base station symbol extractor 244E includes a multiplier 300, (2U+1)-th post-processor 302, and (U+3) time equalizer 304.

The multiplier 300 of the first base station symbol extractor 244E performing the step 254 multiplies $r_k$, which is output from the second pre-processor 242 in step 252, by $\alpha_v \exp(-j2\pi k n_v/N)$ and outputs the result $\tilde{r}_k^{(v)}$ of multiplication to the (2U+1)-th post-processor 302.

Then, the (2U+1)-th post-processor 302 performing the same function as the (2U+1)-th post-processor 262 shown in FIG. 18 folds and adds the results $\tilde{r}_k^{(v)}$ of multiplication received from the multiplier 300 with a period of $N_v$ and outputs the result $r_k^{(v)}$ of folding and addition to the (U+3)-th time equalizer 304.

The (U+3)-th time equalizer 304 removes interchannel interference, in a time domain, from the result $r_k^{(v)}$ of folding and addition received from the (2U+1)-th post-processor 302 and outputs the result $z_k^{(v)}$ of removal of interchannel interference as symbols for the v-th user to the second estimate value detector 246.

Hereinafter, the configurations and operations of preferred embodiments of the present invention of each of the first through (U+3)-th time equalizers 210, 228 through 230, 290, and 304 shown in FIGS. 14, 15, 21, and 22 will be described.

Figure 23:
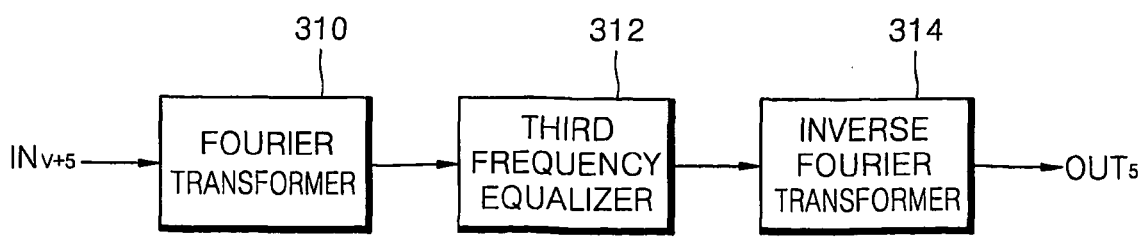
FIG. 23 is a block diagram of a first embodiment of each of first through (U+3)-th time equalizers according to the present invention.

FIG. 23 is a block diagram of a first embodiment of the present invention of each of the first through (U+3)-th time equalizers 210, 228 through 230, 290, and 304, which includes a Fourier transformer 310, a third frequency equalizer 312, and an inverse Fourier transformer 314.

The Fourier transformer 310 shown in FIG. 23 performs Fourier transform on a value, i.e., the output $r_k$ of the first or second pre-processor 132 or 242, or the output of the post-processor 224, . . . , 226, or 302, received through an input terminal $IN_{V+}5$ and outputs the result of Fourier transform to the third frequency equalizer 312. When the time equalizer shown in FIG. 23 is applied to each of the first and (U+2)-th time equalizers 210 and 290 shown in FIGS. 14 and 21, the Fourier transformer 310 performs M- or N-point Fourier transform and outputs M or N signals resulting from M- or N-point Fourier transform to the third frequency equalizer 312. When the time equalizer shown in FIG. 23 is applied to any one among the second through (U+1)-th time equalizers and the (U+3)-th time equalizer 228 through 230 and 304 shown in FIGS. 15 and 22, the Fourier transformer 310 performs $M_u$- or $N_v$-point Fourier transform and outputs $M_u$ or $N_v$ signals resulting from $M_u$- or $N_v$-point Fourier transform to the third frequency equalizer 312.

The third frequency equalizer 312 multiplies the M or N ($M_u$ or $N_v$) signals received from the Fourier transformer 310 by a third predetermined complex number and outputs the result of multiplication to the inverse Fourier transformer 314. In other words, the third frequency equalizer 312 serves to remove interchannel interference in a frequency domain.

The inverse Fourier transformer 314 performs inverse Fourier transform on the result of multiplication received from the third frequency equalizer 312 and outputs the result of inverse Fourier transform as the result of removal of interchannel interference through an output terminal $OUT_5$. When the time equalizer shown in FIG. 23 is applied to the first or (U+2)-th time equalizer 210 or 290 shown in FIG. 14 or 21, the inverse Fourier transformer 314 performs M- or N-point inverse Fourier transform. When the time equalizer shown in FIG. 23 is applied to any one among the second through (U+1)-th time equalizers and the (U+3)-th time equalizer 228 through 230 and 304 shown in FIGS. 15 and 22, the inverse Fourier transformer 314 performs $M_u$- or $N_v$-point inverse Fourier transform.

Figure 24:
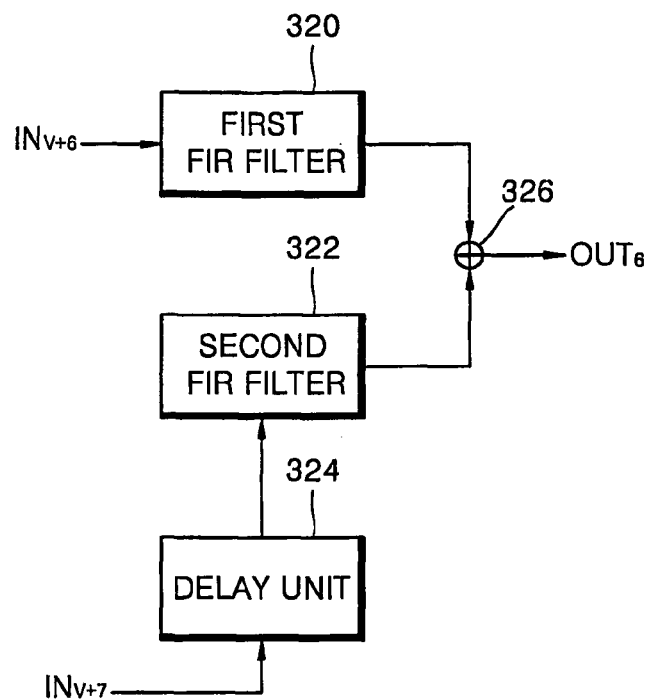
FIG. 24 is a block diagram of a second embodiment of each of second through (U+1)-th and (U+3)-th time equalizers according to the present invention.

FIG. 24 is a block diagram of a second embodiment of the present invention of each of the second through (U+1)-th and (U+3)-th time equalizers 228 through 230 and 304, which includes first and second finite impulse response (FIR) filters 320 and 322, a delay unit 324, and a second adder 326.

The first FIR filter 320 shown in FIG. 24 performs FIR filtering on the output $r_k^{(u)}$ or $r_k^{(v)}$ of the corresponding post-processor 224, . . . , 226, or 302 received through input terminal $IN_{V+6}$ and outputs the result of filtering to the second adder 326.

The delay unit 324 receives an estimate value from the first or second estimate value detector 136 or 246 through input terminal $IN_{V+7}$, delays the estimate value, and outputs the result of delay to the second FIR filter 322. The second FIR filter 322 performs FIR filtering on the result of delay received from the delay unit 324 and outputs the result of filtering to the second adder 326.

The second adder 326 sums the results of filtering received from the first and second FIR filters 320 and 322 and outputs the result of summation as the result $z_k^{(u)}$ or $z_k^{(v)}$ of removal of interchannel interference to the first or second estimate value detector 136 or 246 through an output terminal $OUT_6$.

In another embodiment of the present invention, each of the first through (U+3)-th time equalizers 210, 228 through 230, 290, and 304 shown in FIGS. 14, 15, 21, and 22 can be realized as a FIR filter which performs FIR filtering on the corresponding value, i.e., the output $r_k$ of the first or second pre-processor 132 or 242, or the output of the post-processor 224, . . . , 226, or 302, and outputs the result of filtering as the result of removal of interchannel interference.

According to a data communication apparatus and method of the present invention, data is transmitted and received in block units, so a space-time code can be easily realized. Here, the space-time code is disclosed on pages 307 through 311 of a paper entitled "A Transmit Diversity Scheme for Channels with Intersymbol Interference" written by Erik Lindskog and Arogyaswami Paulraj and read in International Conference on Communications (ICC) in May, 2000. For example, as described above, a second user transmitting unit or a second base station transmitting unit can transmit two symbol block signals at one time.

Hereinafter, the configuration and the operations of a preferred embodiment of the present invention of a second user transmitting unit and a data communication method of the present invention through which the second user transmitting unit transmits user information will be described with reference to the attached drawings.

Figure 25:
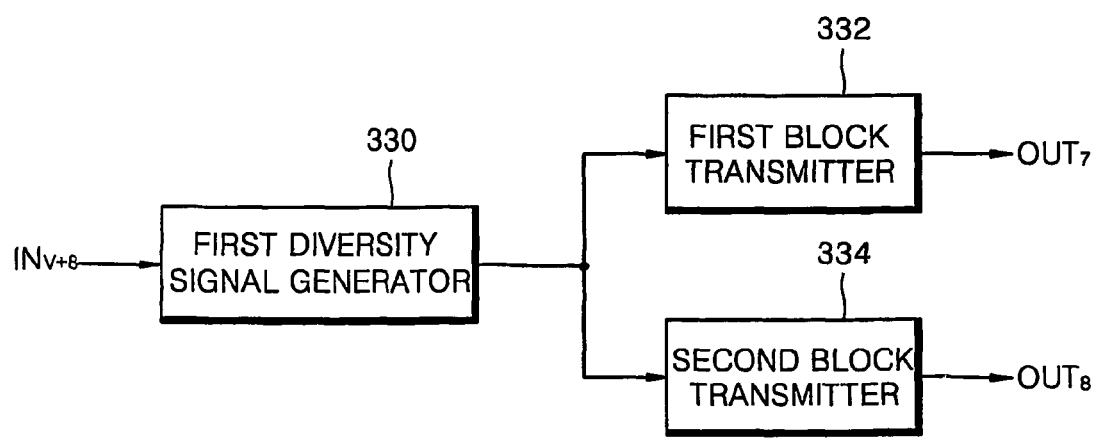
FIG. 25 is a block diagram of an embodiment of a second user transmitting unit according to the present invention.

FIG. 25 is a block diagram of a preferred embodiment of a second user transmitting unit according to the present invention. The second user transmitting unit includes a first diversity signal generator 330 and first and second block transmitters 332 and 334.

Figure 26:
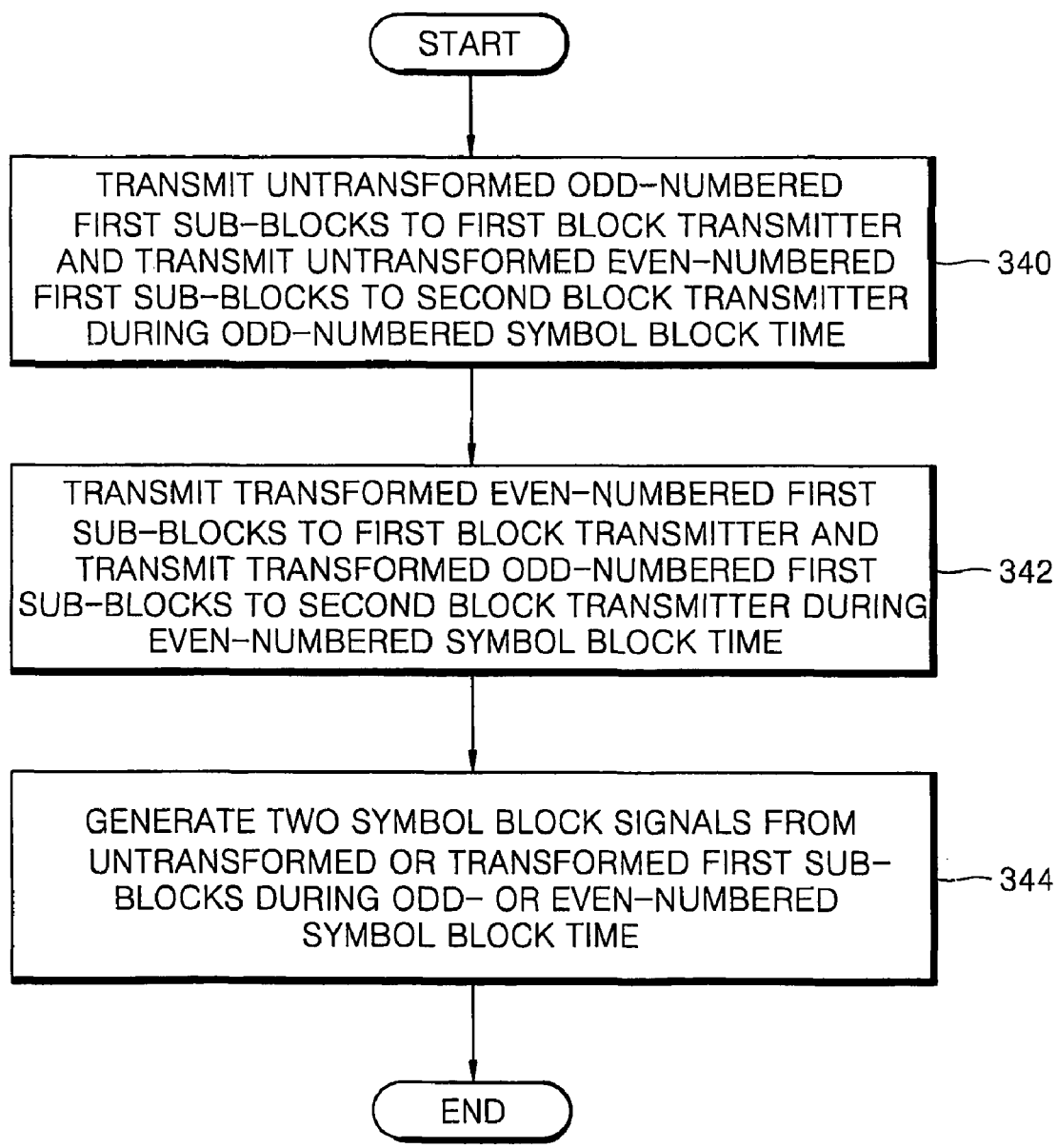
FIG. 26 is a flowchart of a data communication method performed by the second user transmitting unit according to the present invention.

FIG. 26 is a flowchart of a data communication method through which the second user transmitting unit shown in FIG. 25 transmits user information according to the present invention. In steps 340 and 342, transformed or untransformed odd-numbered and even-numbered first sub-blocks are obtained. In step 344, two first symbol blocks are generated from the first sub-blocks and are transmitted.

The second user transmitting unit shown in FIG. 25 transmits user information in units of two first symbol blocks to a second base station receiving unit. For this, during an odd-numbered symbol block time, the first diversity signal generator 330 transmits untransformed odd-numbered first sub-blocks input from the first encoder 50 of FIG. 4 through an input terminal $IN_{V+8}$ to the first block transmitter 332 as they are and simultaneously transmits untransformed even-numbered first sub-blocks input from the first encoder 50 through the input terminal $IN_{V+8}$ to the second block transmitter 334 as they are in step 340.

After step 340, during an even-numbered symbol block time, the first diversity signal generator 330 multiplies the complex conjugates of even-numbered first sub-blocks input from the first encoder 50 through the input terminal $IN_{V+8}$ by −1, transforms the results of multiplication by outputting them in order opposite to the order in which they are input, and transmits the transformed result to the first block transmitter 332, and simultaneously, the first diversity signal generator 330 transforms the complex conjugates of odd-numbered first sub-blocks input from the first encoder 50 through the input terminal $IN_{V+8}$ by outputting them in order opposite to the order in which they are input, and transmits the transformed result to the second block transmitter 334, in step 342.

For example, the first diversity signal generator 330 transforms odd- and even-numbered first sub-blocks input from the first encoder 50 of FIG. 4, through the input terminal $IN_{V+8}$ every symbol block time, and transmits untransformed odd-numbered first sub-blocks or transformed even-numbered first sub-blocks to the first block transmitter 332 and transmits untransformed even-numbered first sub-blocks or transformed odd-numbered first sub-blocks to the second block transmitter 334.

After step 342, during an odd-numbered symbol block time, the first and second block transmitters 332 and 334 receive the untransformed odd- and even-numbered first sub-blocks, respectively, which are transmitted from the first diversity signal generator 330 in step 340, generate two symbol block signals, respectively, from the received odd- and even-numbered first sub-blocks, and transmit the two symbol block signals to the second base station receiving unit through respective output terminals $OUT_7$ and $OUT_8$ in step 344. Meanwhile, during an even-numbered symbol block time, the first and second block transmitters 332 and 334 receive the transformed even- and odd-numbered first sub-blocks, respectively, which are transmitted from the first diversity signal generator 330 in step 342, generate two symbol block signals, respectively, from the transformed even- and odd-numbered first sub-blocks, and transmit the two symbol block signals to the second base station receiving unit through respective output terminals $OUT_7$ and $OUT_8$ in step 344. For this, each of the first and second block transmitters 332 and 334 in the second user transmitting unit can include the first block repeater 52, the multiplier 54, the first cyclic extension inserter 36, and the first signal transmitter 58 included in the first user transmitting unit shown in FIG. 4. The first and second block transmitters 332 and 334 generate two symbol block signals, respectively, from transformed or untransformed odd- and even-numbered first sub-blocks which are output from the first diversity signal generator 330. Transformed and untransformed sub-blocks are alternately output from the first diversity signal generator 330. In order to perform the method shown in FIG. 26, the second user transmitting unit shown in FIG. 25 may further include the first encoder 50 shown in FIG. 4.

Hereinafter, the configuration and the operations of a preferred embodiment of the present invention of a second base station transmitting unit and a data communication method through which the second base station transmitting unit transmits base station information will be described with reference to the attached drawings.

Figure 27:
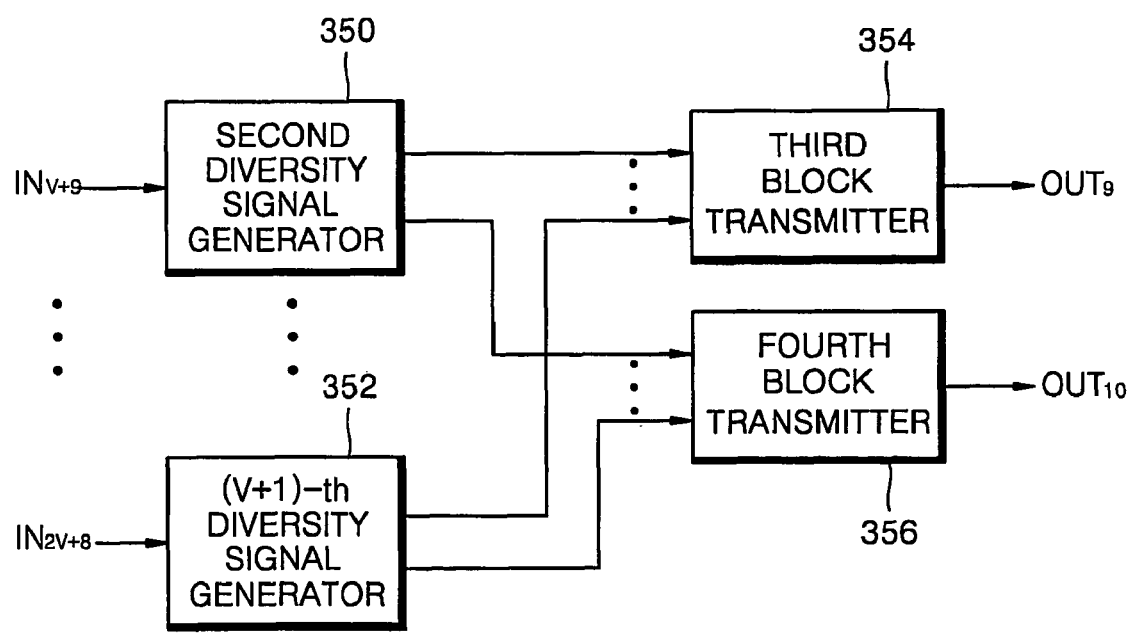
FIG. 27 is a block diagram of an embodiment of a second base station transmitting unit according to the present invention.

FIG. 27 is a block diagram of a preferred embodiment of a second base station transmitting unit according to the present invention. The second base station transmitting unit includes second through (V+1)-th diversity signal generators 350 through 352, and third and fourth block transmitters 354 and 356.

Figure 28:
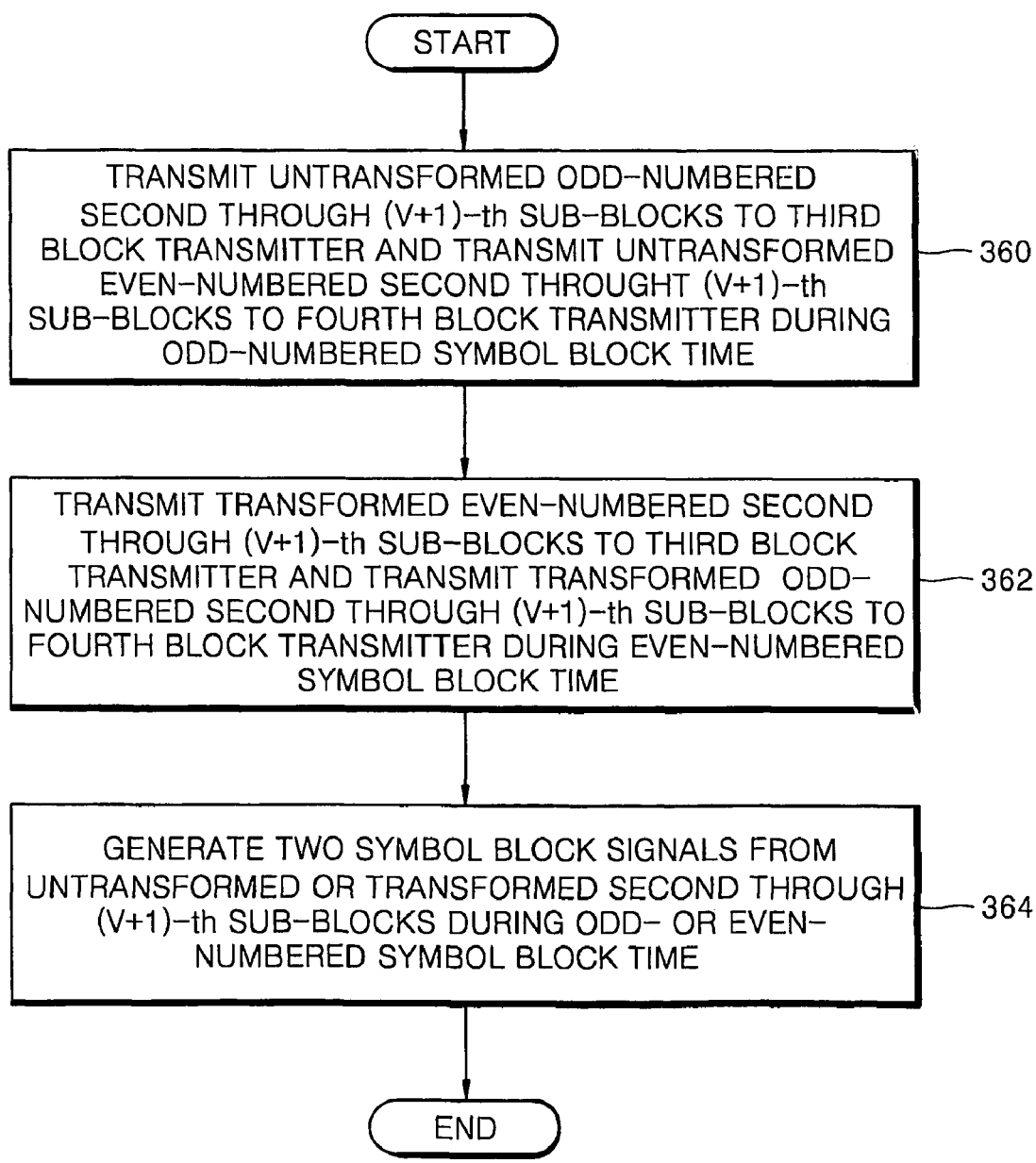
FIG. 28 is a flowchart of a data communication method performed by the second base station transmitting unit according to the present invention.

FIG. 28 is a flowchart of a data communication method through which the second base station transmitting unit shown in FIG. 27 transmits base station information according to the present invention. In steps 360 and 362, transformed or untransformed odd-numbered and even-numbered sub-blocks for each of V second user receiving unit(s) are obtained. In step 364, two second symbol blocks are generated from the sub-blocks and are transmitted.

The second base station transmitting unit shown in FIG. 27 transmits base station information by two second symbol blocks to a v-th second user receiving unit. For this, in step 360, during an odd-numbered symbol block time, the second through (V+1)-th diversity signal generators 350 through 352 transmit untransformed odd-numbered second through (V+1)-th sub-blocks input from the second through (V+1)-th encoders 70 through 72 shown in FIG. 6 through respective input terminals $IN_{V+9}$ through $IN_{2V+8}$ to the third block transmitter 354 and simultaneously transmit untransformed even-numbered second through (V+1)-th sub-blocks input from the second through (V+1)-th encoders 70 through 72 of FIG. 6 through the respective input terminals $IN_{V+9}$ through $IN_{2V+8}$ to the fourth block transmitter 356.

After step 360, in step 362, during an even-numbered symbol block time, the second through (V+1)-th diversity signal generators 350 through 352 multiply the complex conjugates of even-numbered second through (V+1)-th sub-blocks input from the second through (V+1)-th encoders 70 through 72 through the respective input terminals $IN_{V+9}$ through $IN_{2V+8}$ by −1, transform the results of multiplication in reverse order, and transmit the transformed even-numbered second through (V+1)-th sub-blocks to the third block transmitter 354, and simultaneously, the second through (V+1)-th diversity signal generators 350 through 352 transform the odd-numbered second through (V+1)-th sub-blocks input from the second through (V+1)-th encoders 70 through 72 by multiplying their complex conjugates by −1 and arranging the results of multiplication in order opposite to the order in which the odd-numbered second through (V+1)-th sub-blocks input, and transmit the transformed odd-numbered second through (V+1)-th sub-blocks to the fourth block transmitter 356.

For this, the (v+1)-th diversity signal generator among second through (V+1)-th diversity signal generators 350 through 352 transforms odd- and even-numbered (v+1)-th sub-blocks input from the (v+1)-th encoder 70, . . . , or 72 through an input terminal $IN_{V+V+8}$ every other symbol block time and outputs untransformed or transformed odd- and even-numbered (v+1)-th sub-blocks to the third and fourth block transmitters 354 and 356. Here, transformed and untransformed sub-blocks are alternately output from the (v+1)-th diversity signal generator 350, . . . , or 352 during each symbol block time.

After step 362, in step 364, during an odd-numbered symbol block time, the third block transmitter 354 receives the untransformed odd-numbered second through (V+1)-th sub-blocks, which are transmitted from the second through (V+1)-th diversity signal generators 350 through 352 in step 360, and generates a symbol block signal from the received odd-numbered second through (V+1)-th sub-blocks, and simultaneously, the fourth block transmitter 356 receives the untrarsformed even-numbered second through (V+1)-th sub-blocks, which are transmitted from the second through (V+1)-th diversity signal generators 350 through 352 in step 360, and generates a symbol block signal from the received even-numbered second through (V+1)-th sub-blocks. The third and fourth transmitters 354 and 356 transmit the two symbol block signals to the second user receiving unit through respective output terminals $OUT_9$ and $OUT_{10}$ in step 364. Meanwhile, in step 364, during an even-numbered symbol block time, the third block transmitter 354 generates a symbol block signal from the transformed even-numbered second through (V+1)-th sub-blocks which are transmitted in step 362, and simultaneously, the fourth block transmitter 356 generates a symbol block signal from the transformed odd-numbered second through (V+1)-th sub-blocks which are transmitted in step 362. The third and fourth transmitters 354 and 356 transmit the two symbol block signals to the second user receiving unit through respective output terminals $OUT_9$ and $OUT_{10}$ in step 364. For this, each of the third and fourth block transmitters 354 and 356 can include the second through (V+1)-th block repeaters 74 through 76, the V multipliers 78 through 80, the first adder 82, the second cyclic extension inserter 84, and the second signal transmitter 86 included in the first base station transmitting unit shown in FIG. 6.

The third and fourth block transmitters 354 and 356 generate two symbol block signals, respectively, from transformed or untransformed odd- and even-numbered second through (V+1)-th sub-blocks which are output from the second through (V+1)-th diversity signal generators 350 through 352. Transformed and untransformed sub-blocks are alternately output from each of the second through (V+1)-th diversity signal generators 350 through 352. In order to perform the method shown in FIG. 28, the second base station transmitting unit shown in FIG. 27 may further include the second through (V+1)-th encoders 70 through 72 shown in FIG. 6.

Hereinafter, the configuration and operations of a preferred embodiment of each of the first through (V+1)-th diversity signal generators 330 and 350 through 352 shown in FIGS. 25 and 27 according to the present invention will be described with reference to the attached drawings.

Figure 29:
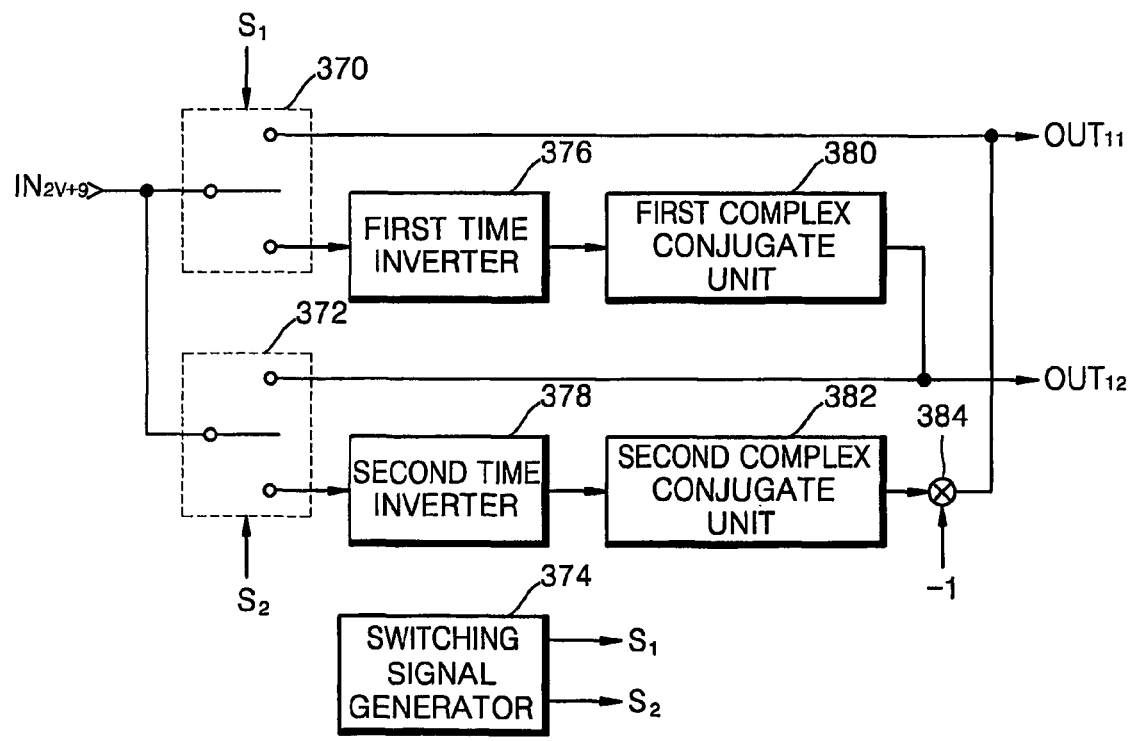
FIG. 29 is a block diagram of a first embodiment of each of first through (V+1)-th diversity signal generators according to the present invention.

FIG. 29 is a block diagram of a preferred embodiment of each of the first through (V+1)-th diversity signal generators 330 and 350 through 352 according to the present invention, which includes first and second switching units 370 and 372, a switching signal generator 374, first and second time inverters 376 and 378, first and second complex conjugate units 380 and 382, and a multiplier 384.

In one case, the first switching unit 370 shown in FIG. 29 outputs an odd-numbered first sub-block, which is received from the first encoder 50 through an input terminal $IN_{2V+9}$, to the first block transmitter 332 through an output terminal $OUT_{11}$ or to the first time inverter 376 in response to a first switching signal $S_1$ received from the switching signal generator 374. In another case, the first switching unit 370 shown in FIG. 29 outputs an odd-numbered (v+1)-th sub-block, which is received from the (v+1)-th encoder 70, . . . , or 72 through the input terminal $IN_{2V+9}$, to the third block transmitter 354 through the output terminal $OUT_{11}$ or to the first time inverter 376 in response to the first switching signal $S_1$ received from the switching signal generator 374.

Similarly, in one case, the second switching unit 372 outputs an even-numbered first sub-block, which is received from the first encoder 50 through the input terminal $IN_{2V+9}$, to the second block transmitter 334 through the output terminal $OUT_{11}$ or to the second time inverter 378 in response to a second switching signal $S_2$ received from the switching signal generator 374. In another case, the second switching unit 372 outputs an even-numbered (v+1)-th sub-block, which is received from the (v+1)-th encoder 70, . . . , or 72 through the input terminal $IN_{2V+9}$, to the fourth block transmitter 356 through the output terminal $OUT_{12}$ or to the second time inverter 378 in response to the second switching signal $S_2$ received from the switching signal generator 374.

In one case, the switching signal generator 374 outputs the first and second switching signals $S_1$ and $S_2$ to the respective first and second switching units 370 and 372 so that the first and second switching units 370 and 372 output odd- and even-numbered first sub-blocks to the first and second block transmitters 332 and 334, respectively, during each of the odd (or even)-numbered symbol block times, and output odd- and even-numbered first sub-blocks to the first and second time inverters 376 and 378, respectively, during each of the even (or odd)-numbered symbol block times. In another case, the switching signal generator 374 outputs the first and second switching signals $S_1$ and $S_2$ to the respective first and second switching units 370 and 372 so that the first and second switching units 370 and 372 output odd- and even-numbered (v+1)-th sub-blocks to the third and fourth block transmitters 354 and 356, respectively, during each of the odd (or even)-numbered symbol block times, and output odd- and even-numbered (v+1)-th sub-blocks to the first and second time inverters 376 and 378, respectively, during each of the even (or odd)-numbered symbol block times.

The first time inverter 376 outputs the odd-numbered first or (v+1)-th sub-blocks received from the first switching unit 370 to the first complex conjugate unit 380 in order opposite to the order in which they are input. Then, the first complex conjugate unit 380 generates a complex conjugate of the output of the first time inverter 376 and outputs the complex conjugate to the second or fourth block transmitter 334 or 356 through the output terminal $OUT_{12}$. Similarly, the second time inverter 378 outputs the even-numbered first or (v+1)-th sub-blocks received from the second switching unit 372 to the second complex conjugate unit 382 in order opposite to the order in which they are input. Then, the second complex conjugate unit 382 generates a complex conjugate of the output of the second time inverter 378 and outputs the complex conjugate to the multiplier 384. The multiplier 384 multiplies the output of the second complex conjugate unit 382 by −1 and outputs the result of multiplication to the first or third block transmitter 332 or 354 through the output terminal $OUT_{11}$.

Accordingly, a first block repeater 52 included in the first block transmitter 332 repeats the odd-numbered first sub-blocks output from the first switching unit 370 or the output of the multiplier 384 $L_u$ time to generate M symbols $a_{k'}^{(u)}$. The (v+1)-th block repeater 74, . . . , or 76 included in the third block transmitter 354 repeats the odd-numbered (v+1)-th sub-blocks output from the first switching unit 370 or the output of the multiplier 384 $L_v$ time to generate N symbols $a_{k'}^{(v)}$. The first block repeater 52 included in the second block transmitter 334 repeats the even-numbered first sub-blocks output from the second switching unit 372 or the output of the first complex conjugate unit 380 $L_u$ time to generate M symbols $a_{k'}^{(u)}$. The (v+1)-th block repeater 74, . . . , or 76 included in the fourth block transmitter 356 repeats the even-numbered (v+1)-th sub-blocks output from the second switching unit 372 or the output of the first complex conjugate unit 380 $L_v$ time to generate N symbols $a_{k'}^{(v)}$.

Hereinafter, the configuration and operations of a preferred embodiment of a second base station receiving unit according to the present invention and a data communication method through which the second base station receiving unit estimates user information according to the present invention will be described with reference to the attached drawings.

Figure 30:
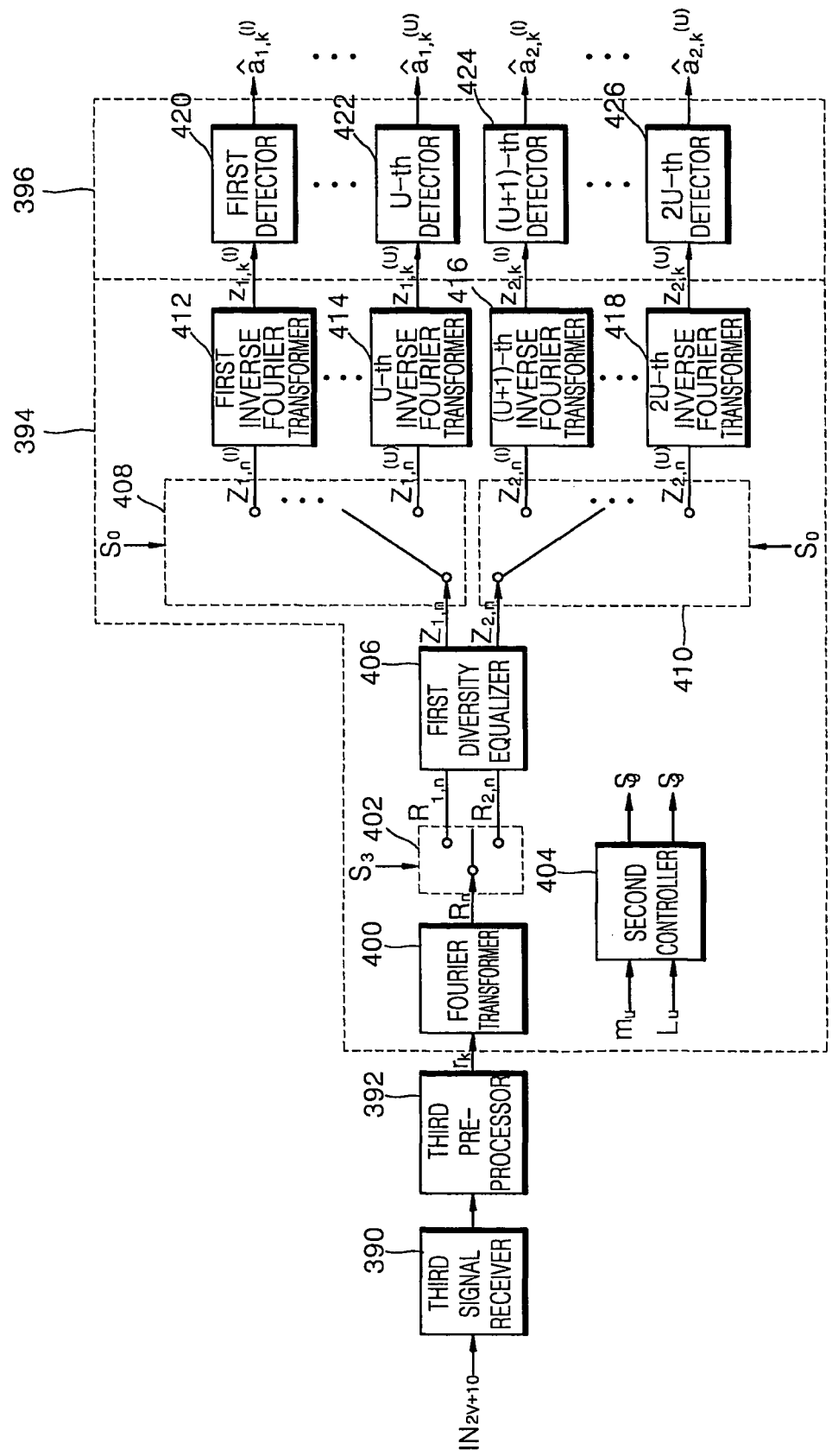
FIG. 30 is a block diagram of an embodiment of a second base station receiving unit according to the present invention.

FIG. 30 is a block diagram of a preferred embodiment of a second base station receiving unit according to the present invention, which includes a third signal receiver 390, a third pre-processor 392, a second user symbol extractor 394, and a third estimate value detector 396.

Figure 31:
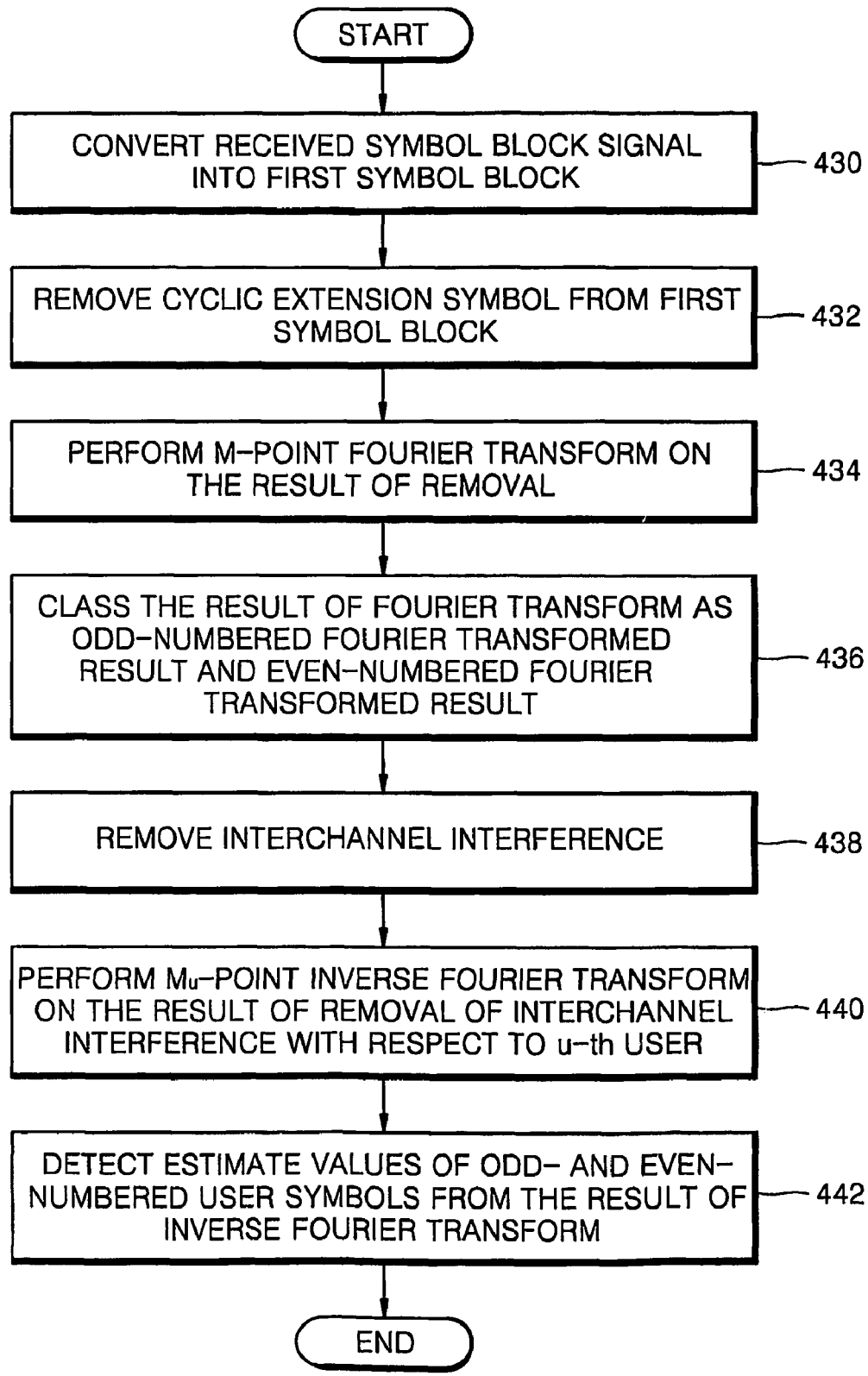
FIG. 31 is a flowchart of a data communication method performed by the second base station receiving unit according to the present invention.

FIG. 31 is a flowchart of a data communication method through which the second base station receiving unit shown in FIG. 30 estimates user information according to the present invention. In steps 430 through 440, odd- and even-numbered user symbols are extracted in a frequency domain from the result of removing a cyclic extension symbol from a first symbol block. In step 442, estimate values of odd- and even-numbered user symbols are detected.

The second base station receiving unit shown in FIG. 30 receives one of two symbol block signals, which are received from each of U second user transmitting units, for example, the second user transmitting unit shown in FIG. 25, and estimates a u-th user symbol from the received symbol block signal. For this, in step 430, the third signal receiver 390 receives one of symbol block signals, which are transmitted from each of the U second user transmitting units, through an input terminal $IN_{2V+10}$, converts the received symbol block signal into a first symbol block, and outputs the first symbol block to the third pre-processor 392.

After step 430, in step 432, the third pre-processor 392 finds a start point of the first symbol block received from the third signal receiver 390, removes a cyclic extension symbol from the first symbol block on the basis of the start point, and outputs the result $r_k$ of removal of the cyclic extension symbol to the second user symbol extractor 394.

After step 432, in step 434 through 440, the second user symbol extractor 394 extracts odd- and even-numbered user symbols for a u-th user in a frequency domain from the result $r_k$ of removal received from the third pre-processor 392 and outputs the extracted odd- and even-numbered user symbols to the third estimate value detector 396. For this, the second user symbol extractor 394 may include a Fourier transformer 400, a first sorter 402, a second controller 404, a first diversity equalizer 406, distributors 408 and 410, first through U-th inverse Fourier transformers 412 through 414, and (U+1)-th through 2U-th inverse Fourier transformers 416 through 418, as shown in FIG. 30.

After step 432, in step 434, the Fourier transformer 400 performs M-point Fourier transform on the result $r_k$ of removal received from the third pre-processor 392 and outputs the result $R_n$ of Fourier transform to the first sorter 402.

After step 434, in step 436, the first sorter 402 classes the result $R_n$ of Fourier transform received from the Fourier transformer 400 as the result $R_{1,n}$ of Fourier transform processed during an odd-numbered symbol block time and the result $R_{2,n}$ of Fourier transform processed during an even-numbered symbol block time and outputs the Fourier transformed and classed results $R_{1,n}$ and $R_{2,n}$ to the first diversity equalizer 406, in response to a third switching signal $S_3$ received from the second controller 404. Here, the first sorter 402 alternately outputs $R_{1,n}$ and $R_{2,n}$ to the first diversity equalizer 406 every symbol block time. For the operation of the first sorter 402, the second controller 404 outputs the third switching signal $S_3$ to the first sorter 402 so that $R_n$ can be output as $R_{1,n}$ and $R_{2,n}$ alternately every symbol block time.

After step 436, in step 438, the first diversity equalizer 406 removes interchannel interference using the outputs $R_{1,n}$ and $R_{2,n}$ of the first sorter 402 and the characteristics $H_{1,n}$ and $H_{2,n}$ of channels through which two symbol block signals are transmitted and outputs the results $Z_{1,n}$ and $Z_{2,n}$ of removal of interchannel interference to the distributors 408 and 410, respectively. Here, each of the outputs $Z_{1,n}$ and $Z_{2,n}$ has a size of M. The first diversity equalizer 406 may simultaneously output $Z_{1,n}$ and $Z_{2,n}$ to the respective distributors 408 and 410 or may alternately output $Z_{1,n}$ and $Z_{2,n}$ to the respective distributors 408 and 410 every symbol block time.

According to an embodiment of the present invention, the first diversity equalizer 406 can calculate the results $Z_{1,n}$ and $Z_{2,n}$ of removal of interchannel interference according to a minimum mean square error (MMSE) method expressed by Formula (10).

$$Z_{1,n} = \frac{[H_{1,n}]^* R_{1,n} + H_{2,n}[R_{2,n}]^*}{|H_{1,n}|^2 + |H_{2,n}|^2 + 1/SNR}, \quad Z_{2,n} = \frac{[H_{2,n}]^* R_{1,n} - H_{1,n}[R_{2,n}]^*}{|H_{1,n}|^2 + |H_{2,n}|^2 + 1/SNR} \quad (10)$$

Here, n=0, 1, . . . , or M−1. SNR indicates a ratio of the u-th user symbol to Gaussian noise and can be expressed by Formula (11).

$$SNR = \frac{E\{|a_k^{(u)}|^2\}}{E\{|n_k|^2\}} \quad (11)$$

Here, $E\{|a_k^{(u)}|^2\}$ and $E\{|n_k|^2\}$ indicate a mean power of $a_k^{(u)}$ and a mean power of $n_k$, respectively.

According to another embodiment of the present invention, the first diversity equalizer 406 can calculate the results $Z_{1,n}$ and $Z_{2,n}$ of removal of interchannel interference according to a zero forcing method expressed by Formula (12).

$$Z_{1,n} = \frac{[H_{1,n}]^* R_{1,n} + H_{2,n}[R_{2,n}]^*}{|H_{1,n}|^2 + |H_{2,n}|^2}, \quad Z_{2,n} = \frac{[H_{2,n}]^* R_{1,n} - H_{1,n}[R_{2,n}]^*}{|H_{1,n}|^2 + |H_{2,n}|^2} \quad (12)$$

Here, n=0, 1, . . . , or M−1. Formula (12) is the result of setting 1/SNR=0 in Formula (10).

If $\alpha_u \gamma_u = 1/L_u$, $R_{1,n}^{(u)}$, $R_{2,n}^{(u)}$, $H_{1,n}^{(u)}$, and $H_{2,n}^{(u)}$ in Formula (10) or (12) can be expressed by Formula (13).

$$R_{1,n} = A_{1,n} H_{1,n} + A_{2,n} H_{2,n} + N'_{1,n} \quad (13)$$

$$R_{2,n} = -[A_{2,n}]^* H_{1,n} + [A_{1,n}]^* H_{2,n} + N'_{2,n}$$

$$H_{1,n} = \sum_{l=0}^{L-1} h_{1,l} \exp[-j2\pi l(n/M)]$$

$$H_{2,n} = \sum_{l=0}^{L-1} h_{2,l} \exp[-j2\pi l(n/M_u)]$$

Here, $A_{1,n}$ and $A_{2,n}$ indicate the results of performing Fourier transform on $a_{1,k}^{(u)}$ and $a_{2,k}^{(u)}$, respectively, $N'_{1,n}$ and $N'_{2,n}$ indicate the results of performing Fourier transform on $n'_{1,k}$ and $n'_{2,k}$, respectively, $h_{1,l}$ indicates a channel impulse response of a symbol block signal transmitted from the first block transmitter 332, and $h_{2,l}$ indicates a channel impulse response of a symbol block signal transmitted from the second block transmitter 334.

After step 438, when the results $Z_{1,n}$ and $Z_{2,n}$ of removal of interchannel interference correspond to the results $Z_{1,n}^{(u)}$ and $Z_{2,n}^{(u)}$ for the u-th user, an odd-numbered user symbol and an even-numbered user symbol are obtained by performing $M_u$-point inverse Fourier transform on $Z_{1,n}^{(u)}$ and $Z_{2,n}^{(u)}$ in step 440. For this, the second user symbol extractor 394 can include the distributors 408 and 410 and the first through 2U-th inverse Fourier transformers 412 through 418. The distributor 408 allocates the result $Z_{1,n}$ from the first diversity equalizer 406 to one for the corresponding u-th user among the first through U-th inverse Fourier transformers 412 through 414 and outputs $Z_{1,n}$ to the corresponding inverse Fourier transformer 412, . . . , or 414 as a signal $Z^{1,n(u)}$ for the u-th user, in response to a selection signal $S_0$ generated from the second controller 404. Meanwhile, the distributor 410 allocates the result $Z_{2,n}$ from the first diversity equalizer 406 to one for the corresponding u-th user among the (U+1)-th through 2U-th inverse Fourier transformers 416 through 418 and outputs $Z_{2,n}$ to the corresponding inverse Fourier transformer 416, . . . , or 418 as a signal $Z_{2,n}^{(u)}$ for the u-th user, in response to the selection signal $S_0$ generated from the second controller 404. Here, the second control 404 generates the selection signal $S_O$ in the same manner as the first controller.

The corresponding u-th inverse Fourier transformer 412, . . . , or 414 performs $M_u$-point inverse Fourier transform on the signal $Z_{1,n}^{(u)}$ output from the distributor 408 and outputs the result $Z_{1,k}^{(u)}$ of inverse Fourier transform to the third estimate value detector 396 as an odd-numbered user symbol for the u-th user. Meanwhile, the corresponding (U+u)-th inverse Fourier transformer 416, . . . , or 418 performs $M_u$-point inverse Fourier transform on the signal $Z_{2,n}^{(u)}$ output from the distributor 410 and outputs the result $z_{2,k}^{(u)}$ of inverse Fourier transform to the third estimate value detector 396 as an even-numbered user symbol for the u-th user.

After step 440, the third estimate value detector 396 detects estimate values $â_{1,k}^{(u)}$ and $â_{2,k}^{(u)}$ of the odd- and even-numbered user symbols from the odd-numbered user symbol $z_{1,k}^{(u)}$ and the even-numbered user symbol $z_{2,k}^{(u)}$ for the u-th user, which are extracted by the second user symbol extractor 394, in step 442. For this according to the present invention, the third estimate value detector 396 can include the first through 2U-th detectors 420 through 426. A u-th detector 420, . . . , or 422 detects the estimate value $â_{1,k}^{(u)}$ of the odd-numbered user symbol from the output $z_{1,k}^{(u)}$ of the u-th inverse Fourier transformer 412, . . . , or 414. The (U+u)-th detector 424, . . . , or 426 detects the estimate value $â_{2,k}^{(u)}$ of the even-numbered user symbol from the output $z^{2,k(u)}$ of the (U+u)-th inverse Fourier transformer 416, . . . , or 418.

Hereinafter, the configuration and operations of a preferred embodiment of a second user receiving unit according to the present invention and a data communication method through which the second user receiving unit estimates base station information according to the present invention will be described with reference to the attached drawings.

Figure 32:
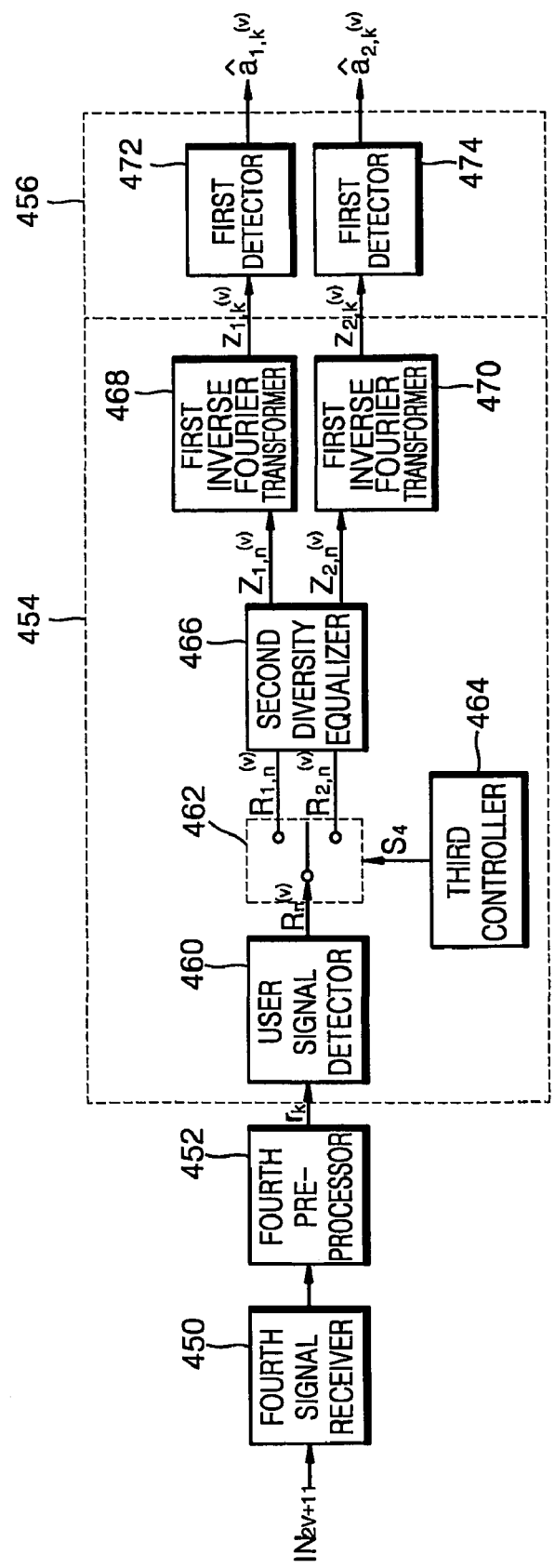
FIG. 32 is a block diagram of an embodiment of a second user receiving unit according to the present invention.

FIG. 32 is a block diagram of a preferred embodiment of a second user receiving unit according to the present invention, which includes a fourth signal receiver 450, a fourth pre-processor 452, a second base station symbol extractor 454, and a fourth estimate value detector 456.

Figure 33:
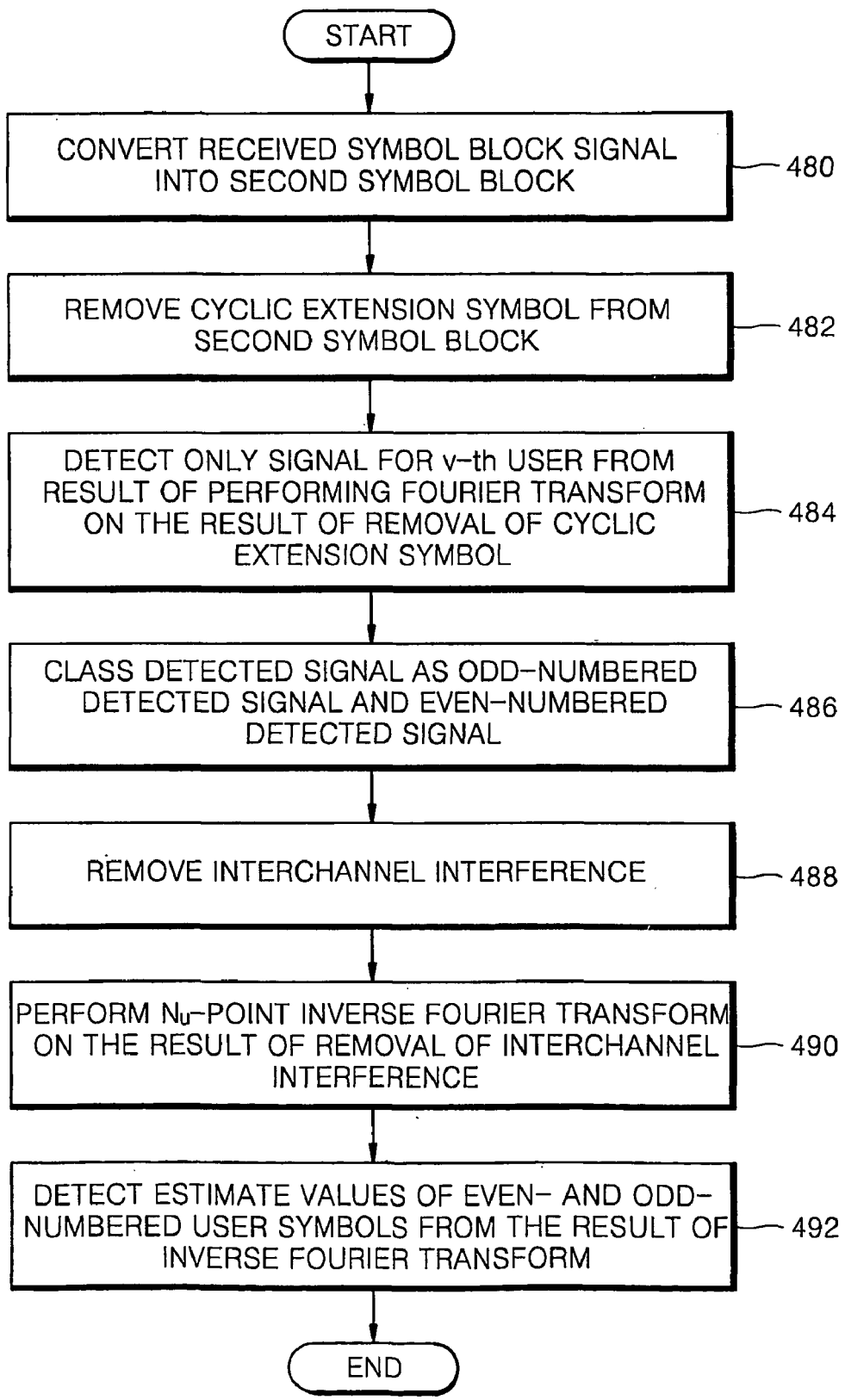
FIG. 33 is a flowchart of a data communication method performed by the second user receiving unit according to the present invention.

FIG. 33 is a flowchart of a data communication method through which the second user receiving unit shown in FIG. 32 estimates base station information according to the present invention. In steps 480 through 490, odd- and even-numbered symbols for a v-th user are extracted in a frequency domain from the result of removing a cyclic extension symbol from a second symbol block. In step 492, estimate values of base station symbols are detected from the odd- and even-numbered symbols.

The second user receiving unit shown in FIG. 32 receives one of two symbol block signals received from a second base station transmitting unit and estimates base station symbols for the v-th user from the received symbol block signal. For this, in step 480, the fourth signal receiver 450 of the second user receiving unit receives one symbol block signal through an input terminal $IN_{2V+11}$, converts the received symbol block signal into a second symbol block, and outputs the second symbol block to the fourth pre-processor 452.

After step 480, in step 482, the fourth pre-processor 452 finds a start point of the second symbol block received from the fourth signal receiver 450, removes a cyclic extension symbol from the second symbol block on the basis of the start point, and outputs the result $r_k$ of removal of the cyclic extension symbol to the second base station symbol extractor 454.

After step 482, in step 484 through 490, the second base station symbol extractor 454 extracts only odd- and even-numbered symbols for the v-th user from the result $r_k$ of removal received from the fourth pre-processor 452 and outputs the extracted odd- and even-numbered symbols to the fourth estimate value detector 456. For this, the second base station symbol extractor 454 can include, for example, a user signal detector 460, a second sorter 462, a third controller 464, a second diversity equalizer 466, and first and second inverse Fourier transformers 468 and 470, as shown in FIG. 32.

After step 482, in step 484, the user signal detector 460 detects only a signal $R_n^{(v)}$ for the v-th user from the result of performing Fourier transform on the result $r_k$ of removal received from the fourth pre-processor 452 and outputs the detected signal $R_n^{(v)}$ for the v-th user to the second sorter 462.

Hereinafter, the configurations and operations of preferred embodiments of the user signal detector 460 shown in FIG. 32 according to the present invention will be described with reference to the attached drawings.

Figure 34:
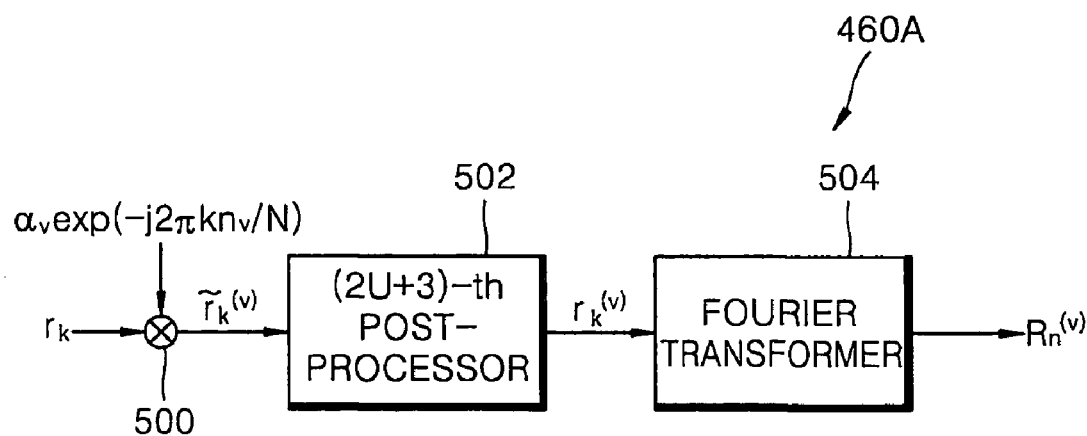
FIG. 34 is a block diagram of a first embodiment of a user signal detector according to the present invention.

FIG. 34 is a block diagram of a first embodiment 460A of the present invention of the user signal detector 460. The user signal detector 460A includes a multiplier 500, a (2U+3)-th post-processor 502, and a Fourier transformer 504.

To perform the step 484, the multiplier 500 multiplies $r_k$ output from the fourth pre-processor 452 by $\alpha_v \exp(-j2\pi k n_v / N)$ and outputs the result $\tilde{r}_k^{(v)}$ of multiplication to the (2U+3)-th post-processor 502. Then, the (2U+3)-th post-processor 502 folds and adds the results $\tilde{r}_k^{(v)}$ of multiplication received from the multiplier 500 with a period of $N_v$, as shown in Formula (5), and outputs the result $r_k^{(v)}$ of folding and addition to the Fourier transformer 504. Here, in Formula (5), "v" substitutes for "u", and $N_v$ substitutes for $M_u$. The Fourier transformer 504 performs $N_v$-point Fourier transform on the result $r_k^{(v)}$ of folding and addition received from the (2U+3)-th post-processor 502 and outputs the result of Fourier transform as the signal $R_n^{(v)}$ for the v-th user to the second sorter 462.

Figure 35:
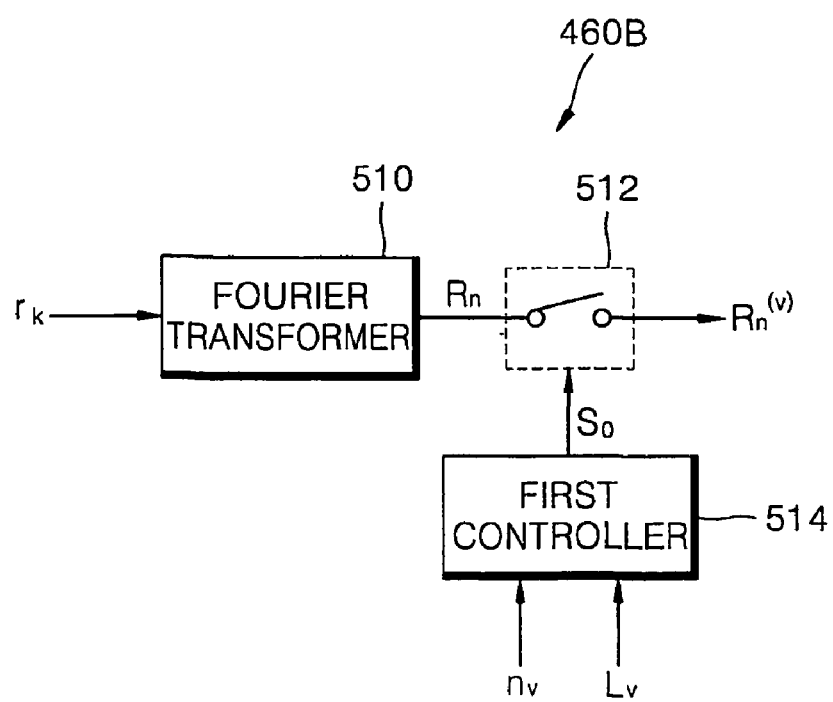
FIG. 35 is a block diagram of a second embodiment of a user signal detector according to the present invention.

FIG. 35 is a block diagram of a second embodiment 460B of the user signal detector 460 according to the present invention. The user signal detector 460B includes a Fourier transformer 510, a switching unit 512, and a first controller 514.

To perform the step 484, the Fourier transformer 510 performs N-point Fourier transform on $r_k$ output from the fourth pre-processor 452 and outputs the result Rn of Fourier transform to the switching unit 512. The switching unit 512 outputs the result $R_n$ received from the Fourier transformer 510 as $R_n^{(v)}$ to the second sorter 462 in response to a selection signal $S_O$ output from the first controller 514. For this, the first controller 514 generates the selection signal $S_O$ in response to $L_v$ and a unique frequency offset number $n_v$ and outputs the selection signal $S_O$ to the switching unit 512.

After step 484, in step 486, the second sorter 462 classes the result $R_k^{(v)}$ received from the user signal detector 460 as a signal $R_{1,n}^{(v)}$ detected during an odd-numbered symbol block time and as a signal $R(_2v)$ detected during an even-numbered symbol block time and outputs the signals $R_{1,n}^{(v)}$ and $R_{2,n}^{(v)}$ to the second diversity equalizer 466, in response to a fourth switching signal $S_4$ received from the third controller 464. Here, each of the outputs $R_{1,n}^{(v)}$ and $R_{2,n}^{(v)}$ has a size of $N_v$. The second sorter 462 alternately outputs $R_{1,n}^{(v)}$ and $R_{2,n}^{(v)}$ to the second diversity equalizer 466 every symbol block time. For this, the third controller 464 outputs the fourth switching signal $S_4$ to the second sorter 462 so that $R_n^{(v)}$ can be output to the second diversity equalizer 466 as $R_{1,n}^{(v)}$ and $R_{2,n}^{(v)}$ alternately every symbol block time.

After step 486, in step 488, the second diversity equalizer 466 removes interchannel interference using the outputs $R_{1,n}^{(v)}$ and $R_{2,n}^{(v)}$ of the second sorter 462 and $H_{1,n}^{(v)}$ and $H_{1,n}^{(v)}$ and outputs the results $Z_{1,n}^{(v)}$ and $Z_{2,n}^{(v)}$ of removal of interchannel interference to the first and second inverse Fourier transformers 468 and 470, respectively. Here, the second diversity equalizer 466 may simultaneously output $Z_{1,n}^{(v)}$ and $Z_{2,n}^{(v)}$ to the respective first and second inverse Fourier transformers 468 and 470 or may alternately output $Z_{1,n}^{(v)}$ and $Z_{2,n}^{(v)}$ to the respective first and second inverse Fourier transformers 468 and 470 every symbol block time.

According to an embodiment of the present invention, the second diversity equalizer 466 can calculate $Z_{1,n}^{(v)}$ and $Z^{2,n(v)}$ according to a minimum mean square error (MMSE) method expressed by Formula (14).

$$Z_{1,n}^{(v)} = \frac{[H_{1,n}^{(v)}]^* R_{1,n}^{(v)} + H_{2,n}^{(v)} [R_{2,n}^{(v)}]^*}{|H_{1,n}^{(v)}|^2 + |H_{2,n}^{(v)}|^2 + 1/SNR}, \quad Z_{2,n}^{(v)} = \frac{[H_{2,n}^{(v)}]^* R_{1,n}^{(v)} - H_{1,n}^{(v)} [R_{2,n}^{(v)}]^*}{|H_{1,n}^{(v)}|^2 + |H_{2,n}^{(v)}|^2 + 1/SNR} \quad (14)$$

Here, n=0, 1, . . . , or $M_u-1$, and SNR indicates a ratio of a base station symbol for the v-th user to Gaussian noise and can be expressed by Formula (15).

$$SNR = \frac{E\{|a_k^{(v)}|^2\}}{E\{|n_k'|^2\}} = \frac{E\{|a_k^{(v)}|^2\}}{\alpha_v^2 L_v E\{|n_k|^2\}} \quad (15)$$

Here, $E\{|a_k^{(v)}|^2\}$ and $E\{|n'_k|^2\}$ indicate a mean power of $a^{k(v)}$ and a mean power of $n'_k$, respectively.

According to another embodiment of the present invention, the second diversity equalizer 466 can calculate $Z_{1,n}^{(v)}$ and $Z_{2,n}^{(v)}$ according to a zero forcing method expressed by Formula (16).

$$Z_{1,n}^{(v)} = \frac{[H_{1,n}^{(v)}]^* R_{1,n}^{(v)} + H_{2,n}^{(v)} [R_{2,n}^{(v)}]^*}{|H_{1,n}^{(v)}|^2 + |H_{2,n}^{(v)}|^2}, \quad Z_{2,n}^{(v)} = \frac{[H_{2,n}^{(v)}]^* R_{1,n}^{(v)} - H_{1,n}^{(v)} [R_{2,n}^{(v)}]^*}{|H_{1,n}^{(v)}|^2 + |H_{2,n}^{(v)}|^2} \quad (16)$$

Here, n=0, 1, . . . , or $M_u-1$.

If $\alpha_v \gamma_v = 1/L_v$, $R_{1,n}^{(v)}$, $R_{2,n}^{(v)}$, $H_{1,n}^{(v)}$, and $H_{2,n}^{(v)}$ in Formula (14) or (16) can be expressed by Formula (17).

$$R_{1,n}^{(v)} = A_{1,n}^{(v)} H_{1,n}^{(v)} + A_{2,n}^{(v)} H_{2,n}^{(v)} + N'_{1,n}$$

$$R_{2,n}^{(v)} = -[A_{2,n}^{(v)}]^* H_{1,n}^{(v)} + [A_{1,n}^{(v)}]^* H_{2,n}^{(v)} + N'_{2,n}$$

$$H_{1,n}^{(v)} = \sum_{l=0}^{L-1} h_{1,l} \exp[-j2\pi l(n/N_v + n_v/N)]$$

$$H_{2,n}^{(v)} = \sum_{l=0}^{L-1} h_{2,l} \exp[-j2\pi l(n/N_v + n_v/N)]$$

(17)

Here, $A_{1,n}^{(v)}$ and $A_{2,n}^{(v)}$ indicate the results of performing Fourier transform on $a_{1,k}^{(v)}$ and $a_{2,k}^{(v)}$, respectively, $N'_{1,n}$ and $N'_{2,n}$ indicate the results of performing Fourier transform on $n'_{1,k}$ and $n'_{2,k}$, respectively, $h_{1,l}$ indicates a channel impulse response of a symbol block signal received when the third block transmitter 354 transmits the symbol block signal, and $h_{2,l}$ indicates a channel impulse response of a symbol block signal received when the fourth block transmitter 356 transmits the symbol block signal.

After step 488, in step 490, the first inverse Fourier transformer 468 performs $N_v$-point inverse Fourier transform on the result $Z_{1,n}^{(v)}$ of removal of interchannel interference received from the second diversity equalizer 466 and outputs the result $Z_{1,k}^{(v)}$ of inverse Fourier transform as an odd-numbered user symbol for the v-th user to the fourth estimate value detector 456. Meanwhile, the second inverse Fourier transformer 470 performs $N_v$-point inverse Fourier transform on the result $Z_{2,n}^{(v)}$ of removal of interchannel interference received from the second diversity equalizer 466 and outputs the result $z_{2,k}^{(v)}$ of inverse Fourier transform as an even-numbered user symbol for the v-th user to the fourth estimate value detector 456.

After step 490, the fourth estimate value detector 456 detects estimate values $\hat{a}_{1,k}^{(v)}$ and $\hat{a}_{2,k}^{(v)}$ of the odd- and even-numbered base station symbols for the v-th user from the odd- and even-numbered symbols extracted by the second base station symbol extractor 454 in step 492. For this, the fourth estimate value detector 456 can include, for example, the first and second detectors 472 and 474, as shown in FIG. 32.

The first detector 472 detects the estimate value $\hat{a}_{1,k}^{(v)}$ of the odd-numbered base station symbol for the v-th user from the result $z_{2,k}^{(v)}$ of inverse Fourier transform received from the first inverse Fourier transformer 468. The second detector 474 detects the estimate value $\hat{a}_{2,k}^{(v)}$ of the even-numbered base station symbol for the v-th user from the result $Z^{2,k(v)}$ of inverse Fourier transform received from the second inverse Fourier transformer 470.

Meanwhile, each of the distributors 172 and 184 shown in FIGS. 12 and 13, the first and second switching units 370 and 372 shown in FIG. 29, the first sorter 402 and the distributors 408 and 410 shown in FIG. 30, and the second sorter 462 shown in FIG. 32 can be realized as a switch or a demultiplexer.

The first through fourth signal receivers 130, 240, 390, and 450 shown in FIGS. 9, 16, 30, and 32 can be configured as follows.

Figure 36:
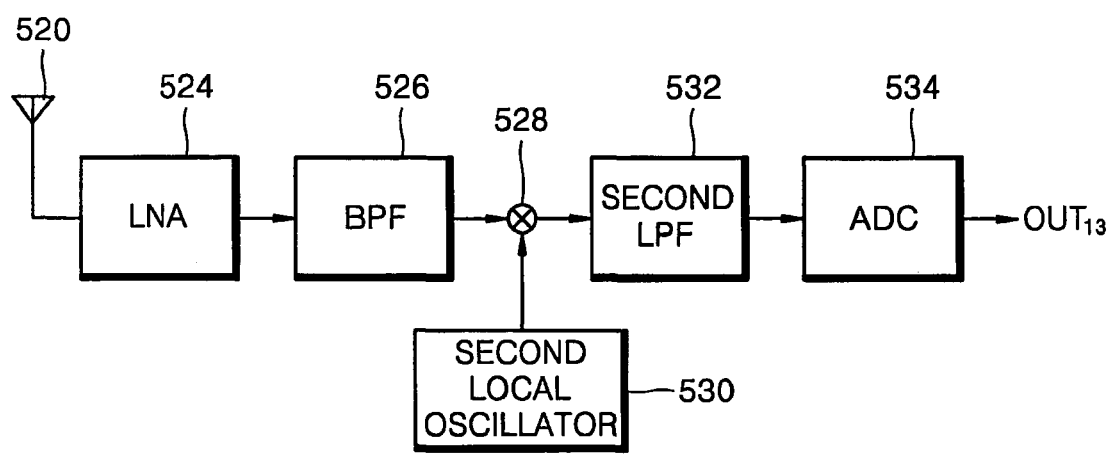
FIG. 36 is a block diagram of a general example of each of first through fourth signal receivers.

FIG. 36 is a block diagram of a general example of each of the first through fourth signal receivers 130, 240, 390, and 450. Each of the first through fourth signal receivers 130, 240, 390, and 450 includes an antenna 520, a low noise amplifier (LNA) 524, a band-pass filter (BPF) 526, a multiplier 528, a second local oscillator 530, a second LPF 532, and an analog-to-digital converter (ADC) 534.

Referring to FIG. 36, the LNA 524 amplifies a signal received through the antenna 520 and outputs the result of amplification to the BPF 526. The BPF 526 performs band-pass filtering on the result of amplification received from the LNA 524 and outputs the result of band-pass filtering to the multiplier 528. The multiplier 528 multiplies the result of band-pass filtering received from the BPF 526 by a carrier signal having a frequency -fc received from the second local oscillator 530 and outputs the result of multiplication as a baseband signal to the second LPF 532. The second LPF 532 performs low-pass filtering on the baseband signal and outputs the result of low-pass filtering to the ADC 534. The ADC 534 converts an analog signal resulting from low-pass filtering in the second LPF 532 into a digital signal and outputs the digital signal as a first or second symbol block to the corresponding pre-processor 132, 242, 392, or 452 through an output terminal $OUT_{13}$.

Fourier transform performed by each of the Fourier transformers 170, 180, 270, 280, 310, 400, 504, and 510 shown in FIGS. 12, 13, 19, 20, 23, 30, 34, and 35 may be discrete Fourier transform (DFT) or fast Fourier transform (FFT). Accordingly, inverse Fourier transform performed by each of the inverse Fourier transformers 174 through 176, 186 through 188, 276, 288, 314, 412 through 414, 416 through 418, 468, and 470 shown in FIGS. 12, 13, 19, 20, 23, 30, and 32 may be inverse discrete Fourier transform (IDFT) or inverse fast Fourier transform (IFFT).

Hereinafter, a data communication method for obtaining a frequency offset number $m_u$ or $n_v$ allocated to each user according to the present invention will be described with reference to the attached drawings.

Figure 37:
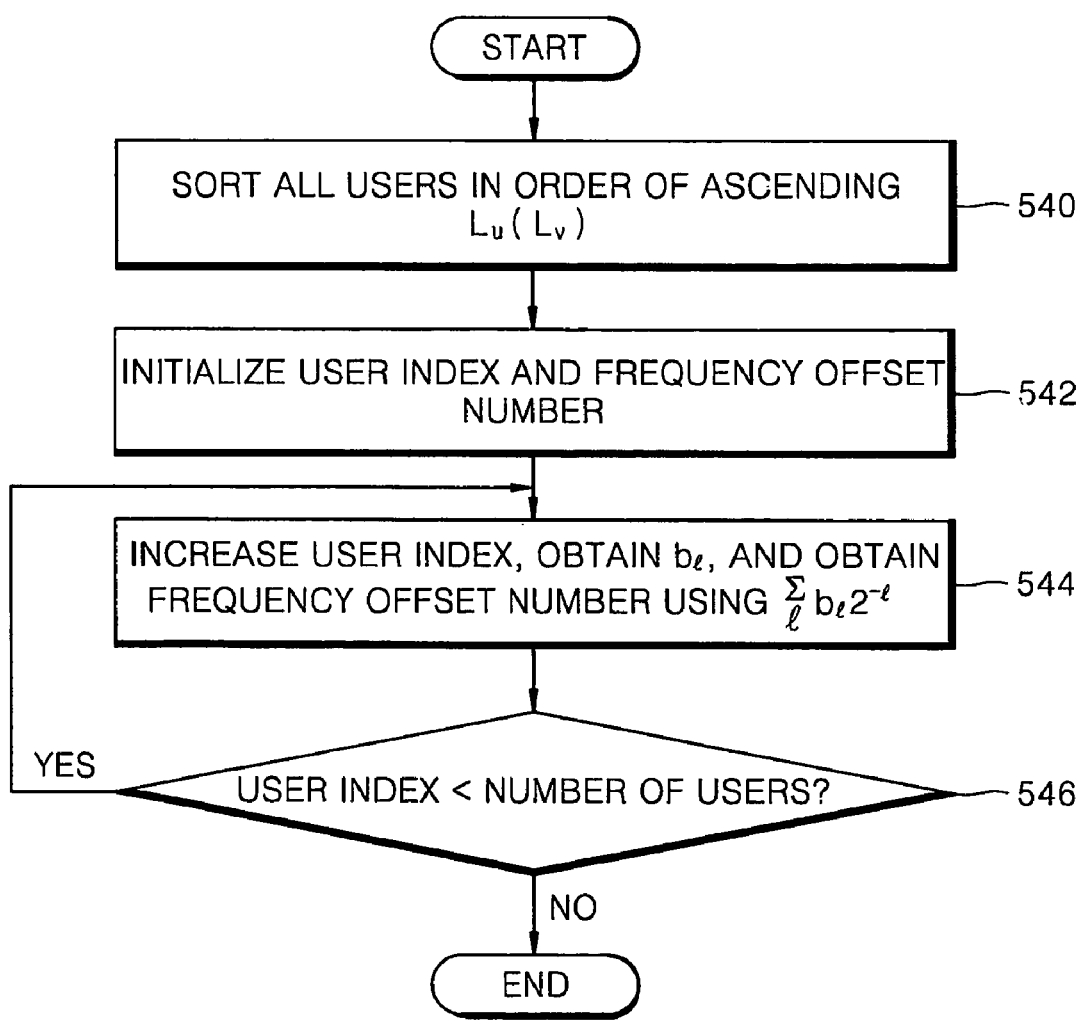
FIG. 37 is a flowchart of a data communication method for obtaining a frequency offset number according to the present invention.

FIG. 37 is a flowchart of a data communication method for obtaining a frequency offset number according to the present invention. In steps 540 through 546, a frequency offset number is obtained using the value of $L_u$ or $L_v$.

Referring to FIG. 37, to obtain a frequency offset number $m_u$ or $n_v$ according to a data communication method based on OFDMA according to the present invention, U or V users are sorted in order of ascending $L_u$ or $L_v$ in step 540. After step 540, a user index "u" or "v" and a frequency offset number $m_u$ or $n_v$ are initialized in step 542.

After step 542, the user index "u" or "v" is increased by 1, the value of $b_l \in \{0, 1\}$ satisfying Formula (18) is obtained, and the frequency offset number $m_u$ or $n_v$ expressed by Formula (19) is obtained using $b_l$ obtained from Formula (18), in step 544.

$$\sum_{i=1}^{u-1} L_i^{-1} = \sum_l b_l 2^{-l} \text{ or } \sum_{i=1}^{v-1} L_i^{-1} = \sum_l b_l 2^{-l} \quad (18)$$

$$m_u (\text{or } n_v) = \sum_l b_l 2^{l-1} \quad (19)$$

After step 544, it is determined whether the user index "u" or "v" is less than the number U or V of users in step 546. If it is determined that the user index "u" or "v" is less than the number U or V of users, the procedure of a data communication method goes to step 544. However, if it is determined that the user index "u" or "v" is not less than the number U or V of users, the procedure ends.

According to an embodiment of the present invention, the user index "u" or "v" and the frequency offset number $m_u$ or $n_v$ are initialized to 1 and 0, respectively, in step 542. In this case, the frequency offset number $m_u$ or $n_v$ is obtained according to Formula (19) in step 544.

According to another embodiment of the present invention, the user index "u" or "v" and the frequency offset number $m_u$ or $n_v$ are initialized to 1 and $L_1-1$, respectively, in step 542. In this case, the frequency offset number $m_u$ or $n_v$ is obtained according to Formula (20) in step 544.

$$m_u = L_u - 1 - \sum_l b_l 2^{l-1} \text{ or } n_v = L_v - 1 - \sum_l b_l 2^{l-1} \quad (20)$$

Hereinafter, the fact that a plurality of users can share a unit symbol block using the frequency offset number $m_u$ or $n_v$ obtained as described above will be described with reference to the attached drawings. Here, it is assumed that the number U or V of users is 4.

Figure 38:
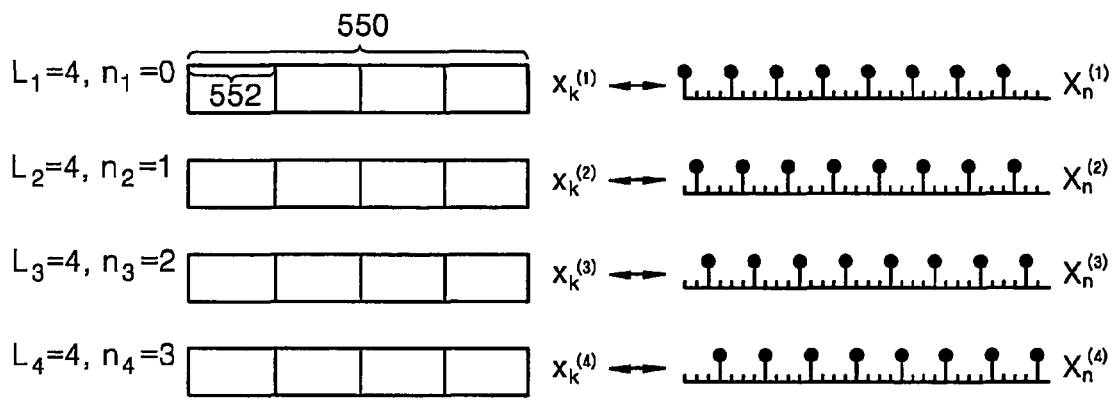
FIG. 38 is a diagram illustrating symbols in time and frequency domains when four users simultaneously transmit information at the same speed.

FIG. 38 is a diagram illustrating symbols $x_k^{(1)}$, $x_k^{(2)}$, $x_k^{(3)}$, and $x_k^{(4)}$ in a time domain and symbols $X_n^{(1)}$, $X_n^{(2)}$, $X_n^{(3)}$, and $X_n^{(4)}$ in a frequency domain when four users simultaneously transmit information at the same speed.

Referring to FIG. 38, when four users share M or N main symbols 550, that is, each of the users transmits $M_u$ (=M/4) or $N_v$ (=N/4) user symbols 552, frequency offset numbers $m_u$ or $n_v$ allocated to the respective four users are 0, 1, 2, and 3. Here, the M/4 or N/4 symbols allocated to a u- or v-th user are repeated four times to form main symbols having a size of M or N. The main symbols having a size of M or N have a frequency characteristic that a symbol $X_n^{(1)}$, $X_n^{(2)}$, $X_n^{(3)}$, or $X_n^{(4)}$ is non-zero only at a frequency of 4n (where n=0, 1, ..., (N/4 or M/4)−1) and is 0 at all other frequencies, as shown in FIG. 38.

In a spectrum of a result of multiplication of the main symbols having a size of M or N by $\exp(j2\pi k m_u/M)$ or $\exp(j2\pi k n_v/M)$ so that the frequencies of the main symbols are shifted by the frequency offset number $m_u$ or $n_v$, the symbol $X_n^{(1)}$, $X_n^{(2)}$, $X_n^{(3)}$, or $X_n^{(4)}$ is non-zero only at a frequency of $4n'+m_u$ or $4n'+n_v$ and is 0 at all other frequencies. Consequently, as shown in FIG. 38, the symbols $X_n^{(1)}$, $X_n^{(2)}$, $X_n^{(3)}$, and $X_n^{(4)}$ in a frequency domain for the four users occupy different frequency ranges so that signals do not interfere with one another in a frequency domain.

Figure 39:
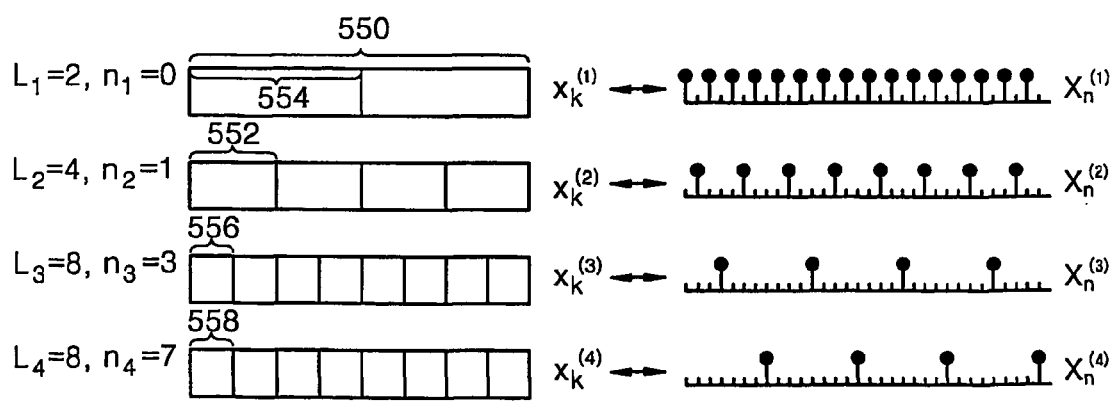
FIG. 39 is a diagram illustrating symbols in time and frequency domains when four users simultaneously transmit information at different speeds.

FIG. 39 is a diagram illustrating symbols $x_k^{(1)}$, $x_k^{(2)}$, $x_k^{(3)}$, and $x_k^{(4)}$ in a time domain and symbols $X_n^{(1)}$, $X_n^{(2)}$, $X_n^{(3)}$, and $X_n^{(4)}$ in a frequency domain when four users simultaneously transmit data at different speeds.

Referring to FIG. 39, when four users share M or N main symbols 550 in different manners, that is, the four users transmit M/2 or N/2 user symbols 554, M/4 or N/4 user symbols 552, M/8 or N/8 user symbols 556, and M/8 or N/8 user symbols 558, respectively, frequency offset numbers $m_u$ or $n_v$ allocated to the respective four users are 0, 1, 3, and 7. Here, M/2 or N/2 symbols 554 are repeated two times to form main symbols $x_k^{(1)}$ having a size of M or N for a first user, M/4 or N/4 symbols 552 are repeated four times to form main symbols $x_k^{(2)}$ having a size of M or N for a second user, M/8 or N/8 symbols 556 are repeated eight times to form main symbols $x_k^{(3)}$ having a size of M or N for a third user, and M/8 or N/8 symbols 558 are repeated eight times to form main symbols $x_k^{(4)}$ having a size of M or N for a fourth user.

Next, if main symbols having a size of M or N are multiplied by $\exp(j2\pi k m_u/M)$ or $\exp(j2\pi k n_v/M)$, as shown in FIG. 39, the symbols $X_n^{(1)}$, $X_n^{(2)}$, $X_n^{(3)}$, and $X_n^{(4)}$ in a frequency domain for the four users occupy different frequency ranges so that signals do not interfere with one another in a frequency domain.

If a frequency $S_u$ or $S_v$ occupied by each user is set as shown in Formula (21), a frequency offset number $m_u$ or $n_v$ is set to satisfy Formula (22) so that frequencies occupied by users do not overlap.

$$S_u = \{n | n = eL_u + n_u, 0 \leq e \leq M_u - 1\}$$

or $$S_v = \{n | n = eL_v + n_v, 0 \leq e \leq N_v - 1\} \quad (21)$$

$$S_i \cap S_j \neq 0 \quad (22)$$

Here, $i \neq j$.

In this case, a data communication method for obtaining a frequency offset shown in FIG. 37 according to the present invention satisfies Formula 22.

Hereinafter, a data communication method for generating a pilot symbol for estimating a channel according to the present invention will be described with reference to the attached drawings.

Figure 40:
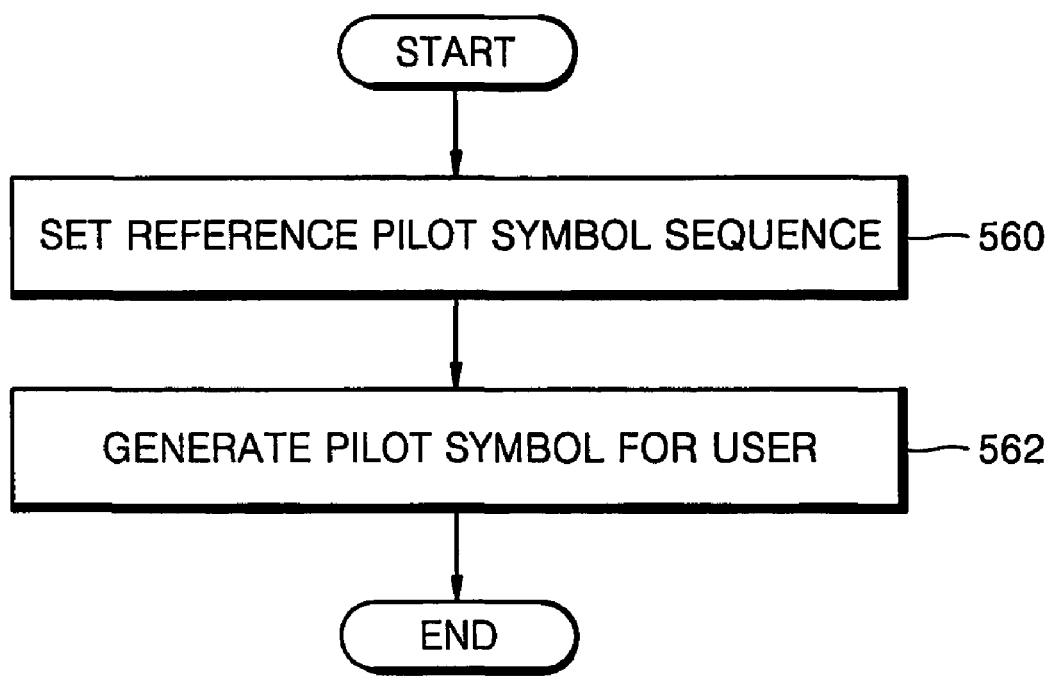
FIG. 40 is a flowchart of a data communication method for generating a pilot symbol according tot he present invention.

FIG. 40 is a flowchart of a data communication method for generating a pilot symbol according to the present invention. In steps 560 and 562, a reference pilot symbol sequence is set, and then a pilot symbol is generated.

Referring to FIG. 40, in order to generate a pilot symbol containing at least 2M or 2N symbols for estimating a channel, a reference pilot symbol sequence d[k] previously known to the user part 10 and the base station part 20 is set in step 560. Here, [k] indicates a set. After step 560, a pilot symbol $d^{(u)}[e]$ or $d^{(v)}[e]$ for a u- or v-th user is obtained in step 562.

According to an embodiment of the present invention, a pilot symbol $d^{(u)}[e]$ or $d^{(v)}[e]$ for a u- or v-th user can be obtained according to Formula (23).

$$d^{(u)}[e]=d[m_u+e\cdot L_u] \text{ or } d^{(v)}[e]=d[n_v+e\cdot L_v] \quad (23)$$

According to another embodiment of the present invention, a pilot symbol $d^{(u)}[e]$ or $d^{(v)}[e]$ for a u- or v-th user can be obtained according to Formula (24).

$$d^{(u)}[e]=d[e+S_{u-1}] \text{ or } d^{(v)}[e]=d[e+S_{v-1}] \quad (24)$$

Here, $S_u = \sum_{i=1}^{u} M_i$ or $S_v = \sum_{i=1}^{v} N_i$, and $S_0 = 0$.

A spectrum with respect to a pilot symbol generated according to Formula (23) or (24) may concentrates on a particular frequency. According to a data communication method of the present invention, the phase of a pilot symbol is changed arbitrarily so that a spectrum of the pilot symbol can be uniform throughout a frequency domain. For example, when a pilot symbol is a PSK symbol, the phase of a pilot symbol $d^{(u)}[e]$ or $d^{(v)}[e]$ generated according to Formula (23) or (24) is changed according to Formula (25) to obtain a new pilot symbol $d^{(u)}[e]'$ or $d^{(v)}[e]'$.

$$d^{(u)}[e]'=d^{(u)}[e]\cdot\exp(j\pi e/M) \text{ or } d^{(v)}[e]'=d^{(v)}[e]\cdot\exp(j\pi e/N) \quad (25)$$

The steps 560 and 562 of FIG. 40 can be performed by first or second user transmitting unit to generate a pilot symbol for a certain user in units of time slots and can be performed by a first or second base station transmitting unit to generate a pilot symbol for each of all users simultaneously using a given time slot. The first or second user transmitting unit receives a pilot symbol generated in step 562 instead of a user symbol. The first or second base station transmitting unit receives a pilot symbol generated in step 562 instead of a base station symbol. Here, each of the first and second user and base station transmitting units generates a pilot symbol block from the received pilot symbol like generating a first or second symbol block from the received user or base station symbol.

Hereinafter, a data communication apparatus and method based on OFDMA according to the present invention applied to various wireless communication environments will be described with reference to FIG. 41.

Figure 41:
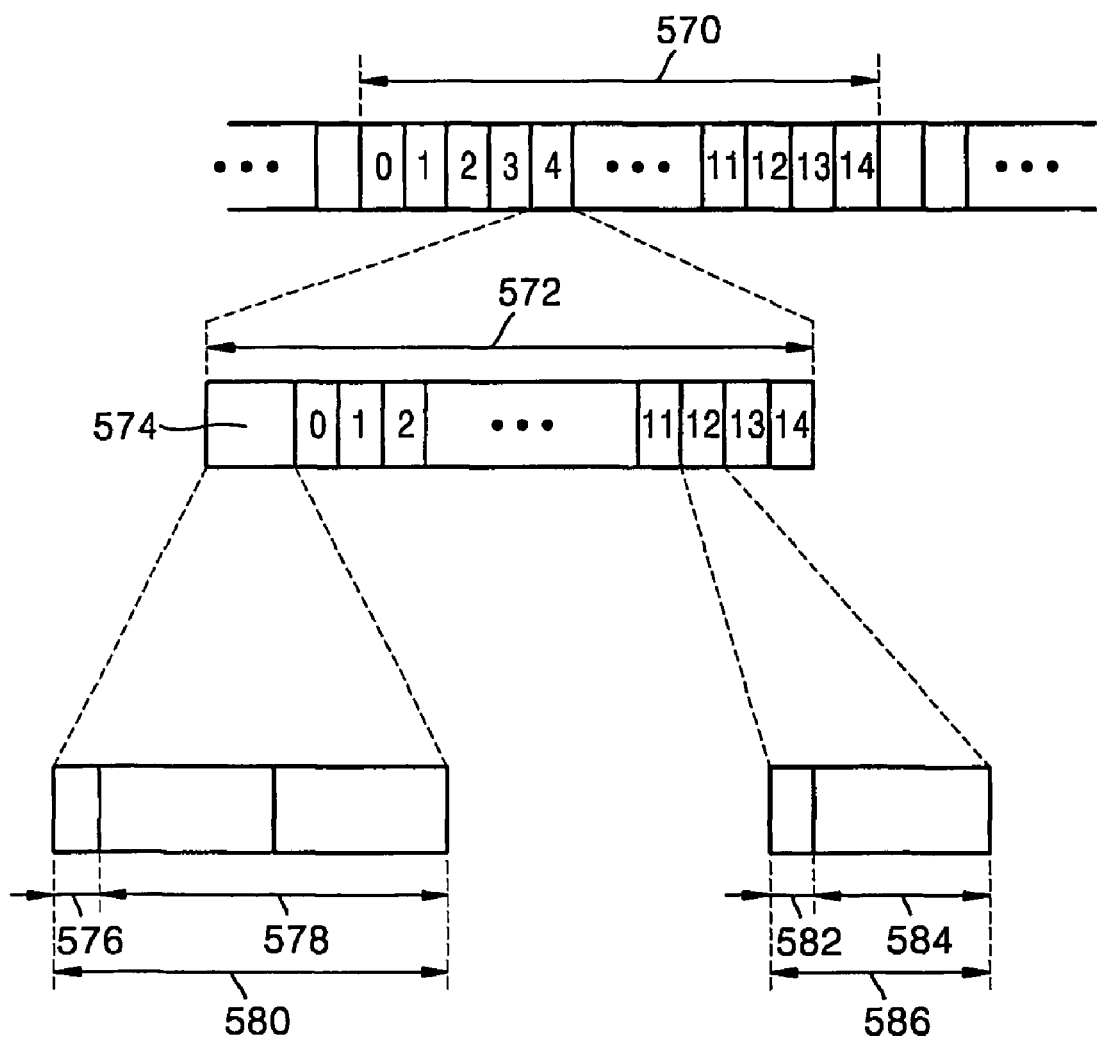
FIG. 41 is a diagram of a frame structure when a data communication apparatus and method according to the present invention are applied to a cellular communication environment.

FIG. 41 is a diagram of a frame structure when a data communication apparatus and method according to the present invention are applied to a cellular communication environment.

A data communication apparatus and method according to the present invention can be applied to wireless communication referred to as personal cellular communication. For example, a data communication apparatus according to the present invention can be designed to be suitable to specifications of a Wideband Code Division Multiple Access (WCDMA) Frequency Division Duplex (FDD) method in Universal Mobile Telecommunications Services (UMTS). In this case, for example, if it is assumed that the length of a unit frame 570 is 10 ms, 15 time slots exist in the unit frame 570, and a single time slot 572 is composed of 2560 samples (or symbols), a sampling speed R is 15*2560/10, i.e., 3.84 mega-samples per second (Msps). If the length M or N of main symbols 584 in a base symbol block 586 is 128 samples (39.58 ms) and if the length of a cyclic extension symbol 582 is 24 samples (6.25 ms), the length of the base symbol block 586 is 152 samples (39.58 ms). The single time slot 572 is provided with a pilot symbol block 574 at its front for synchronization and channel estimation of a receiving unit. Here, the pilot symbol block 574 has a cyclic extension block 576 composed of 24 samples and symbols 578 double the main symbols 584, so the pilot symbol block 574 is entirely composed of 280 samples. After the pilot symbol block 574, a total of 15 symbol blocks 0, 1, 2, . . . , 11, 12, 13, and 14 are provided in the single time slot 572. Accordingly, the number of symbols actually transmitted in the single time slot 572 composed of 2560 samples totals 15*M (or 15*N)=1920, so time slot efficiency is 1920/2560=3/4.

If it is assumed that a slot efficiency is ¾, a code rate is ½, and a maximum of 64 QAM can be performed, a maximum data transmission speed in a data communication apparatus and method according to the present invention applied to the above personal cellular communication is expressed by Formula (26).

6(bits/symbol)* 3.84(Msps)*¾(efficiency)*½(code rate)=8.64 Mpbs (26)

Here, if it is assumed that a user symbol is a binary PSK (BPSK) symbol, transmission is performed in only a single time slot per unit frame (i.e., 1/15), $M_u$ (or $N_v$) is set to 1, and only a single piece of symbol data is transmitted per symbol block, that is, if it is assumed that $M_u/M$ (or $N_v/N$)=1/128, a minimum data transmission speed in a data communication apparatus and method according to the present invention applied to the above personal cellular communication is expressed by Formula (27).

1(bits/symbol)*3.84(Msps)*¾(efficiency)*½(code rate)*1/15*1/128=750 bps (27)

As is inferred from Formulas (26) and (27), in a data communication apparatus and method according to the present invention applied to personal cellular communication, various data transmission speeds can be provided and the size of the hardware of an equalizer used in a receiving unit can be proportionally decreased as $M_u$ or $N_v$ decreases. For example, a first or second user receiving unit can be implemented at low cost by restricting a maximum value of $M_u$ or $N_v$ to 32 or 64. Here, the maximum data transmission speed of the first or second user receiving unit can be expressed by Formula (28).

$M_u$ (or $N_v$)=16:2(bits/symbol)*3.84(Msps)*¾(efficiency) *½(code rate)*16/128=360 Kbps $M_u$ (or $N_v$)=32:4(bits/symbol)*3.84(Msps)*¾(efficiency)*½(code rate)*32/128=1.44 Mbps $M_u$ (or $N_v$)=64:5(bits/symbol)*3.84(Msps)*¾(efficiency)*½(code rate)*64/128=3.6 Mbps (28)

Here, the kind of QAM available is restricted such that a maximum of 4 QAM is used when $M_u$ or $N_v$ is set to 16, a maximum of 16 QAM is used when $M_u$ or $N_v$ is set to 32, and a maximum of 32 QAM is used when $M_u$ or $N_v$ is set to 64.

Consequently, when a data communication apparatus and method according to the present invention are applied to a personal cellular communication environment using a single data format, user and base station receiving units having different hard complexities can be implemented.

In addition, a data communication apparatus and method according to the present invention can be applied to a wireless local area network (LAN) environment. In this case, a sampling speed is 16 MHz, a cyclic extension block is composed of 16 samples (1 ms), and main symbols in a unit symbol block are compose of 64 samples (4 ms). Thus, the unit symbol block is composed of a total of 80 samples (5 ms). Here, first and second user and base station receiving units can appropriately select the value of $M_u$ or $N_v$ to a data communication speed.

As described above, in a data communication apparatus and method based on OFDMA according to the present invention, a unit symbol block can be shared by many users through frequency division multiple access so that data transmission speed can be freely changed. The present invention can allow a symbol block signal transmitted from a first or second user transmitting unit to have the same PAR as that of a single carrier signal used in conventional technology. Since the PAR of a symbol block signal transmitted from a first or second base station transmitting unit is proportional to the number U or V of users sharing the single symbol block and the number U or V of user is usually very small compared to the size of a FFT block in a conventional data communication method based on OFDM, the present invention provides a far less PAR than the conventional data communication method based on OFDM. Considering that signal interference due to a frequency offset increases in proportional to the number of users using a given time slot, the present invention can be far less influenced by the signal interference than conventional communication apparatuses based on OFDM. Like conventional communication methods based on OFDM, the present invention transmits information in units of blocks and adds a cyclic extension block, thereby preventing interferences of channels from occurring between blocks received by the first or second user or base station receiving unit and effectively compensating for distortion between channels using an equalizer provided for each unit block. Since a diversity equalizer using a space-time code according to the present invention is as simple as an equalizer used in conventional communication methods based on OFDM, the present invention can be effectively applied to a high-speed communication environment having severe interference between channels. Since the present invention provides higher spectrum efficiency than conventional data communication methods based on code division multiple access (CDMA) and easily handles wireless channel fading, the present invention is more suitable to high-speed data communication than conventional data communication methods based on CDMA. Moreover, the present invention can simplify the hardware of an equalizer used in the first or second user receiving unit by restricting the number $M_u$ or $N_v$ of symbols actually transmitted per symbol block, thereby reducing the manufacturing cost of the first or second user receiving unit.

What is claimed is:

1. A data communication apparatus based on orthogonal frequency division multiple access (OFDMA) comprising a first user transmitting unit through which a user transmits user information to a base station in units of first symbol blocks each including a first predetermined number M of symbols in data communication between the user and the base station, the first user transmitting unit comprising:

a first encoder for generating a first sub-block composed of a second predetermined number $M_u$ of user symbols $a_k^{(u)}$ for a u-th user by encoding the user information, where $M_u$ is an integer greater than or equal to 1 and no greater than M, "k" is a time index and an integer greater than or equal to 0 and no greater than M−1, "u" is a user index and an integer greater than or equal to 1 and no greater than U, and U indicates the number of users sharing the first symbol block and is 1 or a positive integer greater than 1;

a first block repeater for repeating the first sub-block a third predetermined number $L_u$ of times to generate M symbols $a_{k'}^{(u)}$, wherein $L_u$ is $M/M_u$, k'=k % $M_u$, and k % $M_u$ indicates the remainder when "k" is divided by $M_u$;

a first multiplier for multiplying the M symbols $a_{k'}^{(u)}$ generated from the first block repeater by $\gamma_u$ exp $(j2\pi km_u/M)$ and outputting the result of multiplication as a signal $x_k^{(u)}$ for the u-th user, wherein $\gamma_u$ indicates a magnitude control factor for the u-th user signal $x_k^{(u)}$, and $m_u$ indicates a unique frequency offset number allocated to the u-th user;

a first cyclic extension symbol inserter for outputting the first symbol block completed by inserting a cyclic extension symbol into the u-th user signal $x_k^{(u)}$; and a first signal transmitter for converting the completed first symbol block into a symbol block signal and transmitting the symbol block signal, wherein $M_1+M_2+M_3+\ldots+M_u$ does not exceed M where M represents the number of symbols in data communication between the user and the base station, Mu is an integer greater than or equal to 1 and no greater than M, 'u' is a user index and an integer greater than or equal to 1 and no greater than U, and U indicates the number of users sharing the first symbol block and is 1 or a positive integer greater than 1.

2. The data communication apparatus of claim 1, wherein the number $M_u$ of symbols $a_k^{(u)}$ used for generating the first sub-block is an exponential with base 2.

3. The data communication apparatus of claim 1, wherein the number U of users sharing the first symbol block varies with the first symbol block.

4. A data communication apparatus based on orthogonal frequency division multiple access (OFDMA) in data communication between a fourth predetermined number V of users and a base station, V indicating the number of users sharing a second symbol block and being 1 or a positive integer greater than 1, the data communication apparatus comprising a first base station transmitting unit through which the base station transmits base station information to a v-th user in units of the second symbol blocks each including a fifth predetermined number N of symbols "v" being a user index and an integer greater than or equal to 1 and no greater than V, the first base station transmitting unit comprising:

second through (V+1)-th encoders;
second through (V+1)-th block repeaters;
second through (V+1)-th multipliers;
a first adder;
a second cyclic extension symbol inserter; and
a second signal transmitter,
wherein the (v+1)-th encoder generates a (v+1)-th sub-block composed of a sixth predetermined number $N_v$ of base station symbols $a_k^{(v)}$ for a v-th user by encoding the base station information and outputs the (v+1)-th sub-block to the (v+1)-th block repeater, $N_v$ being an integer greater than or equal to 1 and less than or equal to N, "k" being a time index and an integer greater than or equal to 0 and less than or equal to N−1, the (v+1)-th block repeater repeats the (v+1)-th sub-block a seventh predetermined number $L_v$ of times to generate N symbols $a_{k'}^{(v)}$ and outputs the N symbols $a_{k'}^{(v)}$ to the (v+1)-th multiplier, $L_v$ being $N/N_v$, k'=k % $N_v$, k % $N_v$ indicating the remainder when "k" is divided by $N_v$, the (v+1)-th multiplier multiplies the N symbols $a_{k'}^{(v)}$ by $\gamma_v \exp(j2\pi k n_v/N)$ and outputs the result $x_k^{(v)}$ of multiplication to the first adder, $\gamma_v$ indicating a magnitude control factor for a v-th user signal, $n_v$ indicating a unique frequency offset number allocated to the v-th user, the first adder sums the results $x_k^{(1)}$ through $x_k^{(V)}$ of multiplication received from the second through (V+1)-th multipliers and outputs the result $x_k$ of summation to the second cyclic extension symbol inserter, the second cyclic extension symbol inserter outputs the single second symbol block completed by inserting a cyclic extension symbol into the result $x_k$ of summation to the second signal transmitter, the second signal transmitter converts the completed second symbol block into a symbol block signal and transmits the symbol block signal, and $N_1+N_2+N_3+\ldots+N_v$ does not exceed N where N represents the number of second symbol blocks in data communication between the user and the base station, Nv is an integer greater than or eciual to 1 and less than or equal to N, 'v' is a user index and an integer greater than or equal to 1 and no greater than V, and V indicates the number of users sharing the second symbol block and is 1 or a positive integer greater than 1.

5. A data communication apparatus based on orthogonal frequency division multiple access (OFDMA) comprising a first base station receiving unit which receives a symbol block signal transmitted from each of U first user transmitting units and estimates u-th user symbols from the symbol block signal, U indicating the number of users sharing a first symbol block having M symbols and being 1 or a positive integer greater than 1, "u" being a user factor and an integer greater than or equal to 1 and no greater than M, the first base station receiving unit comprising:

a first signal receiver for converting the received symbol block signal into the first symbol block and outputting the first symbol block;

a first pre-processor for finding a start point of the first symbol block received from the first signal receiver, removing a cyclic extension symbol from the first symbol block on the basis of the start point, and outputting the result $r_k$ of removal of the cyclic extension symbol, wherein "k" is a time index and an integer greater than or equal to 0 and less than or equal to M−1;

a first user symbol extractor for extracting only the u-th user symbols from the result $r_k$ received from the first pre-processor; and a first estimate value detector for detecting an estimate value $\hat{a}_k^{(u)}$ for a u-th user symbol from the u-th user symbols extracted by the first user symbol extractor.

6. The data communication apparatus of claim 5, wherein the first estimate value detector comprises first through U-th detectors and the u-th detector detects the user symbol estimate value $\hat{a}_k^{(u)}$ from the u-th user symbols output from the first user symbol extractor.

7. The data communication apparatus of claim 6, wherein the first user symbol extractor comprises:

(V+2)-th through (U+V+1)-th multipliers; and first through U-th post-processors, the (u+V+1)-th multiplier multiplies the result $r_k$ output from the first pre-processor by $\alpha_u \exp(-j2\pi k m_u/M)$ and outputs the result of multiplication as a u-th user signal $\tilde{r}_k^{(u)}$ to the u-th post-processor, $\alpha_u$ indicating a magnitude control factor, $m_u$ indicating a unique frequency offset number previously allocated to the u-th user, the u-th post-processor folds and adds the u-th user signal $\tilde{r}_k^{(u)}$ output from the (u+V+1)-th multiplier with a period of $M_u$ and outputs the result of folding and addition as the u-th user symbol $r_k^{(u)}$ to the u-th detector, $M_u$ being an integer greater than or equal to 1 and less than or equal to M, and the u-th detector detects the user symbol estimate value $\hat{a}_k^{(u)}$ from the u-th user symbol $r_k^{(u)}$ output from the u-th post-processor.

8. The data communication apparatus of claim 6, wherein the first user symbol extractor comprises:

a Fourier transformer for performing M-point Fourier transform on the result $r_k$ output from the first pre-processor and outputting the result $R_n$ of Fourier transform, "n" indicating a frequency factor and being an integer greater than or equal to 0 and less than or equal to M−1;

first through U-th inverse Fourier transformers;

a first controller for generating a selection signal in response to $L_u$ and a unique frequency offset number $m_u$ previously allocated to the u-th user, $L_u$ being $M/M_u$, $M_u$ being an integer greater than or equal to 1 and less than or equal to M; and a distributor for outputting the result $R_n$ output from the Fourier transformer as $R_n^{(u)}$ to the u-th inverse Fourier transformer in response to the selection signal, the u-th inverse Fourier transformer performs $M_u$-point inverse Fourier transform on $R_n^{(u)}$ and outputs the result of inverse Fourier transform as the u-th user symbol $r_k^{(u)}$ to the u-th detector, and the u-th detector detects the user symbol estimate value $\hat{a}_k^{(u)}$ for the u-th user from the u-th user symbol $r_k^{(u)}$ output from the u-th inverse Fourier transformer.

9. The data communication apparatus of claim 6, wherein the first user symbol extractor comprises:

a Fourier transformer for performing M-point Fourier transform on the result $r_k$ output from the first pre-processor and outputting the result $R_n$ of Fourier transform, wherein "n" indicates a frequency factor and is an integer greater than or equal to 0 and no greater than M−1;

a first frequency equalizer for multiplying the result $R_n$ output from the Fourier transformer by a first predetermined complex number and outputting the result $Z_n$ of multiplication;

first through U-th inverse Fourier transformers;

a first controller for generating a selection signal in response to $L_u$ and a unique frequency offset number $m_u$ previously allocated to the u-th user, $L_u$ being $M/M_u$, $M_u$ being an integer greater than or equal to 1 and less than or equal to M; and a distributor for outputting the result $Z_n$ output from the first frequency equalizer as $Z_n^{(u)}$ to the u-th inverse Fourier transformer in response to the selection signal, the u-th inverse Fourier transformer performs $M_u$-point inverse Fourier transform on $Z_n^{(u)}$ output from the distributor and outputs the result of inverse Fourier transform as the u-th user symbol $z_k^{(u)}$ to the u-th detector, and the u-th detector detects the user symbol estimate value $\hat{a}_k^{(u)}$ for the u-th user from the u-th user symbol $z_k^{(u)}$ output from the u-th inverse Fourier transformer.

10. The data communication apparatus of claim 6, wherein the first user symbol extractor comprises:
   a first time equalizer for removing interchannel interference from the result $r_k$ output from the first pre-processor and outputting the result $z_k$ of removal of the interchannel interference;
   (V+U+2)-th through (2U+V+1)-th multipliers; and
   (U+1)-th through 2U-th post-processors,
   the (u+V+U+1)-th multiplier multiplies the result $z_k$ output from the first time equalizer by $\alpha_u \exp(-j2\pi km_u/M)$ and outputs the result of multiplication as a u-th user signal $\tilde{z}_k^{(u)}$ for the u-th user to the (u+U)-th post-processor, $\alpha_u$ indicating a magnitude control factor, $m_u$ indicating a unique frequency offset number previously allocated to the u-th user,
   the (u+U)-th post-processor folds and adds the u-th user signal $\tilde{z}_k^{(u)}$ output from the (u+V+U+1)-th multiplier with a period of $M_u$ and outputs the result of folding and addition as the u-th user symbol $z_k^{(u)}$ to the u-th detector, $M_u$ being an integer greater than or equal to 1 and less than or equal to M, and
   the u-th detector detects the user symbol estimate value $\hat{a}_k^{(u)}$ for the u-th user from the u-th user symbol $z_k^{(u)}$ output from the (u+U)-th post-processor.

11. The data communication apparatus of claim 10, wherein the first time equalizer comprises a finite impulse response (FIR) filter which performs FIR filtering on the result $r_k$ output from the first pre-processor and outputs the result of filtering as the result of removal of the interchannel interference.

12. The data communication apparatus of claim 10, wherein the first time equalizer comprises:
   a Fourier transformer for performing M-point Fourier transform on the result $r_k$ output from the first pre-processor and outputting the result of Fourier transform;
   a third frequency equalizer for multiplying M signals output from the Fourier transformer by a third predetermined complex number and outputting the result of multiplication; and
   an inverse Fourier transformer for performing M-point inverse Fourier transform on the result of multiplication output from the third frequency equalizer and outputting the result of inverse Fourier transform as the result $z_k$ of removal of the interchannel interference.

13. The data communication apparatus of claim 6, wherein the first user symbol extractor comprises:
   (V+2)-th through (U+V+1)-th multipliers;
   first through U-th post-processors; and
   second through (U+1)-th time equalizers,
   the (u+V+1)-th multiplier multiplies the result $r_k$ output from the first pre-processor by $\alpha_u \exp(-j2\pi km_u/M)$ and outputs the result of multiplication as a u-th user signal $\tilde{r}_k^{(u)}$ for the u-th user to the u-th post-processor, $\alpha_u$ indicating a magnitude control factor, $m_u$ indicating a unique frequency offset number previously allocated to the u-th user,
   the u-th post-processor folds and adds the u-th user signal $\tilde{r}_k^{(u)}$ output from the (u+V+1)-th multiplier with a period of $M_u$ and outputs the result $r_k^{(u)}$ of folding and addition to the (u+1)-th time equalizer, $M_u$ being an integer greater than or equal to 1 and less than or equal to M,
   the (u+1)-th time equalizer removes interchannel interference from the result $r_k^{(u)}$ output from the u-th post-processor and outputs the result of removal of the interchannel interference as the u-th user symbol $z_k^{(u)}$ to the u-th detector, and
   the u-th detector detects the user symbol estimate value $\hat{a}_k^{(u)}$ for the u-th user from the u-th user symbol $z_k^{(u)}$ output from the (u+1)-th time equalizer.

14. The data communication apparatus of claim 13, wherein each of the second through (U+1)-th time equalizers comprises:
   a Fourier transformer for performing $M_u$-point Fourier transform on the result $r_k$ output from the first pre-processor and outputting the result of Fourier transform;
   a third frequency equalizer for multiplying $M_u$ signals output from the Fourier transformer by a third predetermined complex number and outputting the result of multiplication; and
   an inverse Fourier transformer for performing $M_u$-point inverse Fourier transform on the result of multiplication output from the third frequency equalizer and outputting the result of inverse Fourier transform as the result $z_k^{(u)}$ of removal of the interchannel interference.

15. The data communication apparatus of claim 13, wherein each of the second through (U+1)-th time equalizers comprises:
   a first finite impulse response (FIR) filter for performing FIR filtering on the result $r_k^{(u)}$ and outputting the result of filtering;
   a delay unit for delaying the estimate value and outputting the result of delay;
   a second FIR filter for performing FIR filtering on the result of delay and outputting the result of filtering; and
   a second adder for adding the results of filtering received from the first and second FIR filters and outputting the result of addition as the result $z_k^{(u)}$ of removal of the interchannel interference.

16. A data communication method based on orthogonal frequency division multiple access (OFDMA) through which the first base station receiving unit of the data communication apparatus of claim 5 estimates a u-th user symbol from the symbol block signal, the data communication method comprising the steps of:
   (m1) converting the received symbol block signal into the first symbol block;
   (n1) finding a start point of the first symbol block and removing the cyclic extension symbol from the first symbol block on the basis of the start point;
   (o1) extracting only the u-th user symbols from the result $r_k$ of removal of the cyclic extension symbol; and
   (p1) detecting the estimate value $\hat{a}_k^{(u)}$ of the user symbol for the u-th user from the extracted u-th user symbols.

17. The data communication method of claim 16, wherein the step (o1) comprises:
   multiplying the result $r_k$ obtained in step (n1) by $\alpha_1 \exp(-j2\pi km_1/M)$ through $\alpha_U \exp(-j2\pi km_U/M)$ to obtain $\tilde{r}_k^{(1)}$ through $\tilde{r}_k^{(U)}$; and
   performing folding and addition on each of $\tilde{r}_k^{(1)}$ through $\tilde{r}_k^{(U)}$ with a period of $M_u$ to obtain U user symbols $r_k^{(1)}$ through $r_k^{(U)}$, and going to step (p1).

18. The data communication method of claim 16, wherein step (o1) comprises:
   (o11) performing M-point Fourier transform on the result $r_k$ obtained in step (n1); and
   (o12) when the result of Fourier transform is for the u-th user, performing $M_u$-point inverse Fourier transform on the result of Fourier transform to obtain the u-th user symbol $r_k^{(u)}$, and going to the step (p1).

19. The data communication method of claim 18, wherein step (o1) further comprises (o13) performing compensation on phase and magnitude of the result of Fourier transform obtained in step (o11), and when the result of compensation obtained in step (o13) is for the u-th user, step (o12) comprises performing $M_u$-point inverse Fourier transform on the result of compensation to obtain the u-th user symbol $r_k^{(u)}$, and going to step (p1).

20. The data communication method of claim 16, wherein the step (o1) comprises:
removing interchannel interference from the result $r_k$ obtained in step (n1);
multiplying the result $z_k$ of removal of the interchannel interference by $\alpha_1 \exp(-j2\pi km_1/M)$ through $\alpha_U \exp(-j2\pi km_U/M)$ to obtain user signals $\tilde{z}_k^{(1)}$ through $\tilde{z}_k^{(U)}$; and
performing folding and addition on each of the user signals $\tilde{z}_k^{(1)}$ through $\tilde{z}_k^{(U)}$ with a period of $M_u$ to obtain the user symbols $z_k^{(1)}$ through $z_k^{(U)}$, and going to the step (p1).

21. The data communication method of claim 20, wherein the interchannel interference is removed by finite impulse response filtering.

22. The data communication method of claim 20, wherein the step of removing the interchannel interference comprises:
performing M- or N-point Fourier transform on the result $r_k$;
multiplying M or N signals obtained from Fourier transform by a third predetermined complex number; and
performing M- or N-point inverse Fourier transform on the result of multiplication to obtain the result $z_k$ of removal of the interchannel interference.

23. The data communication method of claim 16, wherein the step (o1) comprises the steps of:
multiplying the result $r_k$ obtained in step (n1) by $\alpha_1 \exp(-j2\pi km_1/M)$ through $\alpha_U \exp(-j2\pi km_U/M)$ to obtain user signals $\tilde{r}_k^{(1)}$ through $\tilde{r}_k^{(U)}$;
performing folding and addition on the user signals $\tilde{r}_k^{(1)}$ through $\tilde{r}_k^{(U)}$ with a period of $M_u$; and
removing interchannel interference from the results $r_k^{(1)}$ through $r_k^{(U)}$ to obtain the u-th user symbol $z_k^{(u)}$, and going to the step (p1).

24. The data communication method of claim 23, wherein the step of removing the interchannel interference comprises:
performing $M_u$- or $N_v$-point Fourier transform on the result $r_k$;
multiplying $M_u$ or $N_v$ signals obtained from Fourier transform by a third predetermined complex number; and
performing $M_u$- or $N_v$-point inverse Fourier transform on the result of multiplication to obtain the result $z_k^{(u)}$ of removal of the interchannel interference.

25. The data communication method of claim 23, wherein the step of removing the interchannel interference comprises:
(t) performing finite impulse response filtering on the result $r_k^{(u)}$;
(u) delaying the estimate value and performing finite impulse response filtering on the result of delay; and
(v) summing the results of filtering obtained in steps (t) and (u) to obtain the result $z_k^{(u)}$ of removal of the interchannel interference.

26. A data communication apparatus based on orthogonal frequency division multiple access (OFDMA) comprising a first user receiving unit which receives a symbol block signal transmitted from a first base station transmitting units and estimates a base station symbol for a v-th user from the received symbol block signal, "v" being a user factor and an integer greater than or equal to 1 and no greater than V, V indicating the number of users sharing a second symbol block having N symbols and being 1 or a positive integer greater than 1, the first user receiving unit comprising:
a second signal receiver for converting the symbol block signal received from the first base station transmitting unit into the second symbol block and outputting the second symbol block;
a second pre-processor for finding a start point of the second symbol block received from the second signal receiver, removing a cyclic extension symbol from the second symbol block on the basis of the start point, and outputting the result $r_k$ of removal of the cyclic extension symbol, wherein k" is a time index and an integer greater than or equal to 0 and less than or equal to N−1;
a first base station symbol extractor for extracting only symbols for the v-th user from the result $r_k$ received from the second pre-processor; and
a second estimate value detector for detecting an estimate value $\hat{a}_k^{(v)}$ of the base station symbol for the v-th user from the symbols for the v-th user output from the first base station symbol extractor.

27. The data communication apparatus of claim 26, wherein the first base station symbol extractor comprises:
a (2U+V+2)-th multiplier for multiplying the result $r_k$ output from the second pre-processor by $\alpha_v \exp(-j2\pi kn_v/N)$ and outputting the result $\tilde{r}_k^{(v)}$ of multiplication, $\alpha_v$ indicating a magnitude control factor, $n_v$ indicating a unique frequency offset number previously allocated to the v-th user; and
a (2U+1)-th post-processor for folding and adding the results $\tilde{r}_k^{(v)}$ output from the (2U+V+2)-th multiplier with a period of $N_v$ and outputting the result $r_k^{(v)}$ of folding and addition to the second estimate value detector, $N_v$ being an integer greater than or equal to 1 and less than or equal to N, and
the second estimate value detector detects the estimate value $\hat{a}_k^{(v)}$ of the base station symbol for the v-th user from the result $r_k^{(v)}$ output from the (2U+1)-th post-processor.

28. The data communication apparatus of claim 26, wherein the first base station symbol extractor comprises:
a Fourier transformer for performing N-point Fourier transform on the result $r_k$ output from the second pre-processor and outputting the result $R_n$ of Fourier transform, "n" indicating a frequency factor and being an integer greater than or equal to 0 and no greater than N−1;
a first controller for generating a selection signal in response to $L_v$ and a unique frequency offset number $n_v$ previously allocated to the v-th user, $L_v$ being $N/N_v$, $N_v$ being an integer greater than or equal to 1 and no greater than N;
an inverse Fourier transformer for performing $N_v$-point inverse Fourier transform on $R_n^{(v)}$ and outputting the result $r_k^{(v)}$ of inverse Fourier transform to the second estimate value detector; and
a switching unit for sorting out only a signal $R_n^{(v)}$ for the v-th user from $R_n$ received from the Fourier transformer in response to the selection signal and outputting the signal $R_n^{(v)}$ to the inverse Fourier transformer, and the second estimate value detector detects the estimate value $\hat{a}_k^{(v)}$ of the base station symbol for the v-th user from the result $r_k^{(v)}$ output from the inverse Fourier transformer.

29. The data communication apparatus of claim 28, wherein the first base station symbol extractor further comprises a second frequency equalizer for multiplying the signal $R_n^{(v)}$ output from the switching unit by a second predetermined complex number and outputting the result $Z_{n}^{(v)}$ of multiplication to the inverse Fourier transformer, and the inverse Fourier transformer performs $N_v$-point inverse Fourier transform on the result $Z_n^{(v)}$ output from the second frequency equalizer and outputs the result $z_k^{(v)}$ of inverse Fourier transform to the second estimate value detector.

30. The data communication apparatus of claim 26, wherein the first base station symbol extractor comprises:
    a (U+2)-th time equalizer for removing interchannel interference from the result $r_k$ output from the second pre-processor and outputting the result $z_k$ of removal of the interchannel interference;
    a (2U+V+3)-th multiplier for multiplying the result $z_k$ output from the (U+2)-th time equalizer by $\alpha_v \exp(-j2\pi k n_v/N)$ and outputting the result $\tilde{z}_k^{(v)}$ of multiplication, $\alpha_v$ indicating a magnitude control factor for a v-th user signal, $n_v$ indicating a unique frequency offset number previously allocated to the v-th user; and
    a (2U+2)-th post-processor for folding and adding the results $\tilde{z}_k^{(v)}$ output from the (2U+V+3)-th multiplier with a period of $N_v$ and outputting the result $z_k^{(v)}$ of folding and addition to the second estimate value detector, $N_v$ being an integer greater than or equal to 1 and less than or equal to N, and
    the second estimate value detector detects the estimate value $\hat{a}_k^{(v)}$ of the base station symbol for the v-th user from the result $z_k^{(v)}$ output from the (2U+2)-th post-processor.

31. The data communication apparatus of claim 30, wherein the (U+2)-th time equalizer comprises a finite impulse response (FIR) filter which performs FIR filtering on the result $r_k$ output from the second pre-processor and outputs the result of filtering as the result of removal of the interchannel interference.

32. The data communication apparatus of claim 26, wherein the first base station symbol extractor comprises:
    a (2U+V+2)-th multiplier for multiplying the result $r_k$ output from the second pre-processor by $\alpha_v \exp(-j2\pi k n_v/N)$ and outputting the result $\tilde{r}_k^{(v)}$ of multiplication, $\alpha_v$ indicating a magnitude control factor for a v-th user signal, $n_v$ indicating a unique frequency offset number previously allocated to the v-th user;
    a (2U+1)-th post-processor for folding and adding the results $\tilde{r}_k^{(v)}$ output from the (2U+V+2)-th multiplier with a period of $N_v$ and outputting the result $\tilde{r}_k^{(v)}$ of folding and addition, $N_v$ being an integer greater than or equal to 1 and less than or equal to N; and
    a (U+3)-th time equalizer for removing interchannel interference from the result $\tilde{r}_k^{(v)}$ output from the (2U+1)-th post-processor and outputting the result $z_k^{(v)}$ of removal of the interchannel interference to the second estimate value detector, and
    the second estimate value detector detects the estimate value $\hat{a}_k^{(v)}$ of the base station symbol for the v-th user from the result $z_k^{(v)}$ output from the (U+3)-th time equalizer.

33. A data communication method based on orthogonal frequency division multiple access (OFDMA) through which the first user receiving unit of the data communication apparatus of claim 26 estimates the base station symbol from the symbol block signal transmitted from the first base station transmitting unit, the data communication method comprising the steps of:
    (m2) converting the received symbol block signal into the second symbol block;
    (n2) removing the cyclic extension symbol from the second symbol block;
    (o2) extracting only the symbols for the v-th user from the result $r_k$ of removal of the cyclic extension symbol; and
    (p2) detecting the estimate value of the base station symbol for the v-th user from the symbols extracted for the v-th user.

34. The data communication method of claim 33, wherein the step (o2) comprises:
    multiplying the result $r_k$ obtained in step (n2) by $\alpha_v \exp(-j2\pi k n_v/N)$ to obtain the result $\tilde{r}_k^{(v)}$ of multiplication, where $\alpha_v$ indicates a magnitude control factor, and $n_v$ indicates a unique frequency offset number previously allocated to the v-th user; and
    folding and adding the results $\tilde{r}_k^{(v)}$ of multiplication with a period of $N_v$ to obtain symbols $r_k^{(v)}$ for the v-th user, where $N_v$ is an integer greater than or equal to 1 and less than or equal to N, and going to the step (p2).

35. The data communication method of claim 33, wherein the step (o2) comprises:
    (o21) performing N-point Fourier transform on the result $r_k$ obtained in step (n2); and
    (o22) when the result $R_n$ of N-point Fourier transform corresponds to the result $R_n^{(v)}$ of Fourier transform for the v-th user, performing $N_v$-point inverse Fourier transform on $R_n^{(v)}$ to obtain symbols $r_k^{(v)}$ for the v-th user, and going to the step (p2).

36. The data communication method of claim 35, wherein the step (o21) further comprises (o23) performing compensation on phase and magnitude of the result $R_n^{(v)}$ of Fourier transform for the v-th user, and the step (o22) comprises performing $N_v$-point inverse Fourier transform on the result of compensation obtained in step (o23) to obtain symbols $z^{k(v)}$ for the v-th user, and going to the step (p2).

37. The data communication method of claim 33, wherein the step (o2) comprises:
    removing interchannel interference from the result $r_k$ obtained in step (n2);
    multiplying the result $z_k$ of removal of the interchannel interference by $\alpha_v \exp(-j2\pi k n_v/N)$, where $\alpha_v$ indicates a magnitude control factor for a v-th user signal, and $n_v$ indicates a unique frequency offset number previously allocated to the v-th user; and
    folding and adding the results $\tilde{z}_k^{(v)}$ with a period of $N_v$ to obtain symbols $z_k^{(v)}$ for the v-th user, where $N_v$ is an integer greater than or equal to 1 and less than or equal to N, and going to the step (p2).

38. The data communication method of claim 33, wherein the step (o2) comprises:
    multiplying the result $r_k$ obtained in step (n2) by $\alpha_v \exp(-j2\pi k n_v/N)$, where $\alpha_v$ indicates a magnitude control factor for a v-th user signal, and $n_v$ indicates a unique frequency offset number previously allocated to the v-th user;
    folding and adding the results $\tilde{r}_k^{(v)}$ of multiplication with a period of $N_v$, where $N_v$ is an integer greater than or equal to 1 and less than or equal to N; and
    removing interchannel interference from the result $r_k^{(v)}$ of folding and addition to obtain the symbols $z_k^{(v)}$ for the v-th user, and going to the step (p2).

39. A data communication apparatus based on orthogonal frequency division multiple access (OFDMA) comprising a second user transmitting unit through which a user transmits user information to a base station in units of two first symbol blocks each including a first predetermined number M of symbols in data communication between the user and the base station, the second user transmitting unit comprising:

a first encoder for generating a first sub-block composed of a second predetermined number $M_u$ of user symbols $a_k^{(u)}$ for a u-th user by encoding the user information, where $M_u$ is an integer greater than or equal to 1 and no greater than M, "k" is a time index and an integer greater than or equal to 0 and no greater than M-1, "u" is a user index and an integer greater than or equal to 1 and no greater than U, and U indicates the number of users sharing the first symbol block and is 1 or a positive integer greater than 1;

first and second block transmitters; and a first diversity signal generator for transforming odd- and even-numbered first sub-blocks received from the first encoder every symbol block time and alternately outputting untransformed and transformed odd- and even-numbered first sub-blocks to each of the first and second block transmitters every symbol block time, wherein each of the first and second block transmitters comprises a first block repeater, a first multiplier, a first cyclic extension symbol inserter, and a first signal transmitter and generates two symbol block signals from the untransformed and transformed odd- and even-numbered first sub-blocks alternately output from the first diversity signal generator, the first block repeater repeats the first sub-block a third predetermined number $L_u$ of times to generate M symbols $a_{k'}^{(u)}$, wherein $L_u$ is $M/M_u$, k'=k % $M_u$, and k % $M_u$ indicates the remainder when "k" is divided by $M_u$, the first multiplier multiplies the M symbols $a_{k'}^{(u)}$ generated from the first block repeater by $\gamma_u \exp(j2\pi km_u/M)$ and outputs the result of multiplication as a signal $x_k^{(u)}$ for the u-th user, wherein $\gamma_u$ indicates a magnitude control factor for the u-th user signal $x_k^{(u)}$, and $m_u$ indicates a unique frequency offset number allocated to the u-th user, the first cyclic extension symbol inserter outputs the first symbol block completed by inserting a cyclic extension symbol into the u-th user signal $x_k^{(u)}$, the first signal transmitter converts the completed first symbol block into a symbol block signal and transmits the symbol block signal, and $M_1+M_2+M_3+\ldots+M_U$ does not exceed M where M represents the number of symbols in data communication between the user and the base station, Mu is an integer greater than or equal to 1 and no greater than M, 'u' is a user index and an integer greater than or equal to 1 and no greater than U, and U indicates the number of users sharing the first symbol block and is 1 or a positive integer greater than 1.

40. The data communication apparatus of claim 39, wherein the first diversity signal generator comprises:

a first time inverter for receiving odd-numbered first sub-blocks and outputting them in order opposite to the order in which they are input;

a first complex conjugate unit for generating a complex conjugate of the output of the first time inverter and outputting the complex conjugate to the second block transmitter;

a first switching unit for selectively outputting the odd-numbered first sub-blocks to one of the first block transmitter and the first time inverter in response to a first switching signal;

a second time inverter for receiving the even-numbered first sub-blocks and outputting them in order opposite to the order in which they are input;

a second complex conjugate unit for generating a complex conjugate of the output of the second time inverter and outputting the complex conjugate;

a (2U+V+4)-th multiplier for multiplying the output of the second complex conjugate unit by −1 and outputting the result of multiplication to the first block transmitter;

a second switching unit for selectively outputting the even-numbered first sub-blocks to one of the second block transmitter and the second time inverter in response to a second switching signal; and a switching signal generator for generating the first and second switching signals so that the first and second switching units can output the odd- and even-numbered first sub-blocks, respectively, to the first and second block transmitters and alternately to the first and second time inverters every symbol block time, the first block repeater included in the first block transmitter repeats the odd-numbered first sub-block output from the first switching unit or the output of the (2U+V+4)-th multiplier $L_u$ times to generate the M symbols $a_{k'}^{(u)}$, and the first block repeater included in the second block transmitter repeats the even-numbered first sub-block output from the second switching unit or the output of the first complex conjugate unit $L_u$ times to generate the M symbols $a_{k'}^{(u)}$.

41. The data communication apparatus of claim 39, further comprising a second base station receiving unit which receives one of two symbol block signals transmitted from each of U second user transmitting units and estimates a u-th user symbol from the received symbol block signal, the second base station receiving unit comprising:

a third signal receiver for converting the received symbol block signal into the first symbol block and outputting the first symbol block;

a third pre-processor for finding a start point of the first symbol block received from the third signal receiver, removing the cyclic extension symbol from the first symbol block on the basis of the start point, and outputting the result $r_k$ of removal of the cyclic extension symbol;

a second user symbol extractor for extracting odd- and even-numbered user symbols for the u-th user in a frequency domain from the result $r_k$ of removal output from the third pre-processor; and a third estimate value detector for detecting estimate values $\hat{a}_{1,k}^{(u)}$ and $\hat{a}_{2,k}^{(u)}$ of the odd- and even-numbered user symbols from the odd- and even-numbered user symbols for the u-th user extracted by the second user symbol extractor.

42. The data communication apparatus of claim 41, wherein the second user symbol extractor comprises:

a Fourier transformer for performing M-point Fourier transform on the result $r_k$ output from the third pre-processor and outputting the result $R_n$ of Fourier transform, "n" indicating a frequency factor and being an integer greater than or equal to 0 and no greater than M−1;

a first sorter for classing the result $R_n$ output from the Fourier transformer as a result $R_{1,n}$ generated in the Fourier transformer during an odd-numbered symbol block time and as a result $R_{2,n}$ generated in the Fourier transformer during an even-numbered symbol block time in response to a third switching signal and outputting $R_{1,n}$ and $R_{2,n}$;

a first diversity equalizer for calculating the results $Z_{1,n}$ and $Z_{2,n}$ of removing interchannel interference using the outputs $R_{1,n}$ and $R_{2,n}$ of the first sorter and the characteristics $H_{1,n}$ and $H_{2,n}$ of channels through which the two symbol block signals are transmitted;

first through 2U-th inverse Fourier transformers;

a first distributor for outputting the result $Z_{1,n}$ output from the first diversity equalizer as $Z_{1,n}^{(u)}$ to one among the first through U-th inverse Fourier transformers in response to a selection signal;

a second distributor for outputting the result $Z_{2,n}$ output from the first diversity equalizer as $Z_{2,n}^{(u)}$ to one among the (U+1)-th through 2U-th inverse Fourier transformers in response to the selection signal; and a second controller for generating the third switching signal so that $R_n$ can be alternately output as $R_{1,n}$ and $R_{2,n}$ every symbol block time and generating the selection signal in response to the unique frequency offset number $m_u$ and the third predetermined number $L_u$, the u-th inverse Fourier transformer performs $M_u$-point inverse Fourier transform on $Z_{1,n}^{(u)}$ and outputs the result $z_{1,k}^{(u)}$ of inverse Fourier transform as the odd-numbered user symbol for the u-th user to the third estimate value detector, and the (u+U)-th inverse Fourier transformer performs $M_u$-point inverse Fourier transform on $Z_{2,n}^{(u)}$ and outputs the result $z_{2,k}^{(u)}$ of inverse Fourier transform as the even-numbered user symbol for the u-th user to the third estimate value detector.

43. The data communication apparatus of claim 42, wherein the third estimate value detector comprises first through 2U-th detectors, the u-th detector detects the estimate value $\hat{a}_{1,k}^{(u)}$ of the odd-numbered user symbol from the result $z_{1,k}^{(u)}$ output from the u-th inverse Fourier transformer, and the (u+U)-th detector detects the estimate value $\hat{a}_{2,k}^{(u)}$ of the even-numbered user symbol from the result $z_{2,k}^{(u)}$ output from the (u+U)-th inverse Fourier transformer.

44. The data communication apparatus of claim 28, wherein the first diversity equalizer calculates $Z_{1,n}$ and $Z_{2,n}$ according to:

$$Z_{1,n} = \frac{[H_{1,n}]^* R_{1,n} + H_{2,n}[R_{2,n}]^*}{|H_{1,n}|^2 + |H_{2,n}|^2 + 1/SNR}, \quad Z_{2,n} = \frac{[H_{2,n}]^* R_{1,n} - H_{1,n}[R_{2,n}]^*}{|H_{1,n}|^2 + |H_{2,n}|^2 + 1/SNR}$$

where SNR indicates a ratio of the u-th user symbol to Gaussian noise.

45. The data communication apparatus of claim 28, wherein the first diversity equalizer calculates $Z_{1,n}$ and $Z_{2,n}$ according to:

$$Z_{1,n} = \frac{[H_{1,n}]^* R_{1,n} + H_{2,n}[R_{2,n}]^*}{|H_{1,n}|^2 + |H_{2,n}|^2}, \quad Z_{2,n} = \frac{[H_{2,n}]^* R_{1,n} - H_{1,n}[R_{2,n}]^*}{|H_{1,n}|^2 + |H_{2,n}|^2}.$$

46. A data communication method based on orthogonal frequency division multiple access (OFDMA) through which the second user transmitting unit of the data communication apparatus of claim 39 transmits the user information to the base station in two first symbol block units, the data communication method comprising:

(a3) transmitting the untransformed odd-numbered first sub-blocks to the first block transmitter and simultaneously transmitting the untransformed even-numbered first sub-blocks to the second block transmitter, during an odd-numbered symbol block time;

(b3) transforming the even-numbered first sub-blocks by multiplying complex conjugates of the even-numbered first sub-blocks by −1 and arranging the results of multiplication in order opposite to the order in which the even-numbered first sub-blocks are input and transmitting the transformed even-numbered first sub-blocks to the first block transmitter, and simultaneously, transforming the odd-numbered first sub-blocks by arranging complex conjugates of the odd-numbered first sub-blocks in order opposite to the order in which the odd-numbered first sub-blocks are input and transmitting the transformed odd-numbered first sub-blocks to the second block transmitter, during an even-numbered symbol block time;

(c3) generating the symbol block signal from the untransformed odd-numbered first sub-blocks transmitted in step (a3) using the first block transmitter and generating the symbol block signal from the untransformed even-numbered first sub-blocks transmitted in step (a3) using the second block transmitter, during the odd-numbered symbol block time; generating the symbol block signal from the transformed even-numbered first sub-blocks transmitted in step (b3) using the first block transmitter and generating the symbol block signal from the transformed odd-numbered first sub-blocks transmitted in step (b3) using the second block transmitter, during the even-numbered symbol block time; and simultaneously transmitting the two symbol block signals generated during the odd- or even-numbered symbol block time to the base station.

47. A data communication method based on orthogonal frequency division multiple access (OFDMA) through which the second base station receiving unit of the data communication apparatus of claim 46 receives one of the symbol block signals transmitted from the second user transmitting unit and estimates a u-th user symbol, the data communication method comprising:

(m3) converting the received symbol block signal into the first symbol block;

(n3) removing the cyclic extension symbol from the first symbol block;

(o3) extracting odd- and even-numbered user symbols for the u-th user in a frequency domain from the result $r_k$ of removal of the cyclic extension symbol; and (p3) detecting estimate values $\hat{a}_{1,k}^{(u)}$ and $\hat{a}_{2,k}^{(u)}$ of the odd- and even-numbered user symbols from the extracted odd- and even-numbered user symbols for the u-th user.

48. The data communication method of claim 47, wherein the step (o3) comprises:

(o31) performing M-point Fourier transform on the result $r_k$ of removing the cyclic extension symbol in step (n3);

(o32) classing the result $R_n$ of Fourier transform as the result $R_{1,n}$ of Fourier transform processed during the odd-numbered symbol block time and as the result $R_{2,n}$ of Fourier transform processed during the even-numbered symbol block time, where "n" indicates a frequency factor and is an integer greater than or equal to 0 and no greater than M−1;

(o33) removing interchannel interference using $R_{1,n}$, $R_{2,n}$, and the characteristics $H_{1,n}$ and $H_{2,n}$ of channels through which the two symbol block signals are transmitted; and (o34) when the results $Z_{1,n}$ and $Z_{2,n}$ of removal of the interchannel interference correspond to the results $Z_{1,n}^{(u)}$ and $Z_{2,n}^{(u)}$ for the u-th user, performing $M_u$-point inverse Fourier transform on $Z_{1,n}^{(u)}$ and $Z_{2,n}^{(u)}$ to obtain the odd- and even-numbered user symbols, and going to the step (p3).

49. The data communication method of claim 48, wherein the step (p3) comprises detecting the estimate value $\hat{a}_{1,k}^{(u)}$ of the odd-numbered user symbol from the result $z_{1,k}^{(u)}$ of inverse Fourier transform performed in step (o34), and detecting the estimate value $\hat{a}_{2,k}^{(u)}$ of the even-numbered user symbol from the result $z_{2,k}^{(u)}$ of inverse Fourier transform performed in step (o34).

50. The data communication method of claim 48, wherein the step (o33) comprises calculating $Z_{1,n}$ and $Z_{2,n}$ according to:

$$Z_{1,n} = \frac{[H_{1,n}]^* R_{1,n} + H_{2,n}[R_{2,n}]^*}{|H_{1,n}|^2 + |H_{2,n}|^2 + 1/SNR}, \quad Z_{2,n} = \frac{[H_{2,n}]^* R_{1,n} - H_{1,n}[R_{2,n}]^*}{|H_{1,n}|^2 + |H_{2,n}|^2 + 1/SNR}$$

where SNR indicates a ratio of the u-th user symbol to Gaussian noise.

51. The data communication method of claim 48, wherein the step (o33) comprises calculating $Z_{1,n}$ and $Z_{2,n}$ according to:

$$Z_{1,n} = \frac{[H_{1,n}]^* R_{1,n} + H_{2,n}[R_{2,n}]^*}{|H_{1,n}|^2 + |H_{2,n}|^2}, \quad Z_{2,n} = \frac{[H_{2,n}]^* R_{1,n} - H_{1,n}[R_{2,n}]^*}{|H_{1,n}|^2 + |H_{2,n}|^2}.$$

52. A data communication apparatus based on orthogonal frequency division multiple access (OFDMA) in data communication between a fourth predetermined number V of users and a base station, V indicating the number of users sharing a second symbol block and being 1 or a positive integer greater than 1, the data communication apparatus comprising a second base station transmitting unit through which the base station transmits base station information to a v-th user in units of two second symbol blocks each including a fifth predetermined number N of symbols, the second base station transmitting unit comprising:

second through (V+1)-th encoders;
third and fourth block transmitters; and
second through (V+1)-th diversity signal generators,
wherein the (v+1)-th encoder generates a (v+1)-th sub-block composed of a sixth predetermined number $N_v$ of base station symbols $a_k^{(v)}$ for a v-th user by encoding the base station information and outputs the (v+1)-th sub-block to the (v+1)-th block repeater, $N_v$ being an integer greater than or equal to 1 and less than or equal to N, "k" being a time index and an integer greater than or equal to 0 and less than or equal to N−1, the (v+1)-th diversity signal generator transforms odd- and even-numbered (v+1)-th sub-blocks received from the (v+1)-th encoder every symbol block time and outputs alternately untransformed and transformed odd- and even-numbered (v+1)-th sub-blocks to the third and fourth block transmitters every symbol block time, and each of the third and fourth block transmitters comprises second through (V+1)-th block repeaters, second through (V+1)-th multipliers, a first adder, a second cyclic extension symbol inserter, and a second signal transmitter, and generates two symbol block signals from the untransformed and transformed odd- and even-numbered second through (V+1)-th sub-blocks alternately output from each of the second through (V+1)-th diversity signal generators, the (v+1)-th block repeater repeats the (v+1)-th sub-block a seventh predetermined number $L_v$ of times to generate N symbols $a_{k'}^{(v)}$ and outputs the N symbols $a_{k'}^{(v)}$ to the (v+1)-th multiplier, $L_v$ being $N/N_v$, k'=k % $N_v$, k % $N_v$ indicating the remainder when "k" is divided by $N_v$, the (v+1)-th multiplier multiplies the N symbols $a_{k'}^{(v)}$ by $\gamma_v \exp(j2\pi k n_v/N)$ and outputs the result $x_k^{(v)}$ of multiplication to the first adder, $\gamma_v$ indicating a magnitude control factor for a v-th user signal, $n_v$ indicating a unique frequency offset number allocated to the v-th user, the first adder sums the results $x_k^{(1)}$ through $x_k^{(V)}$ of multiplication received from the second through (V+1)-th multipliers and outputs the result $x_k$ of summation to the second cyclic extension symbol inserter, the second cyclic extension symbol inserter outputs the single second symbol block completed by inserting a cyclic extension symbol into the result $x_k$ of summation to the second signal transmitter, the second signal transmitter converts the completed second symbol block into a symbol block signal and transmits the symbol block signal, and $N_1+N_2+N_3+\ldots+N_v$ does not exceed N where N represents the number of second symbol blocks in data communication between the user and the base station, Nv is an integer greater than or equal to 1 and less than or equal to N, 'v' is a user index and an integer greater than or equal to 1 and no greater than V, and V indicates the number of users sharing the second symbol block and is 1 or a positive integer greater than 1.

53. The data communication apparatus of claim 52, wherein the (v+1)-th diversity signal generator comprises:

a first time inverter for receiving the odd-numbered (v+1)-th sub-blocks and outputting them in order opposite to the order in which they are input;

a first complex conjugate unit for generating a complex conjugate of the output of the first time inverter and outputting the complex conjugate to the fourth block transmitter;

a first switching unit for selectively outputting the odd-numbered (v+1)-th sub-blocks to one of the third block transmitter and the first time inverter in response to a first switching signal;

a second time inverter for receiving the even-numbered (v+1)-th sub-blocks and outputting them in order opposite to the order in which they are input;

a second complex conjugate unit for generating a complex conjugate of the output of the second time inverter and outputting the complex conjugate;

a (2U+V+5)-th multiplier for multiplying the output of the second complex conjugate unit by −1 and outputting the result of multiplication to the third block transmitter;

a second switching unit for selectively outputting the even-numbered (v+1)-th sub-blocks to one of the fourth block transmitter and the second time inverter in response to a second switching signal; and a switching signal generator for generating the first and second switching signals so that the first and second switching units can output the odd- and even-numbered (v+1)-th sub-blocks, respectively, to the third and fourth block transmitters and alternately to the first and second time inverters, the (v+1)-th block repeater included in the third block transmitter repeats the odd-numbered (v+1)-th sub-blocks output from the first switching unit or the output of the (2U+V+5)-th multiplier $L_v$ times to generate the N symbols $a_k^{(v)}$, and the (v+1)-th block repeater included in the fourth block transmitter repeats the even-numbered (v+1)-th sub-blocks output from the second switching unit or the output of the first complex conjugate unit $L_v$ times to generate the N symbols $a_k^{(v)}$.

54. The data communication apparatus of claim 52, further comprising a second user receiving unit which receives one of two symbol block signals transmitted from the second base station transmitting unit and estimates a base station symbol for the v-th user from the received symbol block signal, the second user receiving unit comprising:

a fourth signal receiver for converting the received symbol block signal into a second symbol block and outputting the second symbol block;

a fourth pre-processor for finding a start point of the second symbol block received from the fourth signal receiver, removing the cyclic extension symbol from the second symbol block on the basis of the start point, and outputting the result $r_k$ of removal of the cyclic extension symbol;

a second base station symbol extractor for extracting odd- and even-numbered symbols for the v-th user from the result $r_k$ output from the fourth pre-processor; and a fourth estimate value detector for detecting estimate values $\hat{a}_{1,k}^{(v)}$ and $\hat{a}_{2,k}^{(v)}$ of odd- and even-numbered base station symbols for the v-th user from the extracted odd- and even-numbered symbols.

55. The data communication apparatus of claim 54, wherein the second base station symbol extractor comprises:

a user signal detector for detecting only a signal $R_n^{(v)}$ for the v-th user from the result of performing Fourier transform on the result $r_k$ output from the fourth pre-processor, "n" indicating a frequency factor and being an integer greater than or equal to 0 and no greater than N−1;

a second sorter for classing the result $R_n^{(v)}$ output from the user signal detector as a result $R_{1,n}^{(v)}$ detected in the user signal detector during an odd-numbered symbol block time and as a result $R_{2,n}^{(v)}$ detected in the user signal detector during an even-numbered symbol block time in response to a fourth switching signal and outputting $R_{1,n}^{(v)}$ and $R_{2,n}^{(v)}$;

a second diversity equalizer for calculating the results $Z_{1,n}^{(v)}$ and $Z_{2,n}^{(v)}$ of removing interchannel interference using the outputs $R_{1,n}^{(v)}$ and $R_{2,n}^{(v)}$ of the second sorter and the characteristics $H_{1,n}^{(v)}$ and $H_{2,n}^{(v)}$ of channels through which the two symbol block signals are transmitted;

a third controller for generating the fourth switching signal so that $R_n^{(v)}$ can be alternately output as $R_{1,n}^{(v)}$ and $R_{2,n}^{(v)}$ every symbol block time;

a first inverse Fourier transformer for performing $N_v$-point inverse Fourier transform on $Z_{1,n}^{(v)}$ output from the second diversity equalizer and outputting the result $z_{1,k}^{(v)}$ of inverse Fourier transform as odd-numbered symbols for the v-th user; and a second inverse Fourier transformer for performing $N_v$-point inverse Fourier transform on $Z_{2,n}^{(v)}$ output from the second diversity equalizer and outputting the result $z_{2,k}^{(v)}$ of inverse Fourier transform as even-numbered symbols for the v-th user.

56. The data communication apparatus of claim 55, wherein the fourth estimate value detector comprises:

a first detector for detecting the estimate value $\hat{a}_{1,k}^{(v)}$ of the odd-numbered base station symbol for the v-th user from the result $z_{1,k}^{(v)}$ output from the first inverse Fourier transformer; and a second detector for detecting the estimate value $\hat{a}_{2,k}^{(v)}$ of the even-numbered base station symbol for the v-th user from the result $z_{2,k}^{(v)}$ output from the second inverse Fourier transformer.

57. The data communication apparatus of claim 55, wherein the user signal detector comprises:

a (2U+V+6)-th multiplier for multiplying the result $r_k$ output from the fourth pre-processor by $\alpha_v \exp(-j2\pi k n_v/N)$ and outputting the result $\tilde{r}_k^{(v)}$ of multiplication, $\alpha_v$ indicating a magnitude control factor;

a (2U+3)-th post-processor for folding and adding the results $\tilde{r}_k^{(v)}$ output from the (2U+V+6)-th multiplier with a period of $N_v$ and outputting the result $r_k^{(v)}$ of folding and addition; and a Fourier transformer for performing $N_v$-point Fourier transform on the result $r_k^{(v)}$ output from the (2U+3)-th post-processor and outputting the result of Fourier transform as $R_n^{(v)}$ to the second sorter.

58. The data communication apparatus of claim 55, wherein the user signal detector comprises:

a Fourier transformer for performing N-point Fourier transform on the result $r_k$ output from the fourth pre-processor and outputting the result $R_n$ of Fourier transform, "n" indicating a frequency factor and being an integer greater than or equal to 0 and less than or equal to N−1;

a first controller for generating a selection signal in response to the unique frequency offset number $n_v$ and the seventh predetermined number $L_v$; and a switching unit for selectively outputting the result $R_n$ output from the Fourier transformer as $R_n^{(v)}$ to the second sorter in response to the selection signal.

59. The data communication apparatus of claim 55, wherein the second diversity equalizer calculates $Z_{1,n}^{(v)}$ and $Z_{2,n}^{(v)}$ according to:

$$Z_{1,n}^{(v)} = \frac{[H_{1,n}^{(v)}]^* R_{1,n}^{(v)} + H_{2,n}^{(v)}[R_{2,n}^{(v)}]^*}{|H_{1,n}^{(v)}|^2 + |H_{2,n}^{(v)}|^2 + 1/SNR}, \quad Z_{2,n}^{(v)} = \frac{[H_{2,n}^{(v)}]^* R_{1,n}^{(v)} - H_{1,n}^{(v)}[R_{2,n}^{(v)}]^*}{|H_{1,n}^{(v)}|^2 + |H_{2,n}^{(v)}|^2 + 1/SNR}$$

where SNR indicates a ratio of the base station symbol for the v-th user to Gaussian noise.

60. The data communication apparatus of claim 55, wherein the second diversity equalizer calculates $Z_{1,n}^{(v)}$ and $Z_{2,n}^{(v)}$ according to:

$$Z_{1,n}^{(v)} = \frac{[H_{1,n}^{(v)}]^* R_{1,n}^{(v)} + H_{2,n}^{(v)}[R_{2,n}^{(v)}]^*}{|H_{1,n}^{(v)}|^2 + |H_{2,n}^{(v)}|^2}, \quad Z_{2,n}^{(v)} = \frac{[H_{2,n}^{(v)}]^* R_{1,n}^{(v)} - H_{1,n}^{(v)}[R_{2,n}^{(v)}]^*}{|H_{1,n}^{(v)}|^2 + |H_{2,n}^{(v)}|^2}.$$

61. A data communication method based on orthogonal frequency division multiple access (OFDMA) through which the second user receiving unit of the data communication apparatus of claim 54 receives one of the symbol block signals transmitted from the second base station transmitting unit and estimates the base station symbol for the v-th user, the data communication method comprising:

(m4) converting the received symbol block signal into the second symbol block;

(n4) removing the cyclic extension symbol from the second symbol block;

(o4) extracting only the odd- and even-numbered symbols for the v-th user from the result $r_k$ of removal of the cyclic extension symbol; and (p4) detecting the estimate values $\hat{a}_{1,k}^{(v)}$ and $\hat{a}_{2,k}^{(v)}$ of the odd- and even-numbered base station symbols for the v-th user from the extracted odd- and even-numbered symbols.

62. The data communication method of claim 61, wherein the step (o4) comprises:

(o41) detecting only a signal $R_n^{(v)}$ for the v-th user from the result of performing Fourier transform on the result $r_k$ of removing the cyclic extension symbol in step (n4);

(o42) classing $R_n^{(v)}$ as the result $R_{1,n}^{(v)}$ of detection during an odd-numbered symbol block time and as the result $R_{2,n}^{(v)}$ of detection during an even-numbered symbol block time;

(o43) removing interchannel interference using $R_{1,n}^{(v)}$, $R_{2,n}^{(v)}$, $H_{1,n}^{(v)}$, and $H_{2,n}^{(v)}$; and (o44) performing $N_v$-point inverse Fourier transform on the results $Z_{1,n}^{(v)}$ and $Z_{2,n}^{(v)}$ of removal of interchannel interference to obtain the odd- and even-numbered symbols for the v-th user.

63. The data communication method of claim 62, wherein the step (p4) comprises detecting the estimate value $\hat{a}_{1,k}^{(v)}$ of the odd-numbered base station symbol for the v-th user from the result $z_{1,k}^{(v)}$ of inverse Fourier transform performed in step (o44), and detecting the estimate value $\hat{a}_{2,k}^{(v)}$ of the odd-numbered base station symbol for the v-th user from the result $z_{2,k}^{(v)}$ of inverse Fourier transform performed in step (o44).

64. The data communication method of claim 62, wherein the step (o41) comprises:

multiplying the result $r_k$ obtained in step (n4) by $\alpha_v \exp(-j2\pi k n_v/N)$, where $\alpha_v$ indicates a magnitude control factor;

folding and adding the results $\tilde{r}_k^{(v)}$ of multiplication with a period of $N_v$; and performing $N_v$-point Fourier transform on the result $r_k^{(v)}$ of folding and addition and determining the result of Fourier transform as the signal $R_n^{(v)}$ for the v-th user.

65. The data communication method of claim 62, wherein the step (o43) comprises calculating $Z_{1,n}^{(v)}$ and $Z_{2,n}^{(v)}$ according to:

$$Z_{1,n}^{(v)} = \frac{[H_{1,n}^{(v)}]^* R_{1,n}^{(v)} + H_{2,n}^{(v)}[R_{2,n}^{(v)}]^*}{|H_{1,n}^{(v)}|^2 + |H_{2,n}^{(v)}|^2 + 1/SNR}, \quad Z_{2,n}^{(v)} = \frac{[H_{2,n}^{(v)}]^* R_{1,n}^{(v)} - H_{1,n}^{(v)}[R_{2,n}^{(v)}]^*}{|H_{1,n}^{(v)}|^2 + |H_{2,n}^{(v)}|^2 + 1/SNR}$$

where SNR indicates a ratio of the base station symbol for the v-th user to Gaussian noise.

66. The data communication method of claim 62, wherein the step (o43) comprises calculating $Z_{1,n}^{(v)}$ and $Z_{2,n}^{(v)}$ according to:

$$Z_{1,n}^{(v)} = \frac{[H_{1,n}^{(v)}]^* R_{1,n}^{(v)} + H_{2,n}^{(v)}[R_{2,n}^{(v)}]^*}{|H_{1,n}^{(v)}|^2 + |H_{2,n}^{(v)}|^2}, \quad Z_{2,n}^{(v)} = \frac{[H_{2,n}^{(v)}]^* R_{1,n}^{(v)} - H_{1,n}^{(v)}[R_{2,n}^{(v)}]^*}{|H_{1,n}^{(v)}|^2 + |H_{2,n}^{(v)}|^2}.$$

67. A data communication method based on orthogonal frequency division multiple access (OFDMA) through which the second base station transmitting unit of the data communication apparatus of claim 52 transmits the base station information in two second symbol block units, the data communication method comprising:

(a4) transmitting the untransformed odd-numbered second through (V+1)-th sub-blocks to the third block transmitter and simultaneously transmitting the untransformed even-numbered second through (V+1)-th sub-blocks to the fourth block transmitter, during an odd-numbered symbol block time;

(b4) transforming the even-numbered second through (V+1)-th sub-blocks by multiplying complex conjugates of the even-numbered second through (V+1)-th sub-blocks by −1 and arranging the results of multiplication in order opposite to the order in which they are input, and transmitting the transformed even-numbered second through (V+1)-th sub-blocks to the third block transmitter, and simultaneously, transforming the odd-numbered second through (V+1)-th sub-blocks by arranging complex conjugates of the odd-numbered second through (V+1)-th sub-blocks in order opposite to the order in which they are input and transmitting the transformed odd-numbered second through (V+1)-th sub-blocks to the fourth block transmitter, during an even-numbered symbol block time;

(c4) generating the symbol block signal from the untransformed odd-numbered second through (V+1)-th sub-blocks transmitted in step (a4) using the third block transmitter and generating the symbol block signal from the untransformed even-numbered second through (V+1)-th sub-blocks transmitted in step (a4) using the fourth block transmitter, during the odd-numbered symbol block time; generating the symbol block signal from the transformed even-numbered second through (V+1)-th sub-blocks transmitted in step (b4) using the third block transmitter and generating the symbol block signal from the transformed odd-numbered second through (V+1)-th sub-blocks transmitted in step (b4) using the fourth block transmitter, during the even-numbered symbol block time; and simultaneously transmitting the two symbol block signals generated during the odd- or even-numbered symbol block time to the base station.

68. A data communication method based on orthogonal frequency division multiple access (OFDMA) through which a user transmits user information to a base station in units of first symbol blocks each including a first predetermined number of symbols in data communication between the user and a base station, the data communication method comprising:

(a1) generating a first sub-block composed of a second predetermined number $M_u$ of a user symbols $a_k^{(u)}$ for the u-th user by encoding the user information;

(b1) repeating the first sub-block a third predetermined number $L_u$ of times to generate the M symbols $a_k^{(u)}$;

(c1) multiplying the M symbols $a_k^{(u)}$ by $\gamma_u \exp(j2\pi k m_u/M)$ to obtain the u-th user signal $x_k^{(u)}$;

(d1) inserting the cyclic extension symbol into the u-th user signal $x_k^{(u)}$ to generate the single complete first symbol block; and (e1) converting the first symbol block into the symbol block signal and transmitting the symbol block signal.

69. The data communication method of claim 68, wherein a frequency offset number is obtained by the method comprising:

(g) sorting all users in order of ascending $L_u$ or $L_v$;

(h) initializing the user index and the frequency offset number;

(i) increasing the user index by 1, obtaining the value of $b_l \in \{0, 1\}$ satisfying $$\sum_{i=1}^{u-1} L_i^{-1} = \sum_l b_l 2^{-1} \text{ or } \sum_{i=1}^{v-1} L_i^{-1} = \sum_l b_l 2^{-1},$$

and obtaining the frequency offset number using $$\sum_l b_l 2^{l-1};$$

and (j) determining whether the user index is less than the number of users, and going to the step (i) if it is determined that the user index is less than the number of users.

70. The data communication method of claim 69, wherein step (h) comprises initializing the user index to 1 and initializing the frequency offset number to 0, and step (i) comprises determining $$\sum_l b_l 2^{l-1}$$

as the frequency offset number.

71. The data communication method of claim 69, wherein step (h) comprises initializing the user index to 1 and initializing the frequency offset number to $L_1-1$, and step (i) comprises determining $$L_u - 1 - \sum_l b_l 2^{l-1} \text{ or } L_v - 1 - \sum_l b_l 2^{l-1}$$

as the frequency offset number.

72. A data communication method based on orthogonal frequency division multiple access (OFDMA) in a data communication apparatus between a predetermined number V of users and a base station, V indicating the number of users sharing a second symbol block and being 1 or a positive integer greater than 1, the data communication apparatus including a first base station transmitting unit through which the first base station transmits base station information to a v-th user in units of symbol blocks each including a predetermined number N of symbols "v" being a user index and an integer greater than or equal to 1 and no greater than V, the data communication method comprising:

(a2) generating V (v+1)-th sub-blocks each composed of a second predetermined number $N_v$ of base station symbols $a_k^{(v)}$ for the v-th user by encoding the base station information;

(b2) repeating each of the V (v+1)-th sub-blocks $L_v$ times to generate N symbols $a_k^{(v)}$;

(c2) multiplying the symbols $a_k^{(1)}$ through $a_k^{(V)}$, which are obtained with respect to the respective V (v+1)-th sub-blocks in step (b2), by $\gamma_1 \exp(j2\pi k n_1/N)$ through $\gamma_V \exp(j2\pi k n_V/N)$, respectively, to generate $x_k^{(1)}$ through $x_k^{(V)}$;

(d2) summing $x_k^{(1)}$ through $x_k^{(V)}$ and obtaining the result $x_k$ of summation;

(e2) inserting a cyclic extension symbol into the result $x_k$ of summation to generate a single complete symbol block; and (f2) converting the symbol block into a symbol block signal and transmitting the symbol block signal.

73. A data communication method based on orthogonal frequency division multiple access (OFDMA) through which a data communication apparatus based on OFDMA generates a channel estimation pilot symbol including at least 2M (2N) symbols, the data communication method comprising:

(k1) setting a reference pilot symbol sequence d[k] composed of M (N) pilot symbols previously known to a user and a base station, "k" being an integer greater than or equal to 0 and no greater than M−1 (N−1), "[ ]" indicating a set; and (l1) obtaining the pilot symbol $d^{(u)}[e]$ ($d^{(v)}[e]$) for a u-th (v-th) user according to $d^{(u)}[e]=d[m_u+e \cdot L_u]$ ($d^{(v)}[e]=d[n_v+e \cdot L_v]$), where "u" ("v") is a user index and an integer greater than or equal to 1 and no greater than U (V), U (V) indicates the number of users sharing a symbol block having M (N) symbols and is 1 or a positive integer greater than 1, "e" is an integer equal to or greater than 0 and no greater than $M_u-1$ ($N_v-1$), $M_u$ ($N_v$) is an integer equal to or greater than 1 and no greater than M (N), $m_u$ ($n_v$) indicates a unique frequency offset number of the u-th (v-th) user, $L_u$ ($L_v$) is $M/M_u$ ($N/N_v$).

74. The data communication method of claim 73, further comprising the step of (n) when a pilot symbol is a phase shift keying (PSK) symbol, changing the phase of the pilot symbol generated in step (l1) according to $d^{(u)}[e]'=d^{(u)}[e] \cdot \exp(j\pi e/M)$ or $d^{(v)}[e]'=d^{(v)}[e] \cdot \exp(j\pi e/N)$ to obtain a new pilot symbol $d^{(u)}[e]'$ or $d^{(v)}[e]'$.

75. The data communication method of claim 73, wherein the steps (k1) and (l1) are performed in first or second user transmitting unit to generate the pilot symbol in units of time slots.

76. The data communication method of claim 73, wherein the steps (k1) and (l1) are performed in first or second base station transmitting unit to generate the pilot symbol for each of all users simultaneously using a given time slot.

77. A data communication method based on orthogonal frequency division multiple access (OFDMA) through which a data communication apparatus based on OFDMA generates a channel estimation pilot symbol including at least 2M (2N) symbols, the data communication method comprising:

(k2) setting a reference pilot symbol sequence d[k] composed of M (2N) pilot symbols previously known to a user and a base station, "k" being an integer greater than or equal to 0 and no greater than M−1 (N−1), "[ ]" indicating a set; and

(12) obtaining the pilot symbol $d^{(u)}[e]$ ($d^{(v)}[e]$) for a u-th (v-th) user according to $d^{(u)}[e]=d[e+S_{u-1}]$ ($d^{(v)}[e]=d[e+S_{v-1}]$), where "u" ("v") is a user index and an integer greater than or equal to 1 and less than or equal to U (V), U (V) indicates the number of users sharing a symbol block having M (2N) symbols and is 1 or a positive integer greater than 1, "e" is an integer equal to or greater than 0 and less than or equal to $M_{u-1}$ ($N_v-1$), $M_u$ ($N_v$) is an integer equal to or greater than 1 and less than or equal to M (N), $m_u$ ($n_v$) indicates a unique frequency offset number of the u-th (v-th) user, $L_u$ ($L_v$) is $M/M_u$ ($N/N_v$), $$S_u = \sum_{i=1}^{u} M_i \text{ or } S_v = \sum_{i=1}^{v} N_i,$$

and $S_0=0$.

* * * * *